(12) United States Patent
Kikuchi et al.

(10) Patent No.: US 6,439,051 B2
(45) Date of Patent: Aug. 27, 2002

(54) VIBRATORS, VIBRATORY GYROSCOPES, DEVICES FOR MEASURING A LINEAR ACCELERATION AND A METHOD OF MEASURING A TURNING ANGULAR RATE

(75) Inventors: Takayuki Kikuchi, Nagoya; Shosaku Gouji, Ama-gun; Yukihisa Osugi, Nagoya; Takao Soma, Nishikamo-gun, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/753,098

(22) Filed: Jan. 2, 2001

Related U.S. Application Data

(63) Continuation of application No. 09/181,554, filed on Oct. 29, 1998, now Pat. No. 6,227,048.

(30) Foreign Application Priority Data

Nov. 4, 1997 (JP) .............................. 9-316634
Jan. 30, 1998 (JP) ........................... 10-032297
Oct. 14, 1998 (JP) ........................... 10-306434

(51) Int. Cl.[7] ................................................ G01P 9/04
(52) U.S. Cl. ................................................. 73/504.12
(58) Field of Search ........................ 73/504.12, 504.13, 73/504.14, 504.15, 504.16, 504.04; 310/321, 367

(56) References Cited

U.S. PATENT DOCUMENTS 5,476,008 A  12/1995  Pinson .................... 73/504.16
5,889,207 A   3/1999  Lutz ....................... 73/504.13
5,998,911 A  12/1999  Kikuchi et al. ............. 310/367
6,018,212 A   1/2000  Kikuchi et al. ............. 310/321
6,023,974 A   2/2000  Hara et al. ............... 73/504.15

FOREIGN PATENT DOCUMENTS

EP     0 461 761 A1   12/1991
EP     0 844 461 A2    5/1998
JP        2-218914     8/1990
JP        8-128833     5/1996
WO     WO 95 34798 A  12/1995

Primary Examiner—John E. Chapman
(74) Attorney, Agent, or Firm—Burr & Brown

(57) ABSTRACT

A vibratory gyroscope for detecting a turning angular rate in a turning system is provided. The gyroscope comprises a vibrator, an exciting means for exciting driving vibration in the vibrator, and a detecting means for detecting vibration induced in the vibrator. The vibrator comprises a plurality of vibration systems 1A, 1B, 2A and 2B, which are formed within a specified plane intersecting the turning axis Z. Vibration systems comprises first vibration systems 1A and 1B whose vibrations include radial vibration components, in which the center of gravity of first vibration system vibrates in a radial direction in the specified plane with respect to the center of gravity GO of the vibrator. The vibration systems also comprises second vibration systems 2A and 2B whose vibrations include circumferential vibration components, in which the center of gravity of vibration of the second vibration system vibrates in the specified plane along a circle with the center of gravity GO as its center.

46 Claims, 52 Drawing Sheets

(6 of 52 Drawing Sheet(s) Filed in Color)

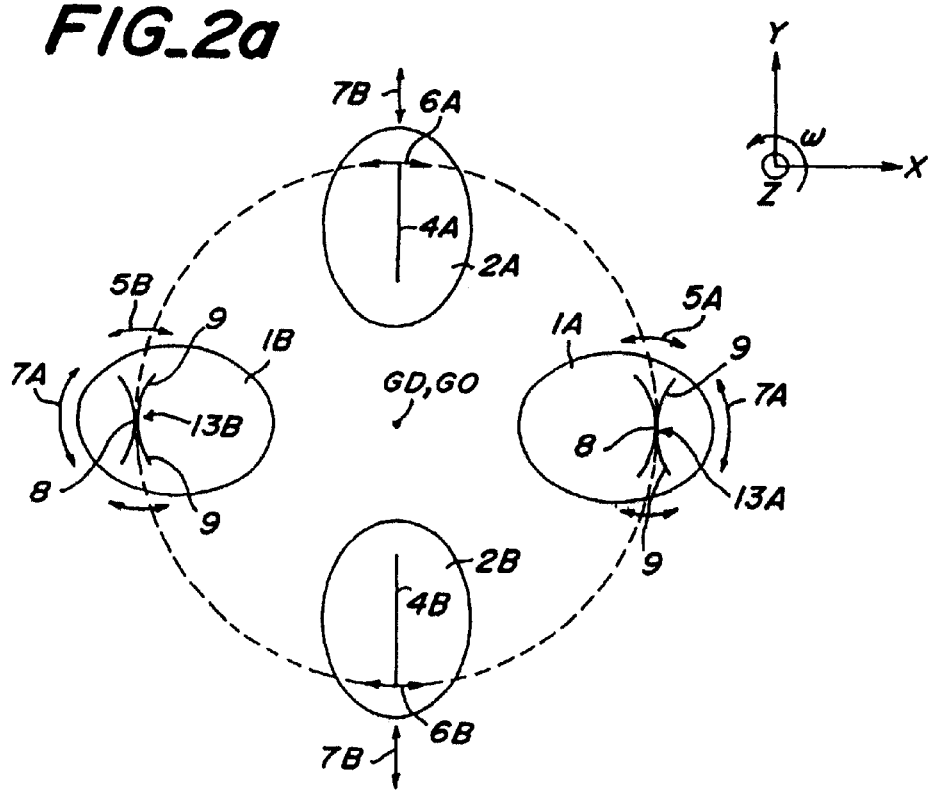
FIG._2a
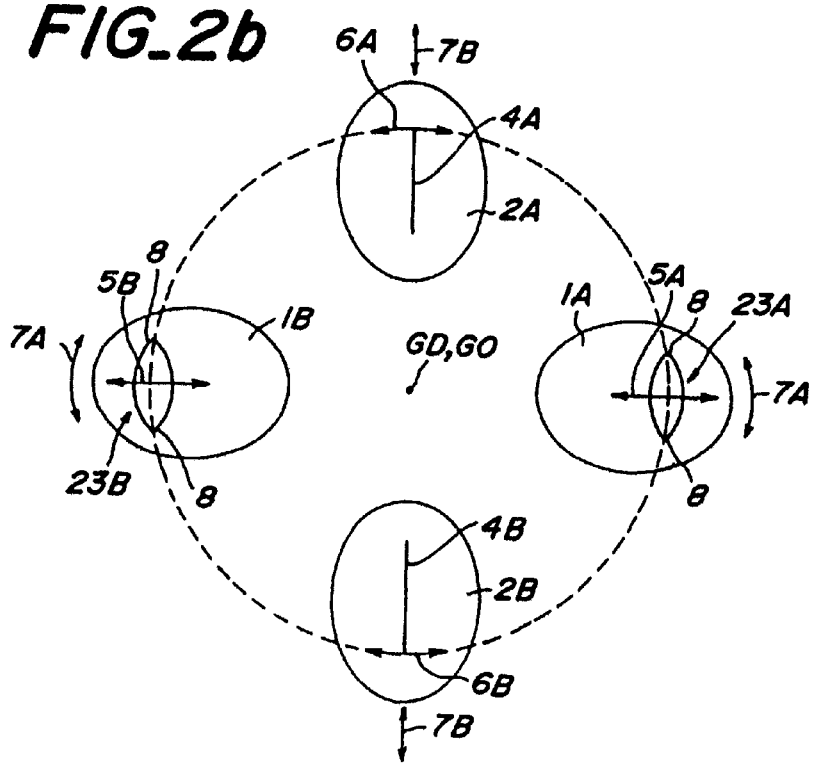
FIG._2b

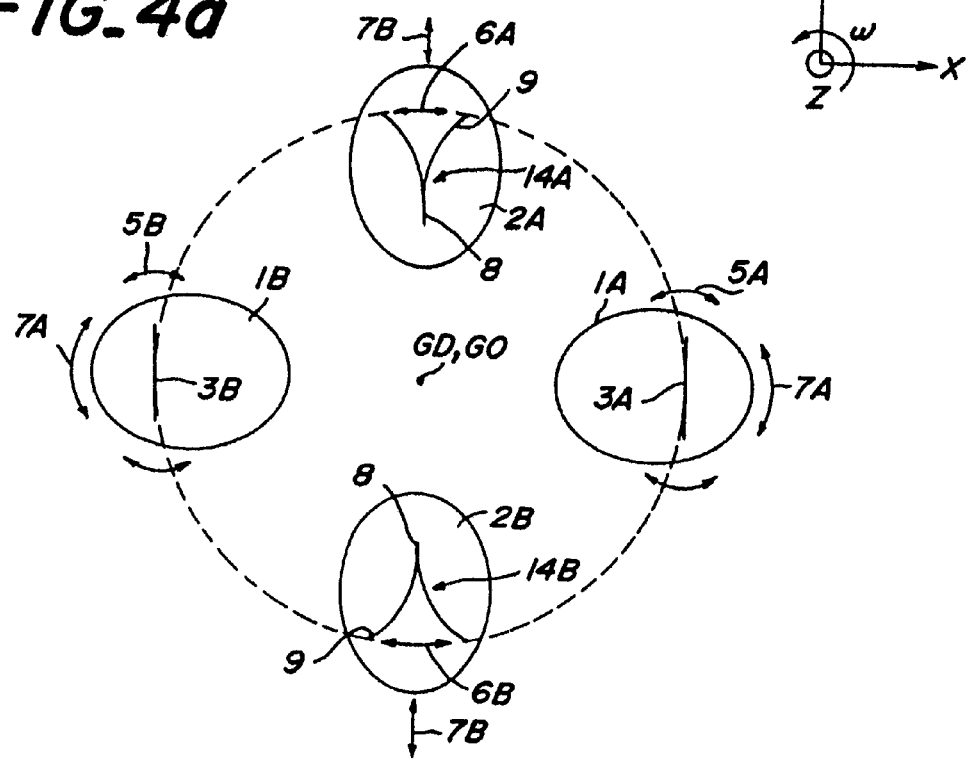
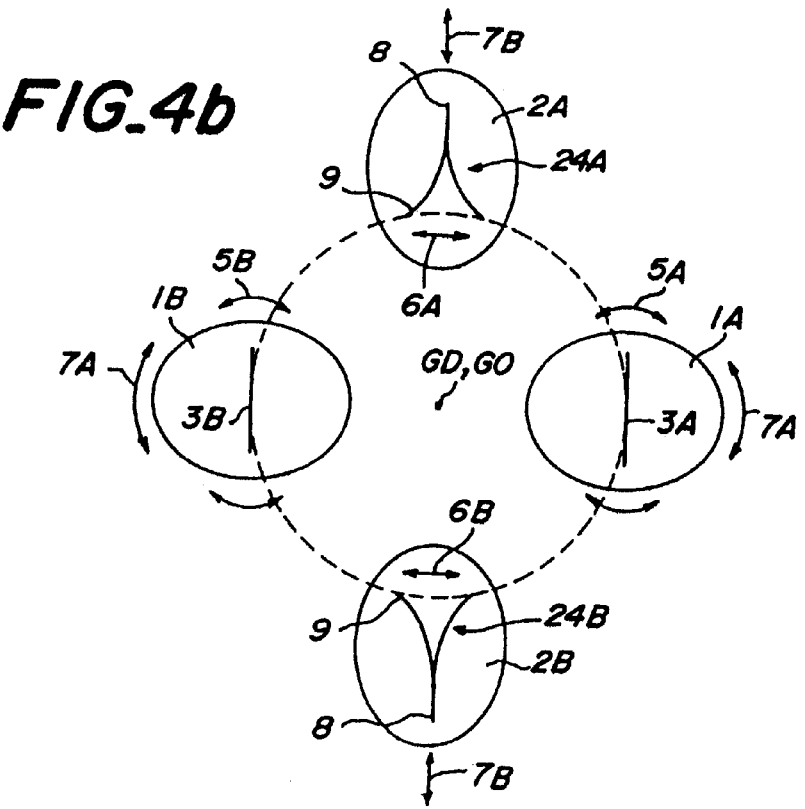

FIG_8

FIG_11

FIG_12

FIG_14

FIG_15

FIG_18
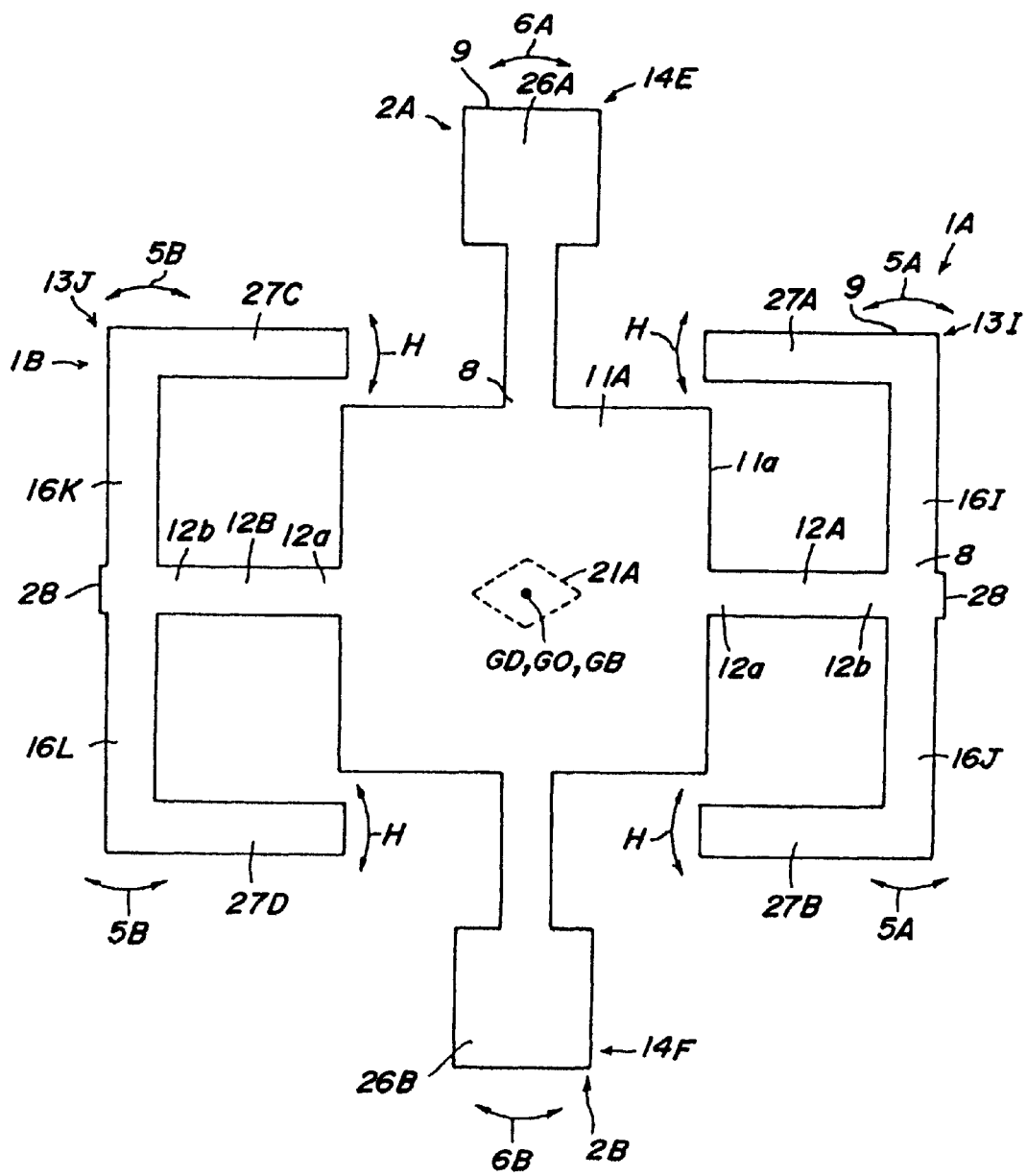

FIG_19a
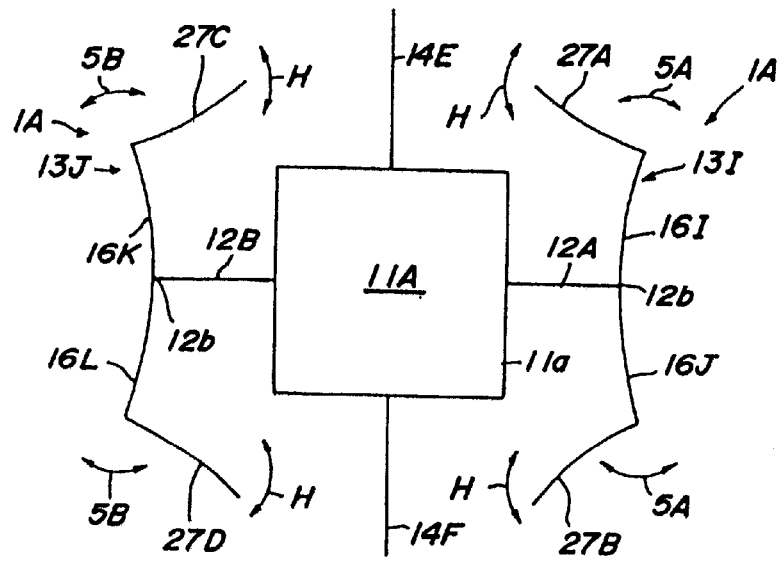
FIG_19b
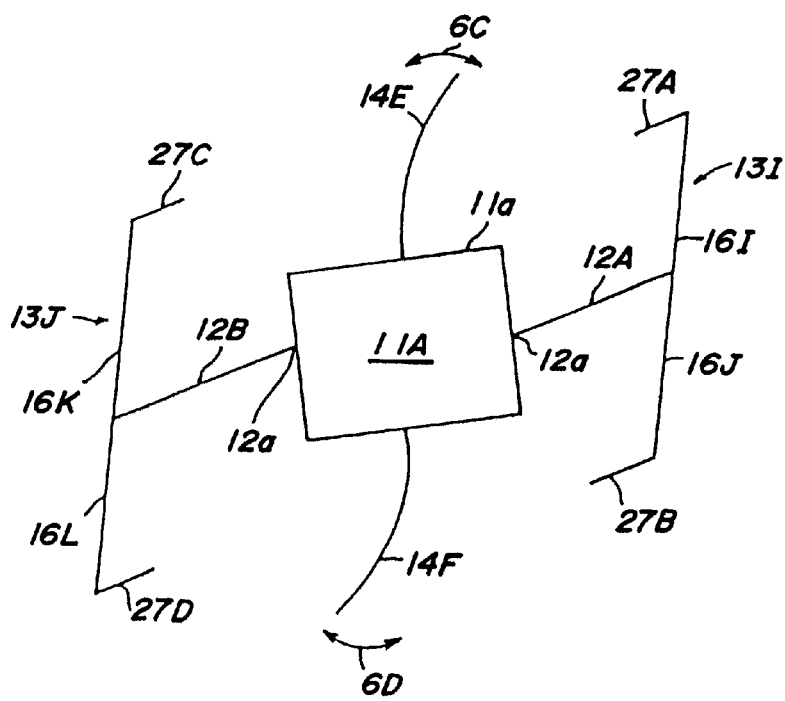

FIG_27

FIG_30

FIG. 36
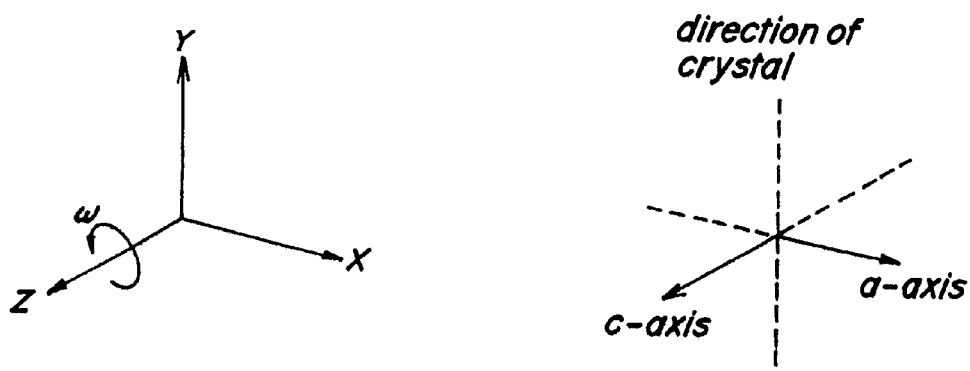
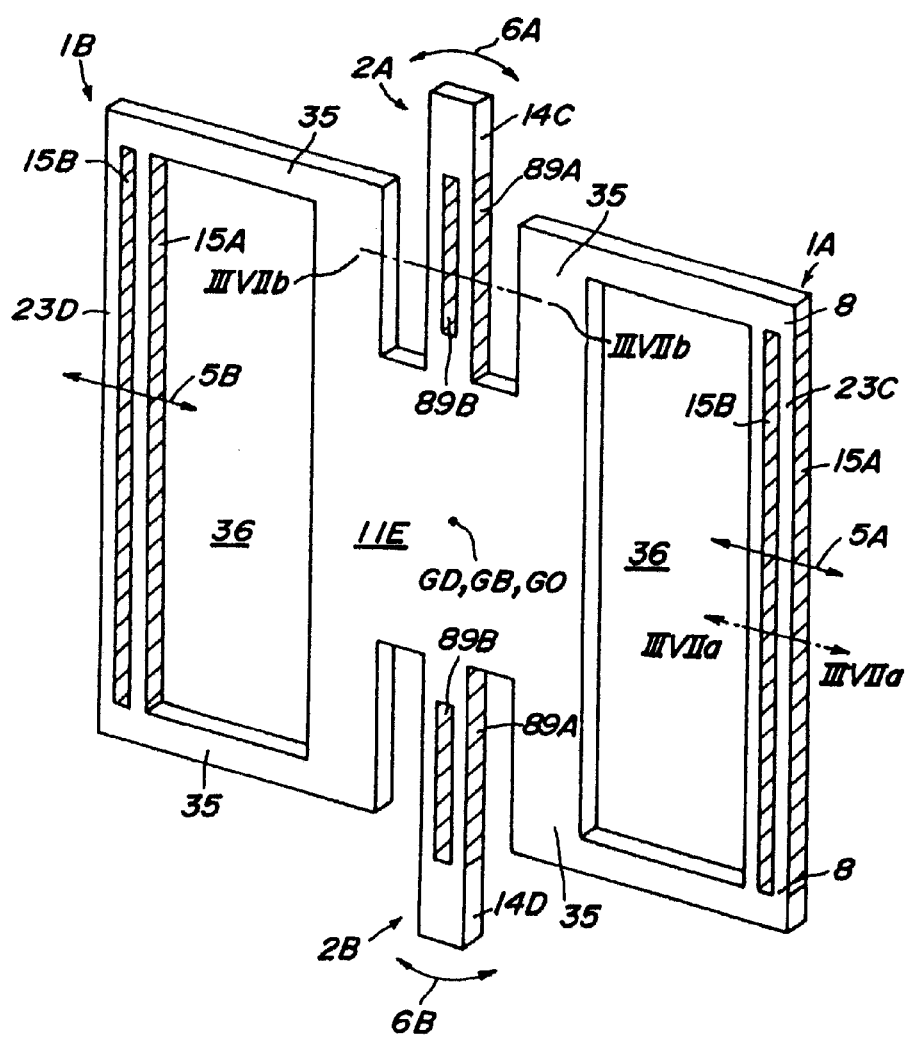

FIG_37a
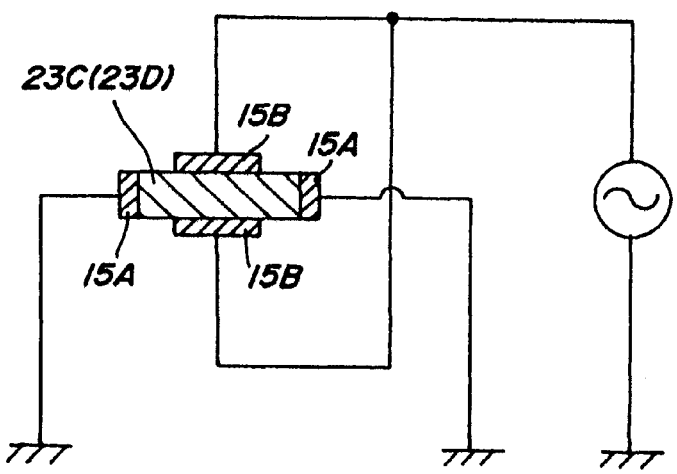
FIG_37b
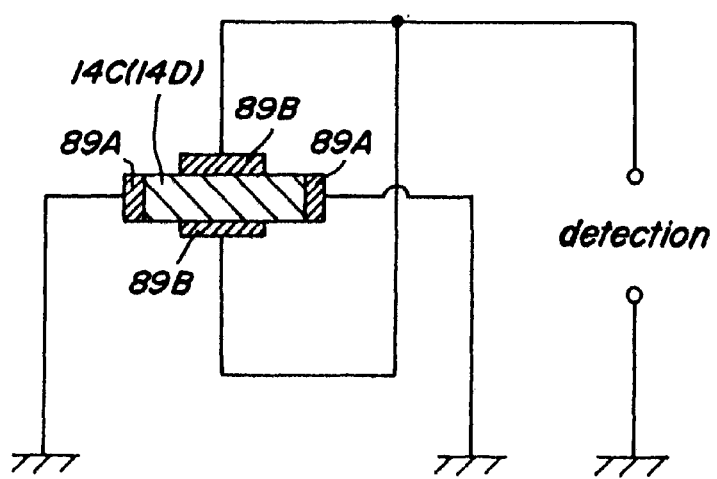

FIG_39a
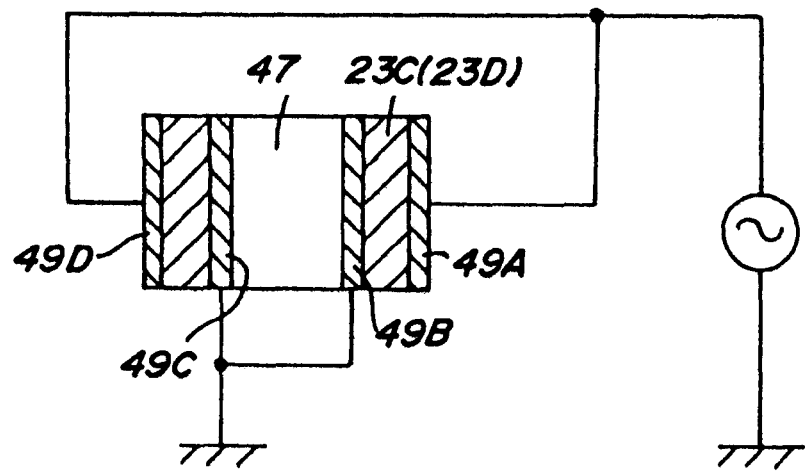
FIG_39b
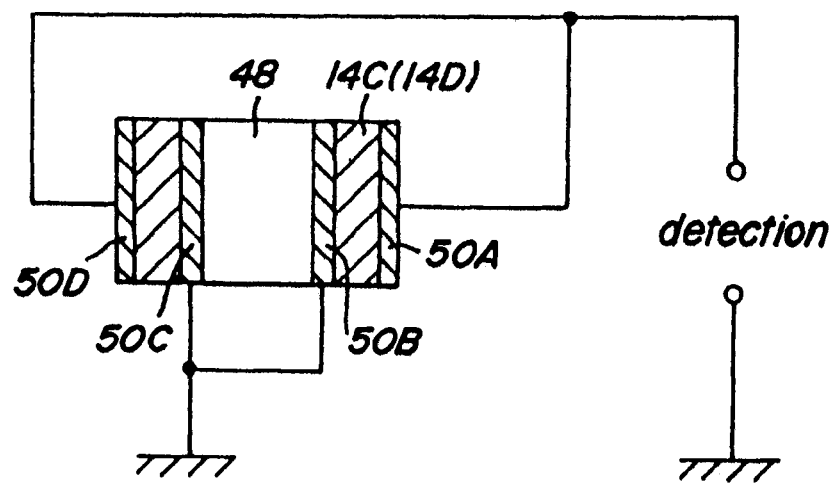

FIG. 40
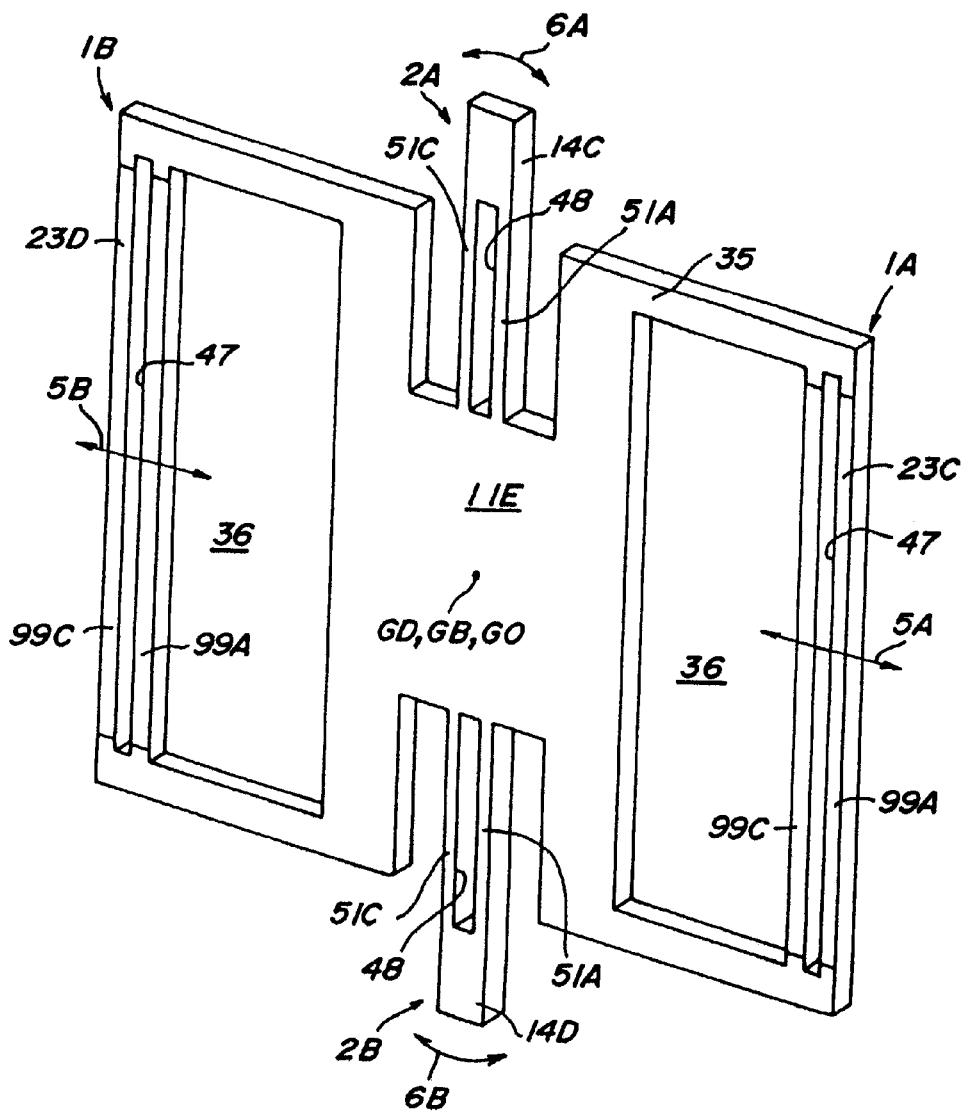
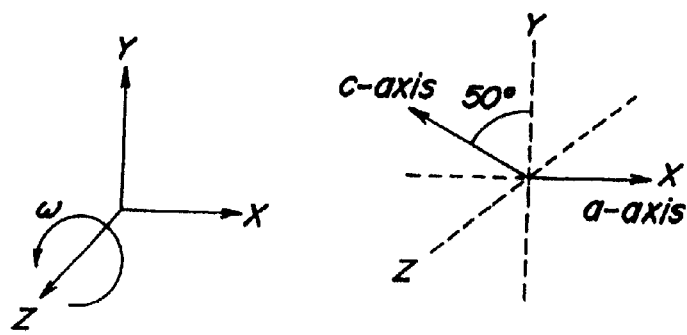

FIG_41a
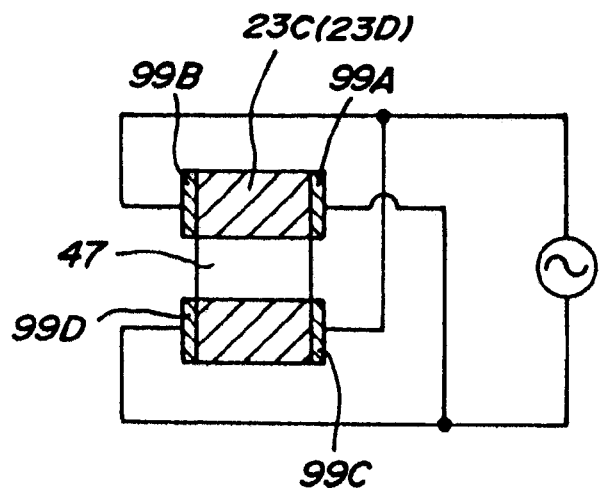
FIG_41b
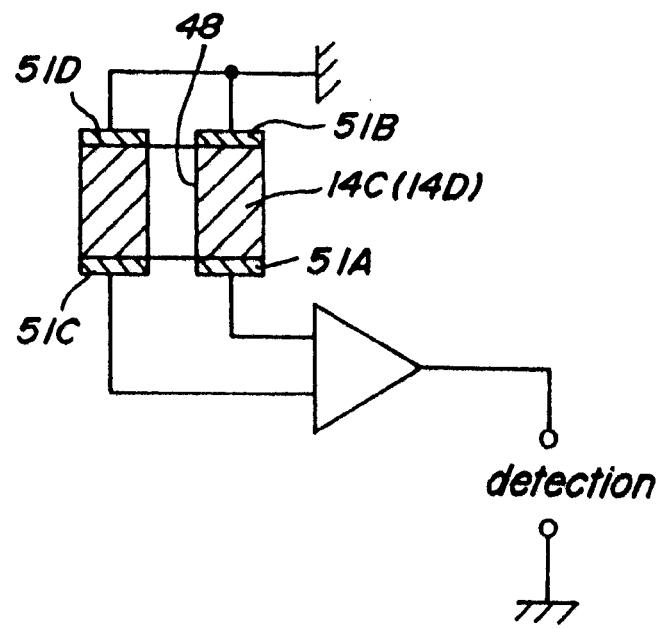

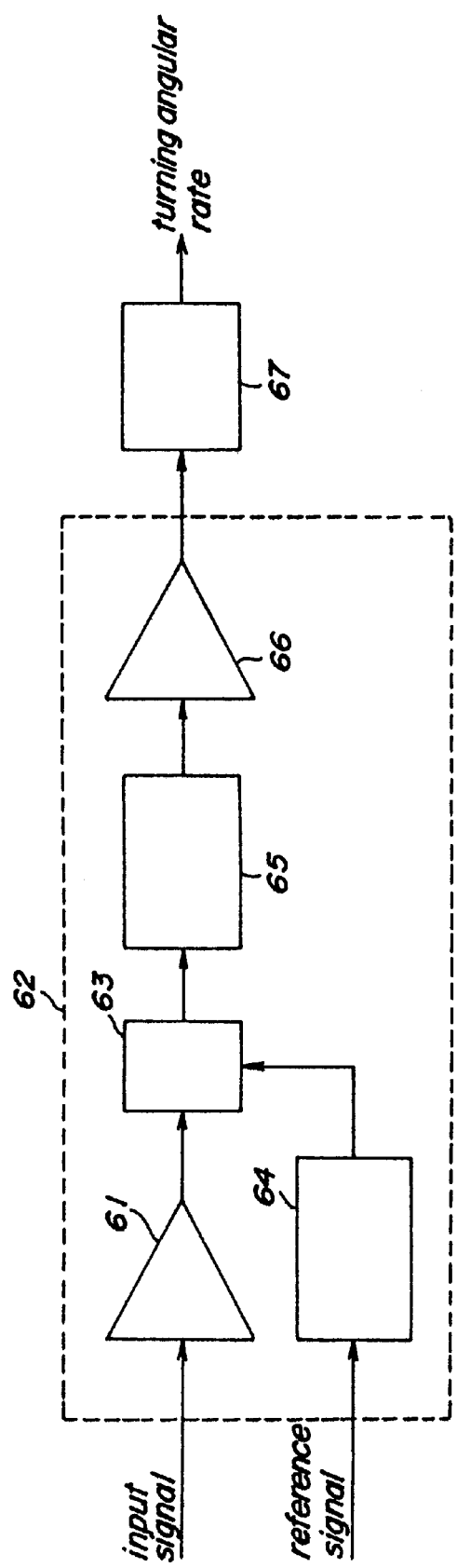

FIG. 44
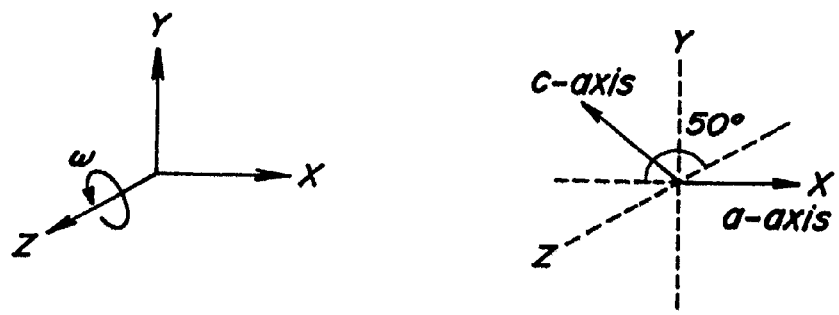
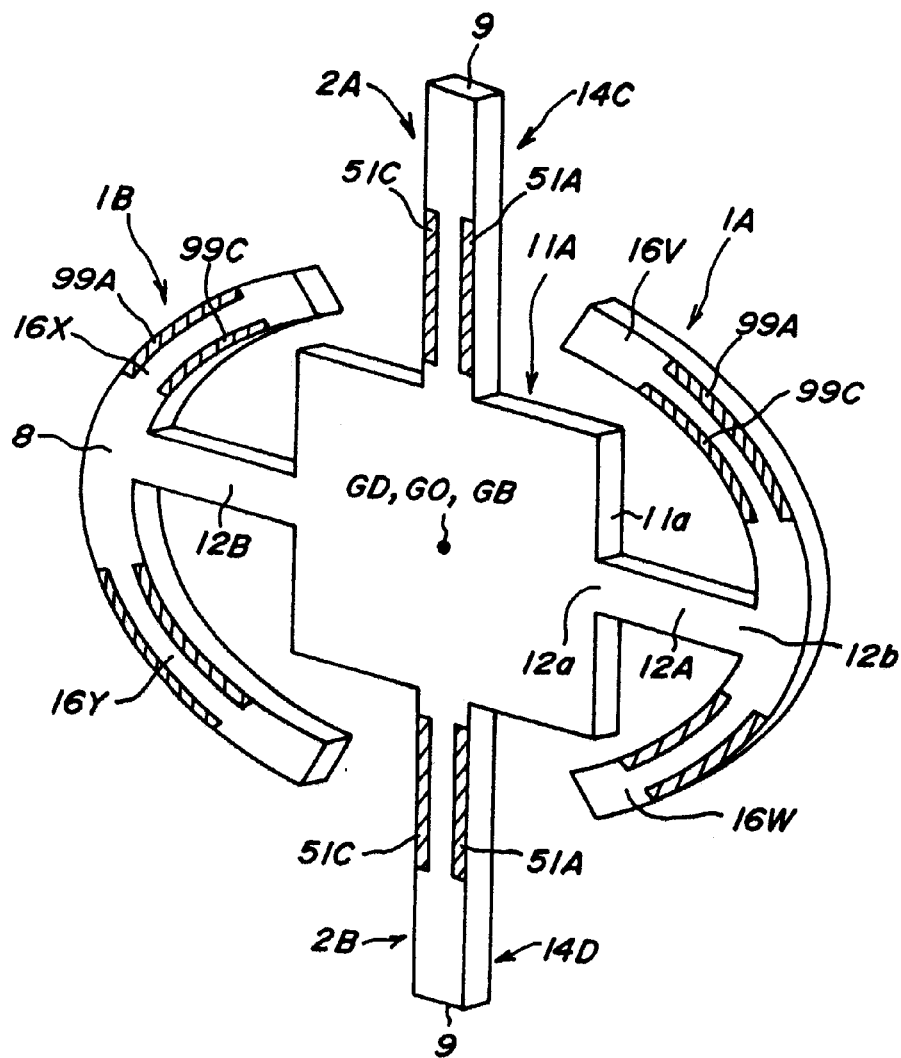

FIG_45

FIG_46

VIBRATORS, VIBRATORY GYROSCOPES, DEVICES FOR MEASURING A LINEAR ACCELERATION AND A METHOD OF MEASURING A TURNING ANGULAR RATE

CROSS REFERENCE TO RELATED APPLICATION

This is a continuation application of U.S. Ser. No. 09/181,554, filed Oct. 29, 1998, now U.S. Pat. No. 6,227,048, the entirety of which is incorporated herein by reference.

BACKGROUND OF THE INVENTION

This invention relates to a vibrator and a vibratory gyroscope used for an angular rate sensor measuring a turning angular rate in a turning system, a device for measuring a linear acceleration and a method of measuring a turning angular rate.

Up to now, as an angular rate sensor used for detecting a turning angular rate in a turning system, a vibratory gyroscope using a piezoelectric material has been used for detecting position of an aircraft, a ship and a space satellite. Recently, the gyroscope is used in a car-navigation system, a movement detecting mechanism in a VTR or a still camera.

Such a vibratory gyroscope utilizes a Coriolis force, which is generated when an angular movement is applied to a vibrating object in a direction perpendicular to the vibratory direction. Its mechanism may be understood by using a dynamic model (for example, "Handbook of Elastic Wave Device Technologies" (Danseiha-Sosi Gijutsu Handbook) published by Ohm, Inc., pp. 491 to 497). Various kinds of piezoelectric vibratory gyroscopes have been proposed. For example, a Sperry tuning-fork gyroscope, a Watson tuning-fork gyroscope, a regular-triangle prism-shaped tuning-piece gyroscope, a cylindrical tuning-piece gyroscope are known.

SUMMARY OF THE INVENTION

The inventors have studied various applications of vibratory gyroscopes, and have tried to use a vibratory gyroscope as a turning rate sensor in a car control system of an automobile body turning rate feedback system. Such a system detects the direction of a steering wheel itself by a turning angle of the wheel. At the same time, the system detects a turning rate of the actually turning car body by means of the vibratory gyroscope. Then the system determines a difference between the direction of the steering wheel and the actual body turning rate by comparing them with each other, and attains a stable body control by compensating a wheel torque and a steering angle on the basis of this difference.

However, any example of the above-mentioned former piezoelectric vibratory gyroscopes can detect a turning angular rate only when arranging its vibrator in parallel with the axis of turning (what is so called "vertical arrangement"). The turning axis of a turning system to be measured is usually perpendicular to the gyroscope mounting part. Accordingly, when mounting such a piezoelectric vibratory gyroscope, it has been impossible to shorten the piezoelectric vibratory gyroscope in height, namely, to reduce the piezoelectric vibratory gyroscope in size in the direction of the turning axis.

Recently, a piezoelectric vibratory gyroscope, capable of detecting a turning angular rate even when arranging a vibrator perpendicularly to the turning axis (so called "horizontal arrangement"), was proposed in a Japanese laid-open publication Tokkaihei No. 8-128833. However, even such a vibratory gyroscope has a limit to reduce the vibratory gyroscope in size in the direction of the turning axis.

An object of the invention is to provide a novel vibratory gyroscope comprising a vibrator extending in a given plane, and when the vibrator is subjected to a turning in the plane, the gyroscope being capable of detecting an angular velocity of the turning.

The invention provides a vibrator to be turned around a predetermined turning axis, the vibrator comprising at least plurality of vibration systems which are formed within a specified plane intersecting the turning axis, the plurality of vibration systems comprising a first vibration system whose vibration includes a radial vibration component, in which the center of gravity of the first vibration system vibrates in a radial direction in the specified plane with respect to the center of gravity of the vibrator, and a second vibration system whose vibration includes a circumferential vibration component, in which the center of gravity of vibration of the second vibration system vibrates in the specified plane circumferantially, that is, along a circle with the center of gravity of the vibrator as its center.

The invention also provides a vibrator comprising a base portion and a plurality of vibration systems, each vibration system extends radially from the edge of the base portion, the base portion and the vibration systems extend in a specified plane.

The invention also provides a vibratory gyroscope for detecting a turning angular rate in a turning system, comprising said vibrator, an exciting means provided in one of a first vibration system and a second vibration system for exciting a driving vibration in the vibrator, and a detecting means provided in the other of the first vibration system and the second vibration system for detecting a detecting vibration in the vibrator when the vibrator is turned.

The invention also provides a vibratory gyroscope comprising a vibrator, an exciting means for exciting a driving vibration in the vibrator and a detecting means for detecting a detecting vibration in the vibrator when the vibrator is turned, wherein the vibrator comprises a plurality of vibration systems extending in a specified plane intersecting a turning axis, the exciting means being provided in at least one of the vibration systems, and the detecting means being provided in at least one of the vibration systems in which the exciting means is not provided.

The invention also provides a vibratory gyroscope comprising a vibrator, an exciting means for exciting a driving vibration in the vibrator and a detecting means for detecting a detecting vibration in the vibrator when the vibrator is turned, the vibrator extending in a specified plane and comprising a plurality of vibration systems, the exciting means and the detecting means being provided in the different vibration systems, the center of gravity of the whole driving vibration in the vibrator being positioned within a domain near the center of gravity of the vibrator.

The invention also provides a vibratory gyroscope for detecting a turning angular rate in a turning system, the vibratory gyroscope comprising a vibrator to be subjected to a turning around a specified turning axis, exciting means for exciting a driving vibration in the vibrator and detecting means for detecting a detecting vibration in the vibrator when turning the vibrator, the vibrator extending in a specified plane and comprising a plurality of vibration systems, the exciting means and the detecting means being provided in the different vibration systems, the center of gravity of the vibrator being located within a domain in which displacements caused by the driving vibration are small when exciting the driving vibration in the vibrator.

The invention also provides a vibratory gyroscope for detecting a turning angular rate in a turning system, the vibratory gyroscope comprising a vibrator to be subjected to a turning around a specified turning axis, exciting means for exciting a driving vibration in the vibrator and detecting means for detecting a detecting vibration in the vibrator according to the turning of the vibrator, the vibrator extending in a specified plane and comprising a plurality of vibration systems, the exciting means and the detecting means being provided in the different vibration systems, and the center of gravity of the vibrator being located within a domain in which displacements caused by the detecting vibration are small when the detecting vibration is induced in the vibrator.

The invention also provides a method of detecting a turning angular rate around a turning axis in a turning system comprising a vibrator, the vibrator comprising a plurality of driving vibration systems and at least one detecting vibration system extending in a specified plane intersecting the turning axis, the method comprising:

turning the vibrator around the turning axis and exciting driving vibrations in the driving vibration systems at the same time to cancel at least parts of the excited driving vibrations with each other; and detecting a detecting vibration induced in the detecting vibration system.

The invention also provides a method of detecting a turning angular rate around a turning axis in a turning system comprising a vibrator, the vibrator comprising a plurality of vibration systems extending in a specified plane intersecting the turning axis, the method comprising:

exciting at least radial vibration component in at least one of the vibration systems, the radial vibration component being a vibration in a radial direction in the specified plane with respect to the center of gravity of the vibrator;

exciting a Coriolis force in the circumferential direction based on the radial vibration component when turning the vibrator; and;

detecting a detecting vibration, in the vibrator according to the Coriolis force, within the other vibration system.

The invention also provides a method of detecting a turning angular rate around a turning axis in a turning system comprising a vibrator, the vibrator comprising a plurality of vibration systems extending in a specified plane intersecting the turning axis, the method comprising;

exciting at least a circumferential vibration component in at least one of the vibration systems, the circumferential vibration component being a vibration in the specified plane along a circle with the center of gravity of the vibrator as its center;

exciting a Coriolis force in the radial direction based on the circumferential vibration component when turning the vibrator; and detecting a detecting vibration, in the vibrator according to the Coriolis force, within the other vibration system.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 2(a) and 2(b) are diagrams schematically showing examples of vibration mode in first vibration systems;

FIGS. 4(a) and 4(b) are diagrams schematically showing examples of vibration modes in second vibration systems;

FIG. 18 is a plan view schematically showing a vibrator according to another embodiment of the invention;

FIG. 19(a) is a line diagram schematically showing the driving vibration mode of the vibrator of FIG. 18;

FIG. 19(b) is a line diagram schematically showing the detecting vibration mode thereof;

FIG. 36 is a perspective view showing a vibrator embodying the vibrator of FIG. 24;

FIGS. 37(a) and 37(b) are cross-sectional views each showing electrodes for driving or detecting provided in each bending-vibration piece in the vibrator of FIG. 36;

FIGS. 39(a) and 39(b) are cross-sectional views each showing electrodes for driving or detecting provided in each bending-vibration piece in the vibrator of FIG. 38;

FIG. 40 is a perspective view showing a vibrator embodying the vibrator of FIG. 24;

FIGS. 41(a) and 41(b) are cross-sectional views each showing electrodes for driving or detecting provided in each bending-vibration piece in the vibrator of FIG. 40;

FIG. 42 is a block diagram showing an example of a phase-difference detecting means 62 used in measuring a turning angular rate;

FIG. 44 is a perspective view schematically showing a gyroscope of another example of the invention, in which a bending-vibration piece for driving is curved;

DETAILED DESCRIPTION OF THE INVENTION

The inventors have studied basic principles of vibrators used in vibratory gyroscopes, and successfully developed a vibrator and a vibratory gyroscope based on a totally novel principle, which will be described referring to FIGS. 1 to 10.

"O" is a crossing point of a turning axis "Z" and a specified plane of a vibrator, or the center of the turning. "GO" is the center of gravity of the vibrator as a whole when the vibrator is not vibrated. "GD" is the center of gravity of the vibrator during a driving vibration. "GB" is the center of gravity of the vibrator during a detecting vibration. A plurality of vibration systems are provided around the centers of gravity "GD" and "GO". The embodiments described referring to FIGS. 1 to 10 comprise four vibration systems, however, whose number may be varied.

Figure 1:
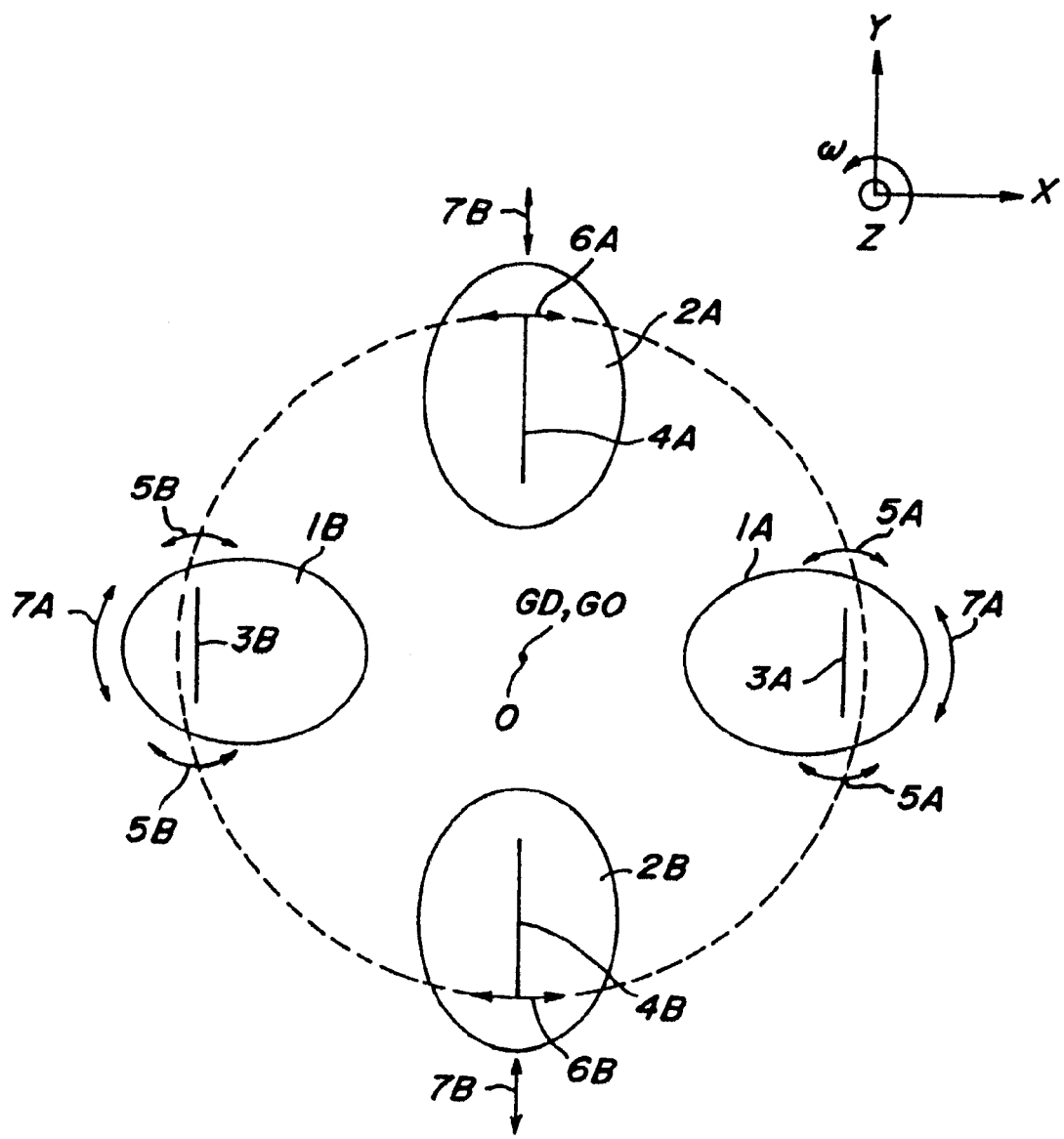
FIG. 1 is a diagram for explaining the principles of the inventive gyroscopes.

As shown in FIG. 1, first and second vibration systems 1A and 1B are provided around the center of gravity GO and GD and in positions identical with each other after turning the positions around the center of gravity GO. The vibrations of the systems 1A and 1B comprises radial vibration components 5A and 5B with respect to the center of gravity GO. Second vibration systems 2A and 2B are further provided around the center GO. The vibrations of the systems comprise circumferential vibration components 6A and 6B with respect to the center GO.

The circumferential vibration component is a vibration component within the specified plane in the circumferential direction, that is, along a circle with the center of gravity GO as its center. The radial vibration component is a vibration component in the radial direction with respect to the center GO of gravity within the specified plane, that is, a vibration component approaching and withdrawing from the center GO in turn.

All the above first and second vibration systems are connected with each other by means of a connecting portion to form a vibrator extending within the specified plane. Such a vibrator is subjected to turning around the turning axis "Z" as an arrow "ω" to detect the turning angular rate.

For example, when subvibrators 3A and 3B in first vibration systems 1A and 1B are used as driving subvibrators, the radial vibration components 5A and 5B are used as the driving vibration and the vibrator is subjected to turning, Coriolis force 7A exerts on the vibrator to cause circumferential vibration components 6A and 6B within the subvibrator 4A and 4B in second vibration system 2A and 2B. The vibration components 6A and 6B may be detected to obtain its indication, from which a turning angular rate may be calculated.

When subvibrators 4A and 4B in second vibration systems are used as driving subvibrators and the circumferential vibration components 6A and 6B are used as the driving vibration, Coriolis force 7B exerts on the vibrator to induce radial vibration components 5A and 5B within the subvibrator 3A and 3B in first vibration system 1A and 1B. The vibration components 5A and 5B may be detected to obtain its indication, from which a turning angular rate may be calculated.

According to the vibrator and gyroscope of the invention, a driving vibration and a detection vibration are generated in a specified plane, and the invention can detect a turning angular rate at a sufficiently high sensitivity without providing a projection of a certain weight projecting from the vibrator in the direction of the axis of turning, in case of setting up the vibrator so that bending-vibration pieces of the vibrator extend perpendicularly to the axis of turning.

Moreover, in prior vibratory gyroscopes, a driving vibration generated in a driving vibration arm may influence a detecting arm and generate noise in a detecting signal excited in the detecting arm. However, the vibrator of the invention comprises a driving and detecting vibration systems both extending radially from the center of gravity of the vibrator so that the driving vibration induced in the vibrator hardly influences the detecting vibration system. That is, the driving vibration is buffered or cancelled to reduce the influence of the driving vibration on the detecting vibration system, so that noise that has been inevitably induced in the detection signal may be prohibited or prevented. These inevitable and inherent problems in vibratory gyroscopes may be solved by the invention.

Figure 6:
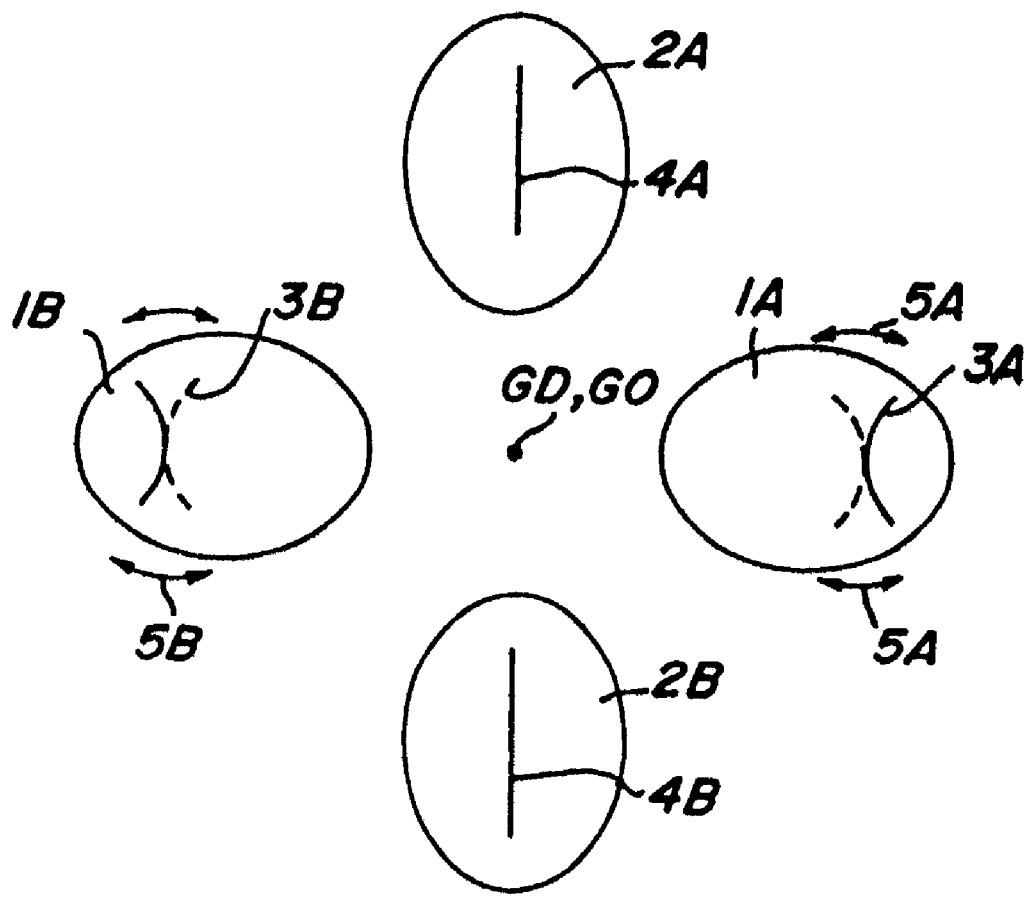
FIG. 6 is a diagram for explaining the position of the center of gravity GD of driving vibrations induced in a vibrator.

Further, as shown in vibrators of FIG. 1 or 6, for example, radial vibration components 5A and 5B induced within first vibration systems 1A and 1B are utilized as the driving vibrations, first vibration systems are provided in positions being identical with each other when turning the positions around the center of gravity GO of the vibrator, so that each driving vibration induced in each driving vibration system cancel with each other. The influence of the driving vibration exerted on second vibration systems for detecting may be reduced.

Thus, the vibrator of the invention comprises a plurality of first vibration systems, whose positions are substantially identical after turning them around the center of gravity GO. For example, as shown in FIGS. 1 and 6, first vibration systems 1A and 1B are provided in positions being dyad-symmetrical around the center of gravity GO.

Moreover, a plurality of second vibration systems may be preferably provided, whose positions are substantially identical after turning them around the center of gravity GO. For example, as shown in FIGS. 1 and 6, second vibration systems 2A and 2B are provided in positions being dyad-symmetrical around the center of gravity GO.

"Vibration systems are provided in positions substantially identical after turning them around the center of gravity GO" means that the adjacent vibration systems are located at a predetermined angle around the center of gravity GO in the specified plane. Therefore, when one vibration system is turned a predetermined angle around the center of gravity in the specified plane, the turned system is located in a position in which the adjacent vibration system is provided. For example, in FIGS. 1 and 6, first vibration systems 1A is provided in a position distant 180° from a position of the system 1B and identical after turning 180° the position of the system 1B.

The vibration systems are preferably provided in positions being dyad-, triad-, or quad-symmetrical with respect to the center of gravity GO. When driving systems comprise either of first or second vibration systems, a plurality of the driving vibration systems may be in positions, which are substantially identical with each other after turning them around the center of gravity GO, to reduce the influence on relatively small detecting vibration, thereby improving the effects of the invention.

Especially, the center of gravity GD of whole vibration in the driving vibration systems (for example, first vibration systems) may preferably be located within a domain near the center of gravity GO, so as to reduce the influence on the detecting vibration systems (for example, second vibration systems). That is, as schematically shown in FIG. 6, when vibrations in subvibrators 3A and 3B in vibration systems 1A and 1B comprise radially vibrating components 5A and 5B, the components are in inverse phase to cancel the components 5A and 5B.

"The center of gravity GD is located within a domain near the center of gravity GO of the vibrator" means that the center of gravity GD may substantially exist on the center GO, or is located within a circle having GO as its center and a diameter of 1 mm.

In the vibratory gyroscope of the invention, when one of a first and second vibration system is a driving vibration system, the other is a detecting vibration system. Especially, the inventive vibrator may comprise a plurality of driving vibration systems, in which one driving vibration system is located in a position 90° distant from the adjacent driving vibration system, and a detecting vibration system or systems may preferably be provided between the adjacent driving vibration systems. The driving vibrations in the driving vibration systems cancel each other to reduce the influence on the detecting vibration system.

While the inventive vibrator comprises a plurality of vibration systems extending in a specified plane, the plurality of the vibration systems may actually be provided within a plate-shaped space of thickness of 1 mm including the specified plane. Moreover, the portions other than the plurality of vibration systems of the vibrator may be protruded from the specified plane or the above space, although the whole of the vibrator may preferably be formed in a specified plane.

An angle at a specified plane and a turning axis may preferably be 60 to 120°, more preferably be 85 to 95°, and most preferably a right angle.

In the invention, actual shapes or forms or components of first and second vibration systems are not limited. In preferred embodiments, each vibration system comprises a bending-vibration piece or pieces within. Referring to FIGS. 2 to 5, embodiments mainly using such pieces will be described.

In FIG. 2(a), bending-vibration pieces 13A and 13B are provided in first vibration systems 1A and 1B as the subvibrators 3A and 3B, respectively (refer to FIG. 1). The bending-vibration piece of the present embodiment comprises a fixing portion 8 in its central portion and open ends 9 on both side thereof. Consequently, the open ends of each piece 13A or 13B vibrate around the fixing portion 8. Among the vibrations of the pieces 13A and 13B, radial vibration components 5A and 5B are utilized.

In FIG. 2(b), bending-vibration pieces 23A and 23B are provided in first vibration systems 1A and 1B. The bending-vibration pieces of this embodiment comprise both end portions connected and fixed with fixing portion 8. Consequently, the central portions of each piece 23A or 23B mainly vibrates.

Figure 3:
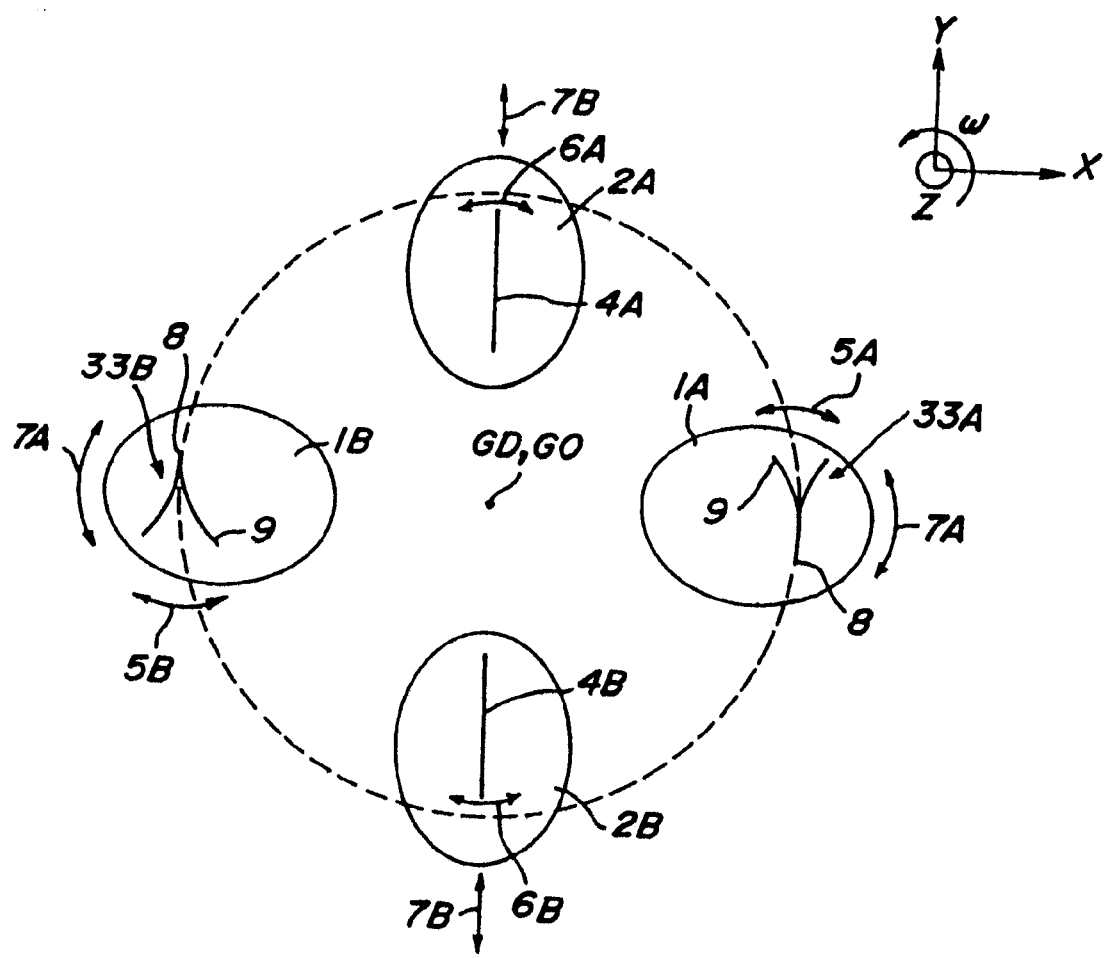
FIGS. 3 is a diagram schematically showing examples of vibration modes in first vibration systems.

In FIG. 3, bending-vibration pieces 33A and 33B are provided in first vibration systems 1A and 1B, respectively. The vibrator of the present embodiment comprises one end fixed and the other end not fixed. Consequently, the other ends of the pieces 33A and 33B vibrate mainly. The phases and amplitudes of the vibrations in the pieces 33A and 33B, and positions of the open ends are designed so that the vibrations in the pieces 33A and 33B cancel each other.

In FIG. 4(a), while first vibration systems 1A and 1B are described in FIG. 1, bending-vibration pieces 14A and 14B are provided in second vibration systems 2A and 2B, respectively. The bending-vibration pieces of the embodiment comprises a fixing portion 8 in a position near the center of gravity GO of the vibrator, and the end distant from the center GO is not fixed. Consequently, the end of each piece 14A or 14B distant from the center of gravity GO vibrates in the circumferential direction around the center.

In FIG. 4(b), while first vibration systems 1A and 1B are described in FIG. 1, bending-vibration pieces 24A and 24B are provided in second vibration systems 2A and 2B, respectively. Each bending-vibration piece comprises a fixing portion 8 in one end distant from the center of gravity GO and the other end near the center GO not fixed. Consequently, the end of each piece 24A or 24B near the center GO mainly vibrates. While the vibrations comprise substantially circumferential vibration components 6A and 6B, they also comprise radial-vibration components.

Figure 5A:
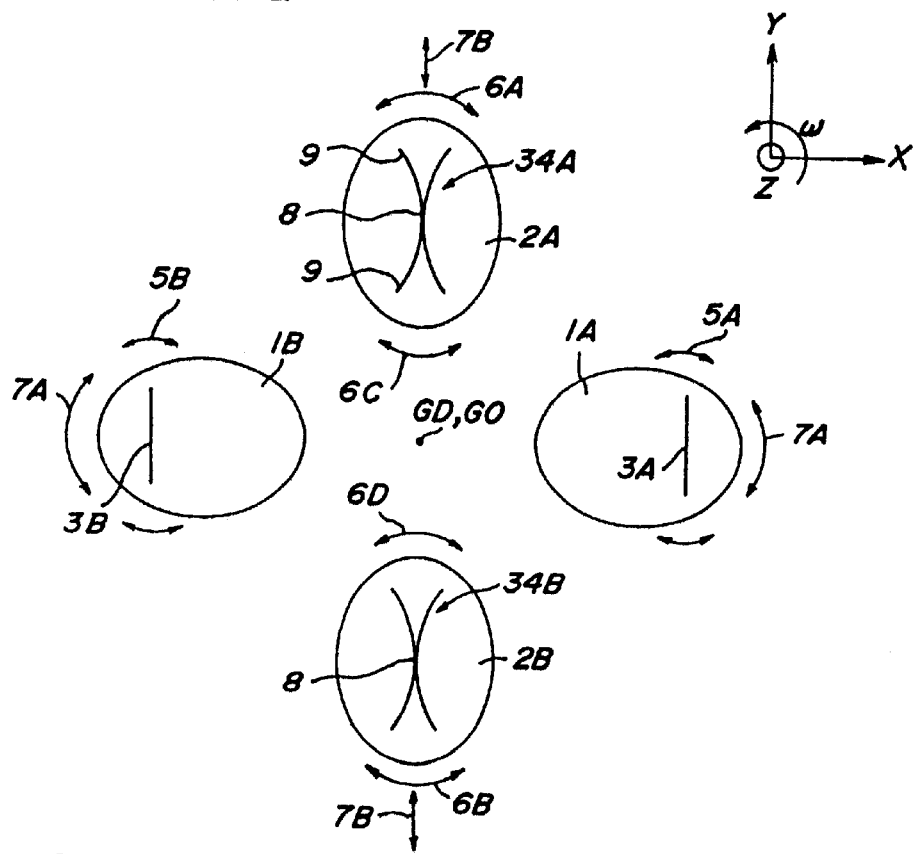
FIGS. 5(a) and 5(b) are diagrams schematically showing another examples of vibration modes in second vibration systems.

In FIG. 5(a), bending-vibration pieces 34A and 34B are provided in second vibration systems 2A and 2B, respectively. The bending-vibration piece of the embodiment comprises a fixing portion 8 in its central portion and both ends not fixed. Consequently, both ends of the bending-vibration piece 34A and 34B vibrate as arrows 6A, 6B, 6C and 6D.

Figure 5B:
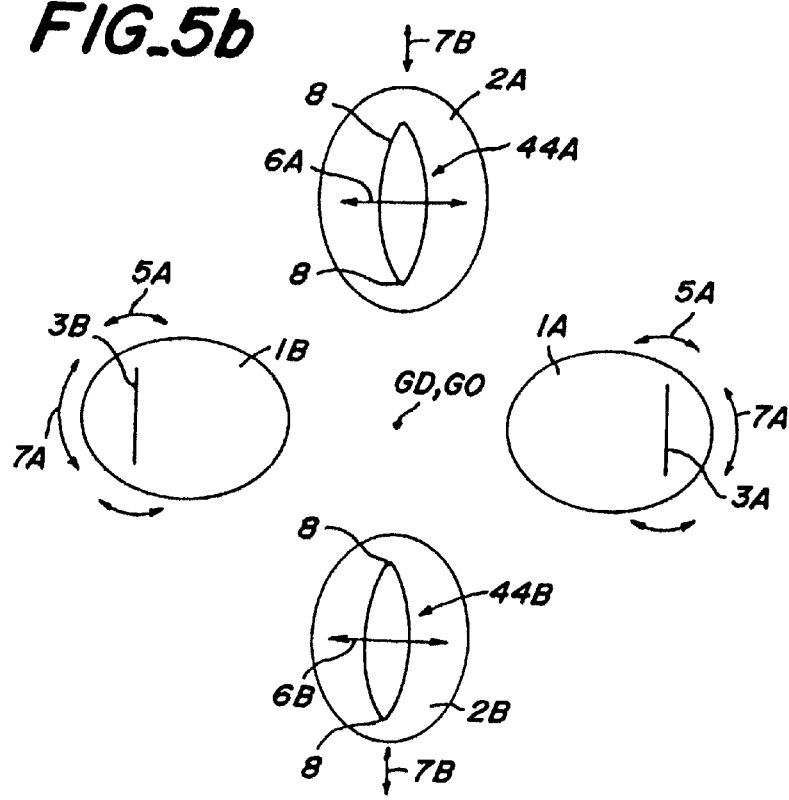

In FIG. 5(b), second vibration systems 2A and 2B comprise bending-vibration pieces 44A and 44B, respectively. The bending-vibration piece of the embodiment comprises both ends fixed with fixing portions 8. Consequently, each piece 44A or 44B mainly vibrates in the central portion.

While, in FIG. 1, the center of turning O (a crossing point of a turning axis and a specified plane) is on a position identical with that of the center of gravity GO of the vibrator and center of gravity GD of the whole driving vibration, the center of turning O is not shown in the vibrators of FIGS. 2 to 6. The reason is described below. When the center of turning O is not on a position of the center of gravity GO of the vibrator, and even when the center of turning O is outside the vibrator itself, the inventive vibrator may also be used for vibratory gyroscopes of the invention. Because, when turning the vibrator, a displacement of each portion of the vibrator, where the center of turning O is not identical with the center of gravity GO, is a vector sum of a displacement of each portion of the vibrator, where the center of turning O is identical with the center of gravity GO (the displacement is due to the turning), and a displacement due to translational movement of each portion thereof. Coriolis force does not apply on the displacement due to the translational movement and does not induce any effects on the detection of a turning angular rate by the vibratory gyroscope.

One embodiment of the invention provides a vibrator comprising a base portion and a plurality of vibration systems separated from each other, each system extending radially from the peripheral portion of the base portion, wherein the base portion and the vibration systems extend in a specified plane. Alternately, the center of gravity GO of the vibrator is located in a base portion and preferably, one of first vibration system and second vibration system extends from the base portion, in which case, first and second vibration systems may extend radially from the base portion.

Figure 7:
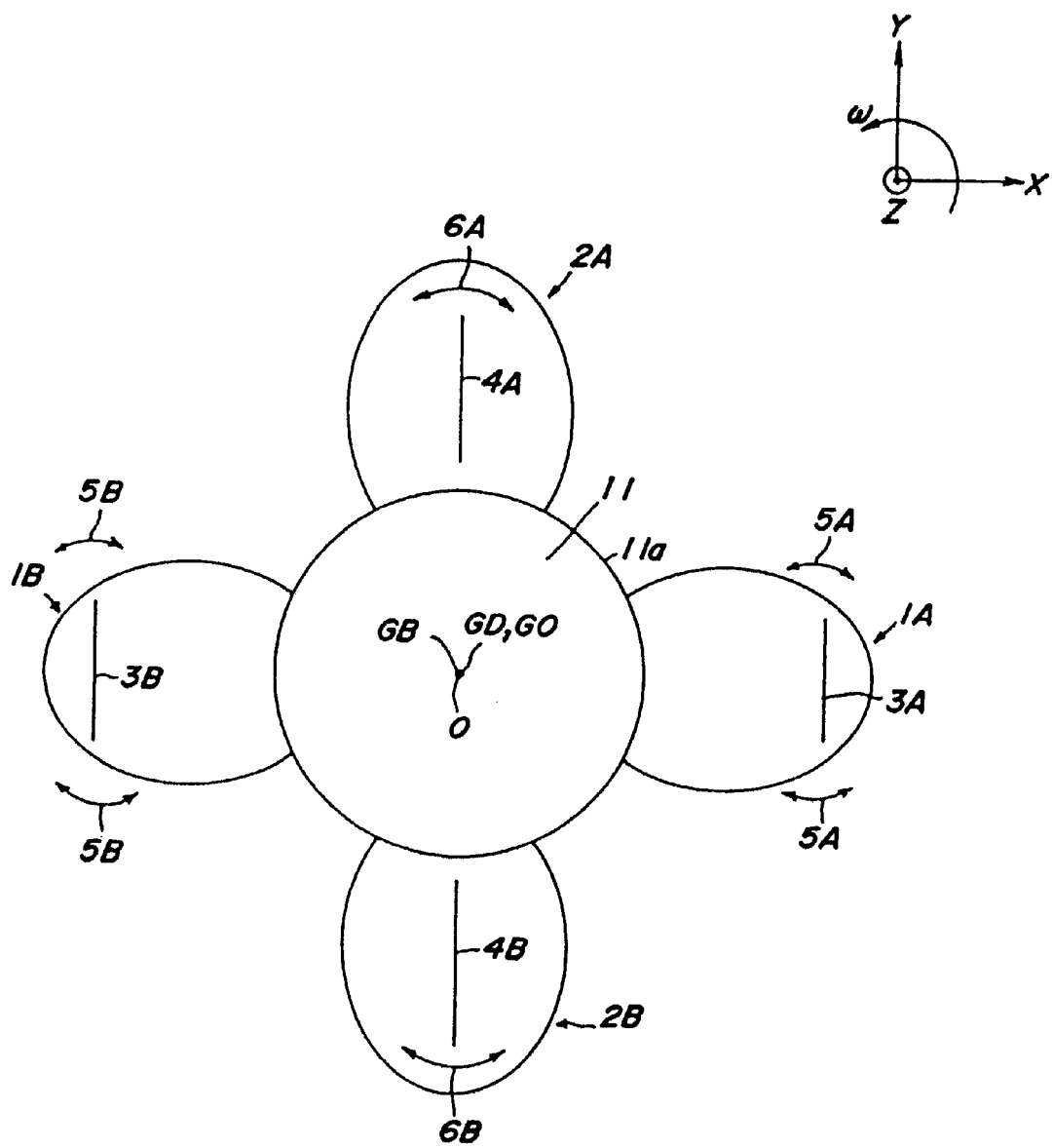
FIG. 7 is a diagram schematically showing a vibratory gyroscope according to one embodiment in which vibration systems protrude radially from a base portion.

These embodiments will be described below referring to FIG. 7, in which 11 is a base portion and first vibration systems 1A and 1B and second vibration systems 2A and 2B protrude radially from the peripheral part 11a of the base portion 11.

In the embodiment, vibration systems extend from the peripheral part of the base portion. However, the vibration systems do not necessarily extend radially with respect to the center of the base portion, and may extend from the peripheral part of the base portion away from the center of gravity GO.

For example, the first vibration system comprises a supporting portion protruding radially from the peripheral part of the base portion and a bending-vibration piece or pieces extending in a direction intersecting the supporting portion. The second vibration system comprises a bending-vibration piece or pieces protruding radially from the peripheral part of the base portion. A weight may be provided in the bending-vibration piece to reduce a whole length of the piece.

Figure 8:
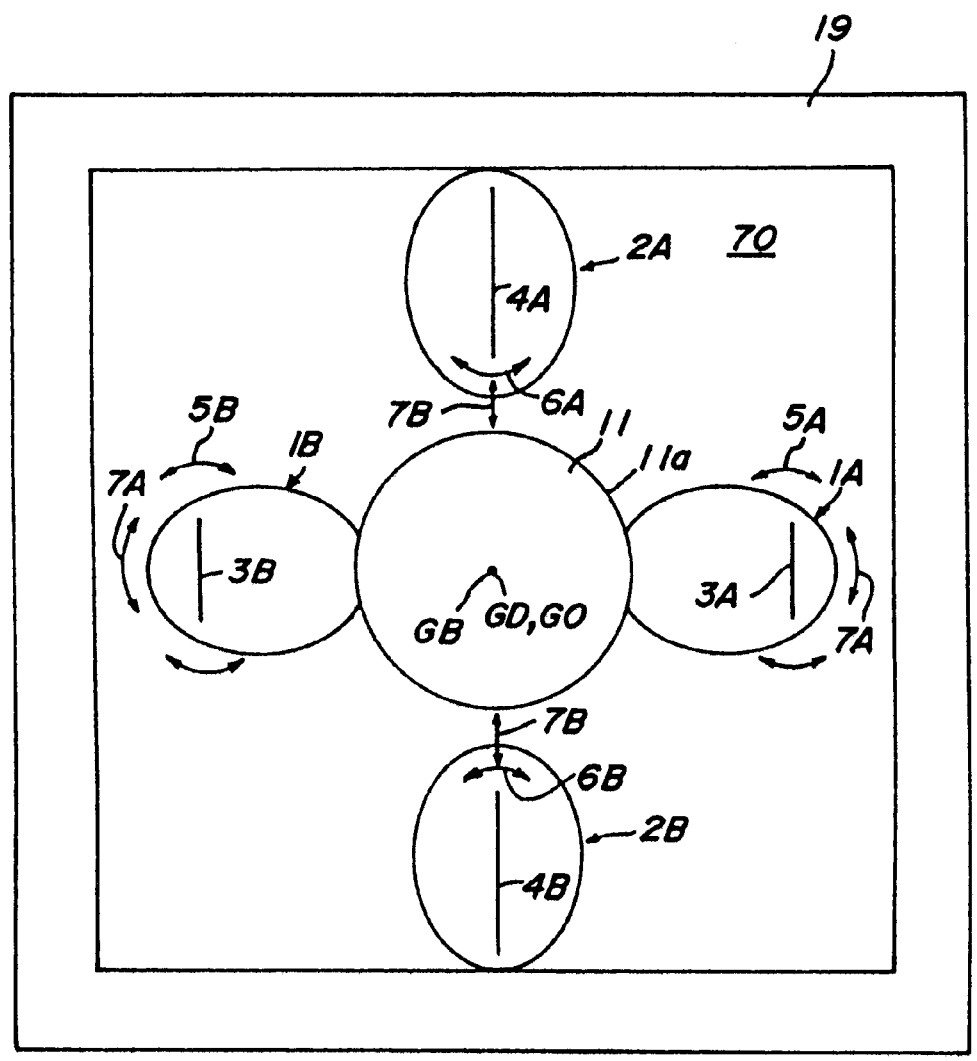
FIG. 8 is a diagram schematically showing a vibrator in which first vibration systems protrude from a base portion and second vibration systems protrude inwardly from a frame portion.
Figure 9:
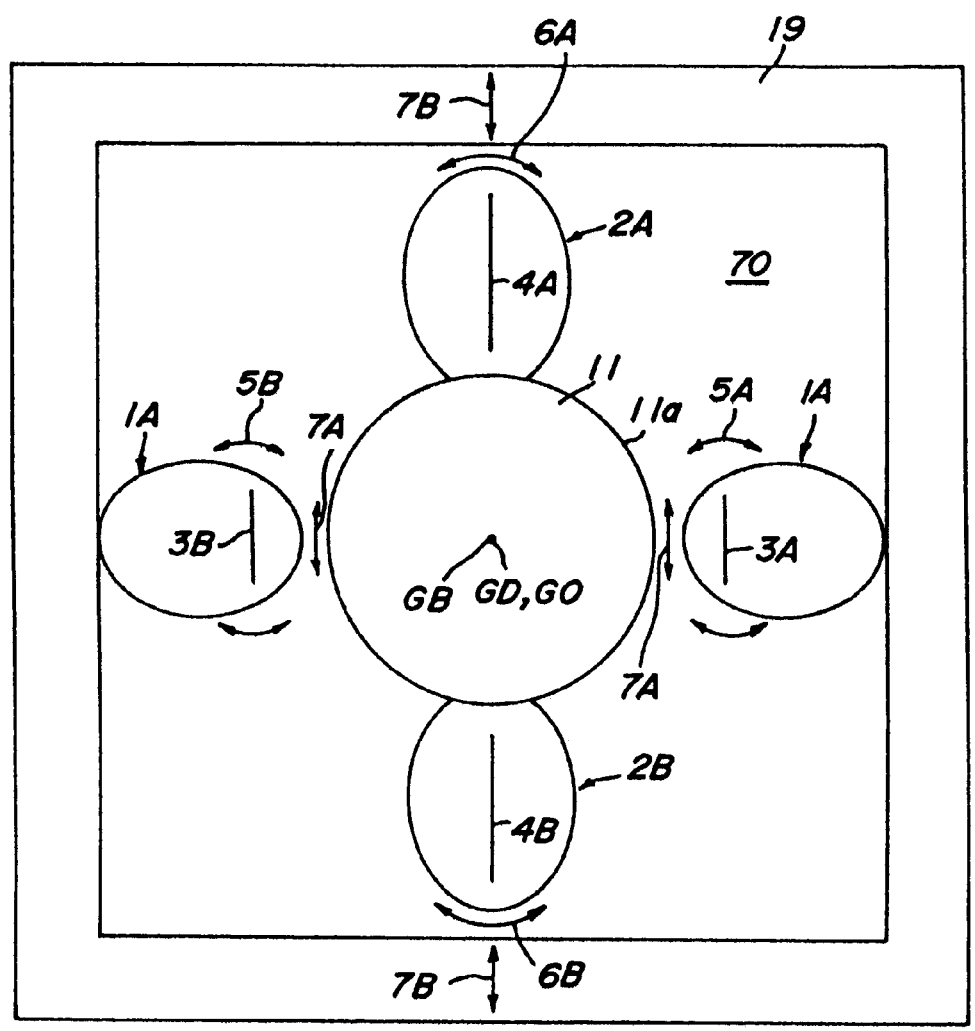
FIG. 9 is a diagram schematically showing a vibrator in which second vibration systems protrude from a base portion and first vibration systems protrude inwardly from a frame portion.
Figure 10:
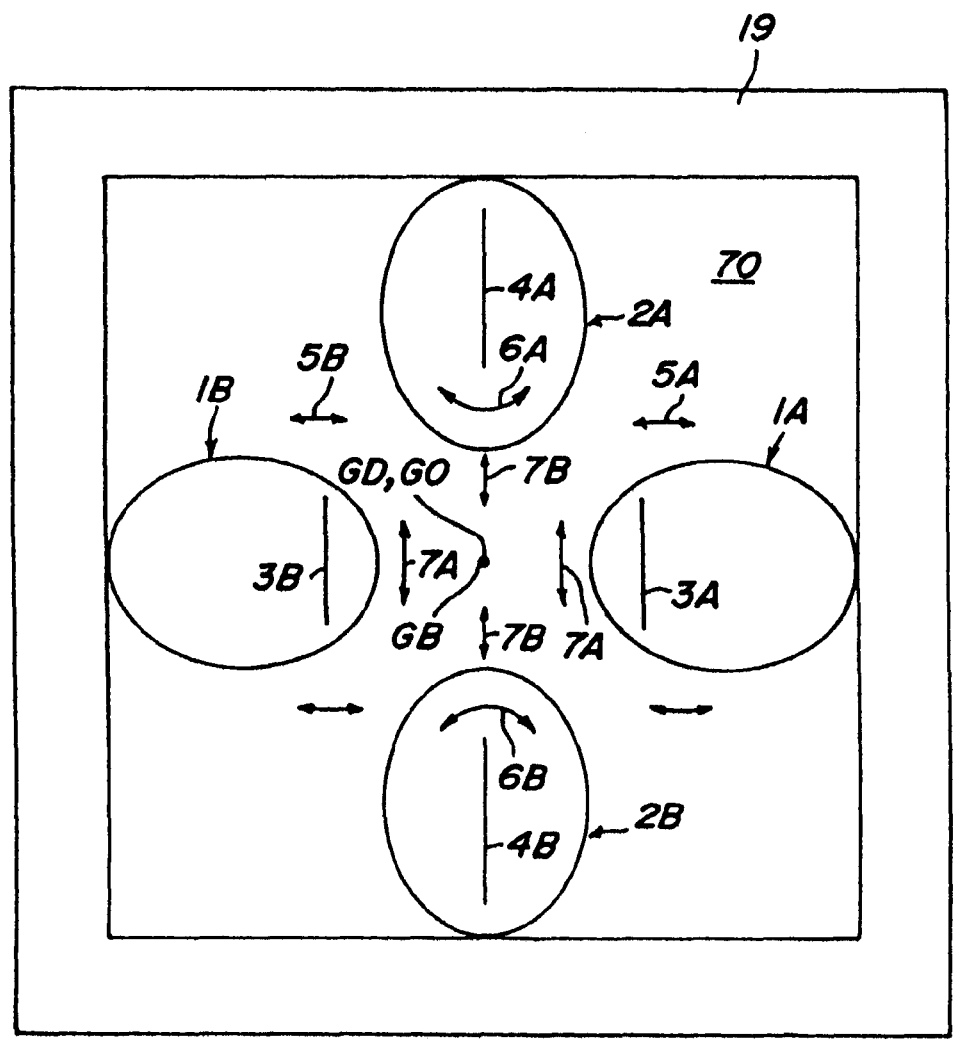
FIG. 10 is a diagram schematically showing a vibrator in which first and second vibration systems together protrude inwardly from a frame portion.

Moreover, the inventive vibrator may comprises a frame portion in which a hollow portion formed and at least one of a driving vibration system or a detecting vibration system extends from the inner surface of the hollow portion. FIGS. 8 to 10 relate to the embodiments.

In FIG. 8, a base portion 11 is provided within a hollow portion 70 inside a frame portion 19. Second vibration systems 2A and 2B protrude from the frame portion 19 towards the base portion 11 and first vibration systems 1A and 1B extend from the peripheral part of the base portion 11 away from the center of gravity GO.

In FIG. 9, a base portion 11 is provided within a hollow portion 70 inside a frame portion 19. First vibration systems 1A and 1B protrude from the frame portion 19 towards the base portion 11 and second vibration systems 2A and 2B extend from the peripheral part of the base portion 11 away from the center of gravity GO.

In FIG. 10, the base portion 11 is not provided within the hollow portion 70 inside the frame portion 19. First vibration systems 1A and 1B and second vibration systems 2A and 2B protrude towards the center of gravity GO inside the frame portion 19.

Preferably, a ratio, between each of radial vibration component and circumferential vibration component of the vibration induced in each vibration system, is as follows.

(A) A ratio between amplitudes of the radial vibration component and circumferential vibration component in the first vibration system may preferably be 1:0 to 3, and more preferably be 1:0 to 1, and a ratio between amplitudes of the radial vibration component and circumferential vibration component in the second vibration system may preferably be 0 to 1:5, and more preferably be 0 to 1:10, provided that each amplitude of the radial vibration component or circumferential vibration component in each vibration system is measured without canceling the vibration components having inverse phases existing in each vibration component.

(B) A ratio between amplitudes of the radial vibration component and circumferential vibration component in the first vibration system may preferably be 5:0 to 1, and more preferably be 10:0 to 1, and a ratio between amplitudes of the radial vibration component and circumferential vibration component in the second vibration system may preferably be 0 to 1:5, and more preferably be 0 to 1:10, provided that each amplitude of the radial vibration component or circumferential vibration component in each vibration system is measured after canceling the vibration components having inverse phases existing in each vibration component.

The specific examples of the invention will be explained below.

Since displacement of the vibrator of the invention occurs in the specified plane, the whole vibrator may be made of the same piezoelectric single crystal. In this case, the whole vibrator can be made by making a single crystal thin plate and processing this plate by means of etching or grinding. Each portion of the vibrator may be the different part joined together to form it, although the whole vibrator may preferably be an integral body.

When forming the vibrator by an etching process from a thin plate, for example a thin plate made of a piezoelectric single crystal such as quartz, a projection of a particular shape, such as an elongated projection, may be formed on the surface of each constituent piece, such as a bending vibration piece, of the vibrator. Such projection might change the symmetrical shape of the design of the vibrator. However, such projection may be present in the vibrator. The height of the projection may preferably lower, for example not higher than 1/5 of the width of the constituent piece with the projection formed, generally causing substantially no adverse effects. This may be true when the other portion changing the symmetrical design other than the projection exists within the vibrator, which portion may be produced during processes other than etching.

When the portions such as projections exist within a vibrator, a part of the projection may be deleted or the other portions of the vibrator may be deleted by means of a laser processing so that the shape of the vibrator may be adjusted and the center of gravity of the whole driving vibration piece is located within a domain near the center of gravity of the vibrator.

Although a material for the vibrator is not limited in particular, it is preferable to use a single crystal of quartz, $LiNbO_3$, $LiTaO_3$, a solid solution of lithium niobate-lithium tantalate $(Li(Nb, Ta)O_3$, langasite and lithium tetraborate.

Among the above-mentioned single crystals, single crystals of $LiNbO_3$, $LiTaO_3$ and a solid solution of lithium niobate-lithium tantalate have particularly large electromechanical coupling coefficients. Comparing single crystals of $LiNbO_3$ and $LiTaO_3$ with each other, the single crystal of $LiTaO_3$ has a better thermal stability than that of $LiNbO_3$.

The sensitivity may be improved and the detection noise may be reduced by using such a piezoelectric single crystal. And since a single crystal is particularly insensitive to a temperature change, it is suitable for a sensor used in a car which sensor needs thermal stability. The reason will be further described.

As an angular rate sensor using a tuning-fork vibrator, there is for example a piezoelectric vibratory gyroscope disclosed in the above-mentioned Japanese laid-open publication Tokkaihei No. 8-128833. In such a vibrator, however, the vibrator vibrates in two directions. Therefore, particularly in case of forming the vibrator out of such a single crystal as described above, it is necessary to match the characteristics of the single crystal in the two directions with each other. In practice, however, a piezoelectric single crystal is anisotropic.

Generally in a piezoelectric vibratory gyroscope, in order to keep a good sensitivity, it is required to keep a constant vibration frequency difference between natural resonance frequencies of a drive vibration mode and of a detection vibration mode. However, a single crystal is anisotropic and a degree of variation in vibration frequency caused by a temperature change varies with the crystal face. For example, although variation in vibration frequency caused by a temperature change is very little in case of cutting a single crystal along a specific crystal face, variation in vibration frequency is very sensitive to a temperature change in case of cutting the single crystal along another crystal face. Thus, in case that a vibrator vibrates in two directions, at least one of the two vibrating faces is a crystal face having a large variation in vibration frequency caused by a temperature change.

On the other hand, as shown in the invention, by making the whole of a vibrator vibrate in a specified plane and forming the vibrator out of a piezoelectric single crystal, it is possible to prevent the vibrator from being influenced by anisotropy of a single crystal as described above and use only the best crystal face in characteristics of the single crystal in the vibrator.

Concretely, since every vibration of a vibrator takes place in a single plane, it is possible to manufacture a vibrator using only a crystal face having little variation in vibration frequency caused by a temperature change of a single crystal. Therefore, it is possible to provide a vibratory gyroscope having very high thermal stability.

When the vibrator of the invention is formed by a piezoelectric material, a driving electrode and a detecting electrode is formed within the vibrator. Such material includes a piezoelectric ceramics such as lead zirconate titanate (PZT), relaxer compounds (general expression: $Pb(A1/3B2/3)O_3$ where A is Cd, Zn, Mg or the like, and B is Nb, Ta, W or the like), other than the piezoelectric single crystal.

The vibrator of the invention may be formed by an invariable elasticity metal such as elinvar. In this case, piezoelectric bodies are provided on predetermined positions of the vibrator.

Figure 11:
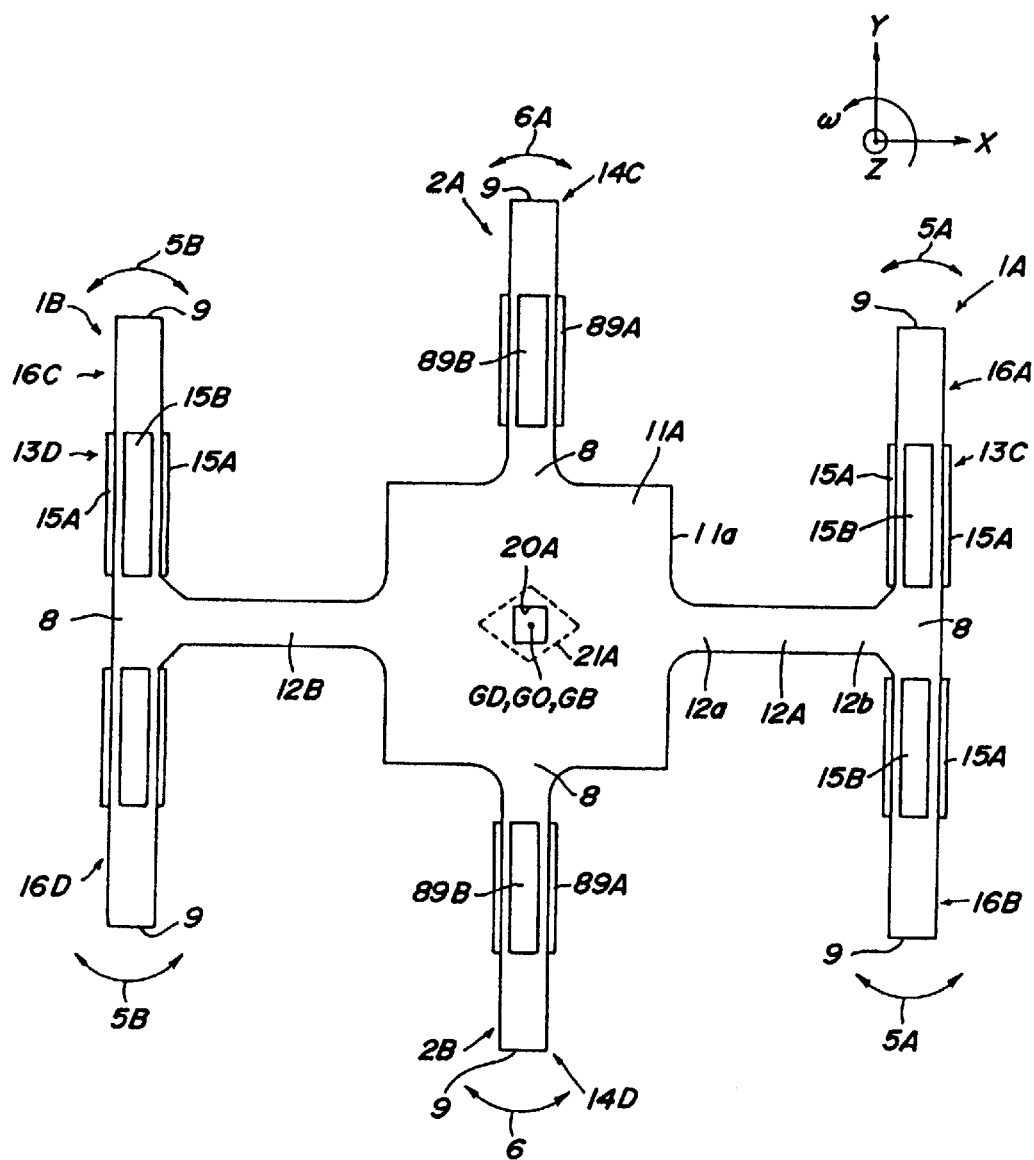
FIG. 11 is a plan view schematically showing a vibrator according to another embodiment of the invention.

FIG. 11 is a plan view roughly showing a vibratory gyroscope provided with a vibrator made of a piezoelectric single crystal according to this embodiment. A base portion 11A is in the shape of a tetrad-symmetric square with the center of gravity GO of the vibrator as the center. Two driving vibration systems 1A, 1B (first vibration system in this example) and two detecting vibration systems 2A, 2B (the second vibration system in this example) project from the peripheral part 11a of the base portion 11A radially in four directions, and the respective vibration systems are separated from one another. The driving vibration systems 1A and 1B are dyad-symmetric with the center of gravity GO as the center, and the detecting vibration systems 2A and 2B are dyad-symmetric with the center of gravity GO as the center.

The systems 1A and 1B are provided with supporting portions 12A and 12B projecting from the peripheral part 11a of the base portion 11A and first bending-vibration pieces 13C and 13D extending from the top ends 12b of the supporting portions 12A and 12B perpendicularly to the supporting portions. The bending-vibration pieces 13C and 13D are, as shown in FIG. 2(a), bound in the centers and released in both ends. The first-vibration pieces are respectively composed of bending-vibration pieces 16A and 16B, and 16C and 16D. Each bending-vibration pieces is provided with driving electrodes 15A and 15B. The detecting vibration systems 2A and 2B comprise long and narrow circumferential bending-vibration pieces 14C and 14D (see: FIG. 4(a)), and these bending-vibration pieces are respectively provided with detecting electrodes 89A and 89B.

Figure 12:
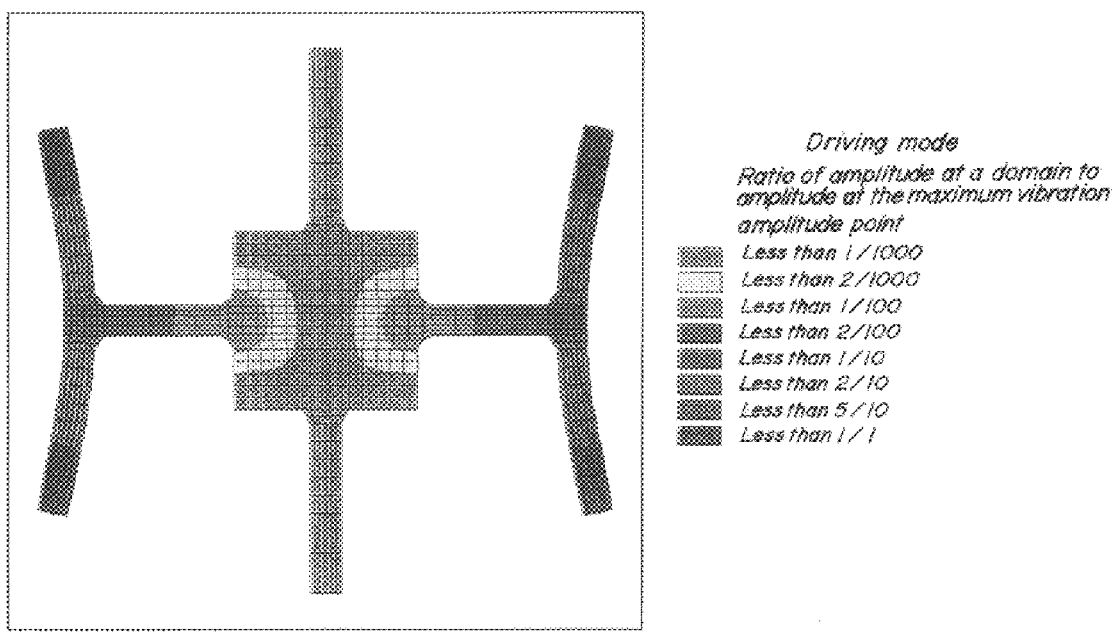
FIG. 12 shows a relative ratio of an amplitude of vibration at each point in a vibrator to the maximum vibration amplitude in the driving vibration mode.

FIG. 12 shows a driving mode of driving vibration in this vibrator. The respective bending-vibration pieces bending-vibrate around the vicinities of the top ends 12b of the supporting portions 12A and 12B.

Figure 13:
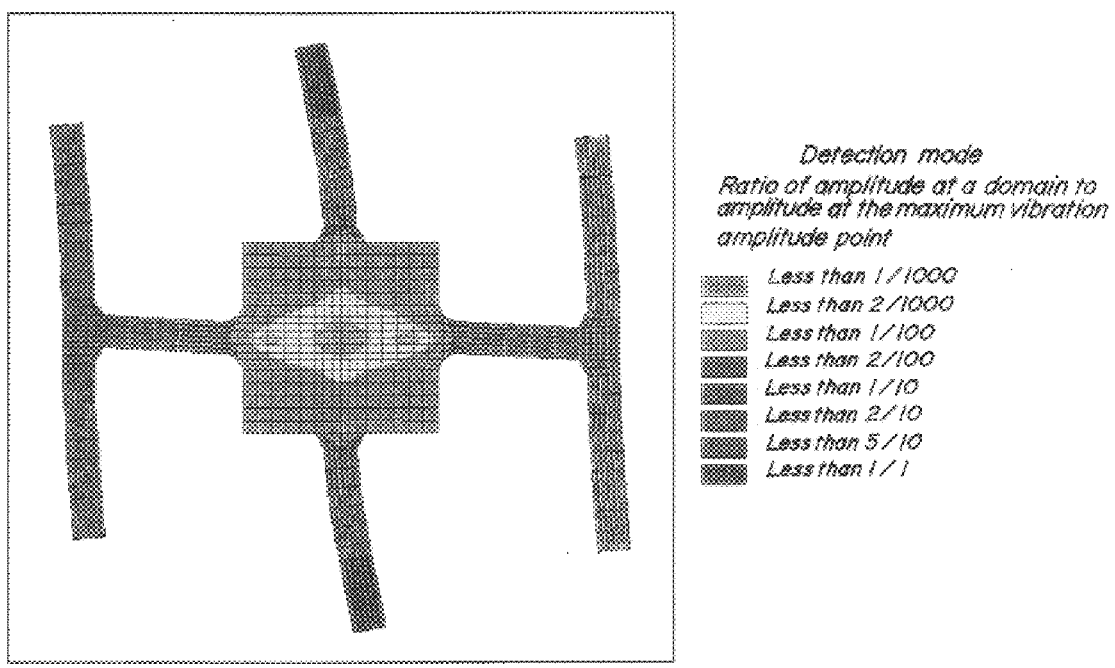
FIG. 13 shows a relative ratio of an amplitude of vibration at each point in the vibrator of FIG. 11 to the maximum vibration amplitude in the detecting vibration mode.

FIG. 13 shows a mode of detecting vibration in this vibrator.

The supporting portions 12A and 12B bending-vibrate circumferentially around the fixing portions 12a, and the bending-vibration pieces 14C and 14D of the detecting vibration system bending-vibrate correspondingly to this.

The inventors applied a natural mode analysis by a finite element method to the vibrator of FIG. 11 in order to examine an influence of the driving vibration mode and the detecting vibration mode on the whole vibrator. And they made the vibrator of quartz and obtained distribution of the ratios of the amplitudes of vibration of respective points of the vibrator to the maximum vibration amplitude thereof.

FIG. 12 shows a relative ratio of the amplitude of vibration at each point in the vibrator to the maximum vibration amplitude in a driving vibration mode, and FIG. 13 shows a relative ratio of the amplitude of vibration of each point in the vibrator to the maximum vibration amplitude in a detecting vibration mode. In FIGS. 12 and 13, the respective domains different in color from one another show domains each of whose colors represents the above ratio at a domain. Orange indicates a domain being smallest in amplitude.

According to FIG. 12, a tensile stress is applied in the vicinity of the fixing portion 12a of each of the supporting portions 12A and 12B to the base portion 11A with vibration of each driving vibration system, and transformation is seen. But since the driving vibration systems 1A and 1B are arranged at dyad-symmetric positions, influences of this transformation cancel each other in the base portion. Therefore, no influence by the driving vibration is seen near the center of the base portion and in the detecting vibration systems 2A and 2B located between the driving vibration systems.

According to FIG. 13 influences exerted by the driving vibration systems 1A and 1B on the base portion cancel each other. Furthermore, since the detecting vibration systems are located at dyad-symmetric positions, influences exerted by the detecting vibration systems 2A and 2B on the base portion cancel each other, also. As the result, no influence by the detecting vibration is seen in the vicinity of the center 21A of the base portion (see FIGS. 11 and 13).

In the vibratory gyroscope according to the invention, therefore, the vibrator is supported and fixed in the domain where the detecting vibration of the driving vibration is smallest in amplitude. Thereby, the detecting vibration generated by Coriolis forces effectively occurs without reduction thereof, and then Q value of the detecting vibration becomes higher and the sensitivity of the vibrator becomes higher. Since the detecting vibration generated by Coriolis forces is small in the amplitude, the vibrator is particularly effective to be supported in the domain where the amplitude of detecting vibration is smallest, for the purpose of increasing the sensitivity.

Further, in this example, the domains where the amplitudes of both the driving vibration and the detecting vibration are smallest are located at the center portion of the base portion like 21A shown in FIG. 11, as shown in FIGS. 12 and 13. For this reason, this domain 21A is supported and fixed. In this case, a concrete method of supporting the vibrator is not particularly limited and any supporting and fixing means usable therefor may be adopted.

For instance, as a method of adhering a piezoelectric member, any known adhering method may be used. As its example, the vibrator may be fixed by forming a predetermined hole 20A in the domain 21A and inserting a supporting member into the supporting hole 20A. For example, the supporting member is projected from a jig for supporting the vibrator, and inserted into the supporting hole 20A, and thereby the vibrator may be fixed. When the supporting member is inserted into the supporting hole and fixed, a metallized layer is formed on a surface of the supporting member and a further metallized layer is, if necessary, formed on an inner peripheral surface, and then soldering or brazing is applied between the supporting member and the surface of the supporting hole. Alternatively, resin is applied therebetween.

In that case, the supporting hole 20A may penetrate or not penetrate through the vibrator. When the supporting hole 20A is a penetrating hole through the vibrator, the supporting member can penetrate through the supporting hole 20A, but the supporting member may not penetrate therethrough.

If the supporting hole is not formed in the vibrator, the supporting member may be soldered or adhered by resin on the front or back surface of the domain 21A of the vibrator.

Further, in the vibrator and the vibratory gyroscope according to this example, as shown in FIGS. 11 and 12, the center of gravity GO of the vibrator is located in a domain where the amplitude of the vibrator is small in driving vibration. The term "domain where the amplitude of the vibrator is small in driving vibration" means a region where an amplitude is $1/1000$ or less of a maximum amplitude in driving vibration.

Further, in the vibrator and the vibratory gyroscope according to this example, as shown in FIGS. 11 and 13, the center of gravity GO of the vibrator is located in a domain where the amplitude of the vibrator is small in detecting vibration. The term "a domain where the amplitude of the vibrator is small in detecting vibration" means a region where an amplitude is $1/1000$ or less of a maximum amplitude in detecting vibration.

In first vibration systems, the longitudinal direction of the supporting portion is preferably perpendicular to a longitudinal direction of each bending-vibration piece, although the longitudinal direction is not necessarily perpendicular to a longitudinal direction of each bending-vibration piece.

FIGS. 14–18 are plane views roughly showing vibrators and vibratory gyroscopes in the embodiments according to the invention, in which each vibration system is projected from base portions. In each of these embodiments, known driving and detecting means in addition to the above-mentioned driving electrodes and detecting electrodes may be applied as a vibration-exciting means and detecting means (not shown).

Figure 14:
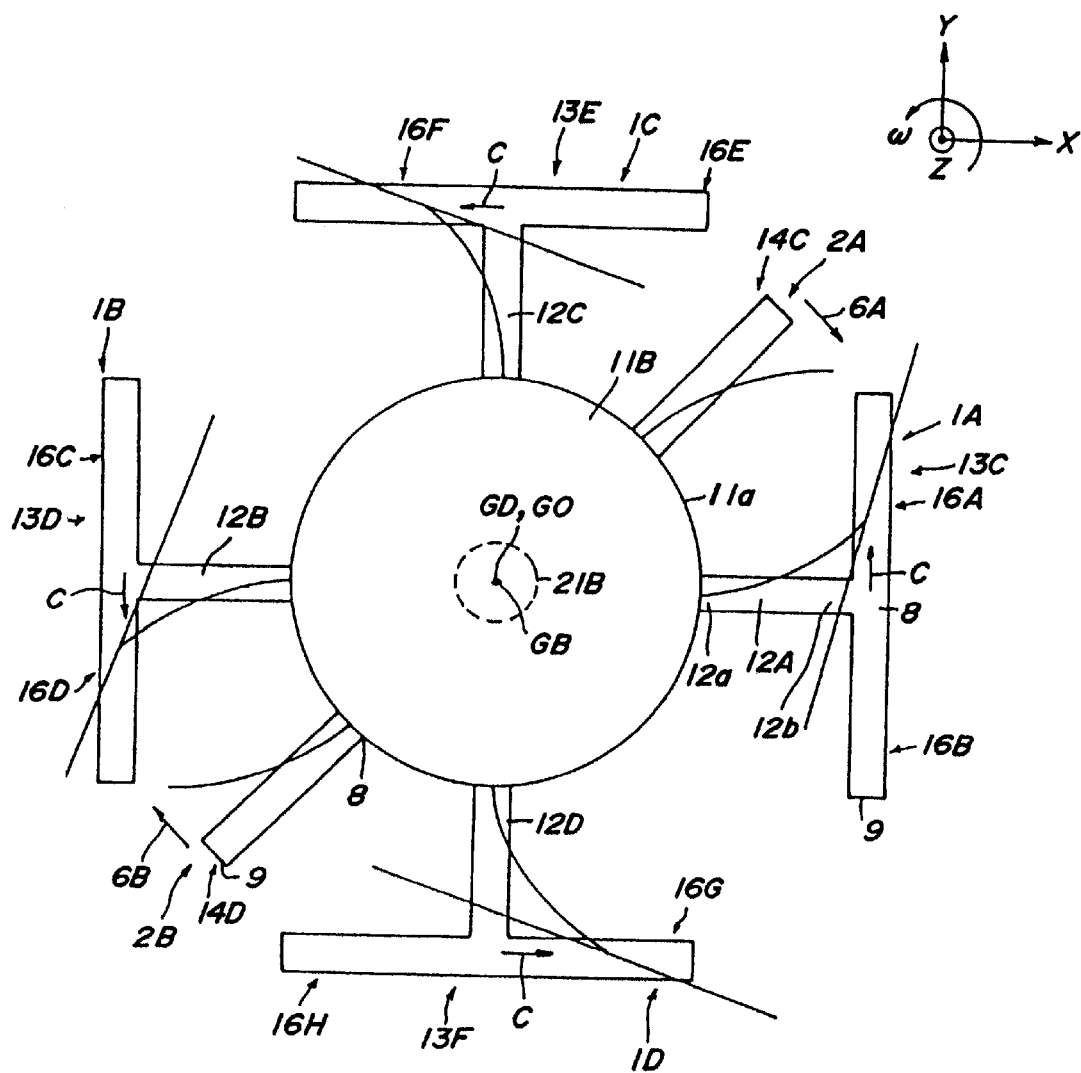
FIG. 14 is a plan view schematically showing a vibrator according to another embodiment of the invention.

The vibrator of the vibratory gyroscope as shown in FIG. 14 has a circular base portion 11B. Four driving systems 1A, 1B, 1C, and 1D, and two detecting systems 2A and 2B are projected radially from the peripheral part 11a of the base portion 11B. Each vibration system is separated from each other. The driving systems 1A, 1B, 1C, and 1D are tetrad-symmetric around the center of gravity GO as the center, and the detecting systems 2A and 2B are dyad-symmetric around the center of gravity GO as the center.

Each driving vibration system is provided with supporting portion 12A, 12B, 12C, and 12D projecting from the peripheral part 11a of the base portion 11B in the radial direction, and the bending-vibration pieces 13C, 13D, 13E, and 13F extending from the top side 12b of each supporting portion in the direction perpendicular to the supporting portion. These bending-vibration pieces are bound at the centers as shown in FIG. 2(a), and released at both ends. Each bending-vibration piece is composed of bending-vibration pieces 16A, 16B, 16C, 16D, 16E, 16F, 16G, and 16H. The detecting vibration systems 2A and 2B are fine and long circumferential direction bending-vibration pieces 14C and 14D.

In vibration mode of driving vibration of the vibrator, each bending-vibration piece vibrates mainly in the radial direction around the end portion 12b of each supporting portion. In vibration mode of detecting vibration of the vibrator, each of the supporting portions 12A, 12B, 12C, and 12D bending-vibrates in the circumferential direction as shown with an arrow C around the fixing portion 12a, in correspondence to this, the detecting vibration systems 2A and 2B bending-vibrate as shown with arrows 6A and 6B, respectively. Besides, in FIG. 14, movement of each portion is indicated with a fine line.

In this case, in FIG. 14, 21B indicates a region where a minimum amplitude domain in the driving vibration overlaps a minimum amplitude domain in detecting vibration, and particularly it is preferable that the region 21B is supported and fixed in the above-mentioned way.

Figure 15:
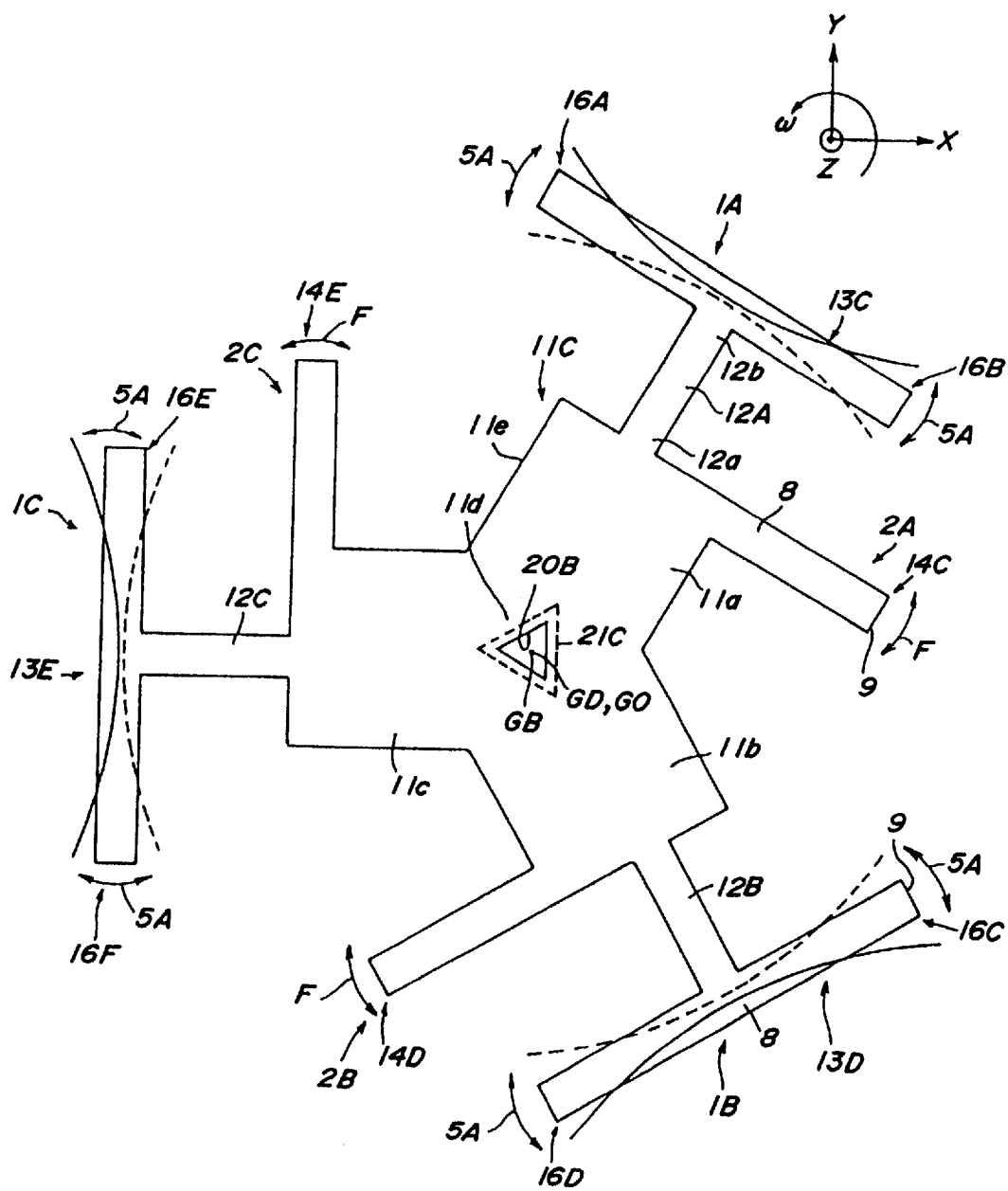
FIG. 15 is a plan view schematically showing a vibrator according to another embodiment of the invention.

In the vibrator of the vibratory gyroscope in FIG. 15, a base portion 11C is composed of a regular triangle central portion 11d and square projecting portions 11a, 11b, and 11c respectively connecting to each piece of the central portion 11d. The base portion 11C is a triad-symmetric shape around the center of gravity GO of the vibrator. Three driving vibration systems 1A, 1B, and 1C and three detecting vibration systems 2A, 2B, and 2C are projected radially from peripheral portions 11e of projecting portions 11a, 11b, and 11c of the base portion 11C. Each vibration system is separated with each other.

The driving vibration systems 1A, 1B, and 1C are triad-symmetric around a point O, and the detecting vibration systems 2A, 2B, and 2C are triad-symmetric around the center of gravity GO. In the embodiment, each detecting vibration system does not extend from the center of gravity GO in a regularly radial direction, but extends away from the peripheral portion 11e almost radially.

In driving vibration mode of the vibrator, each of the bending vibration pieces 13C, 13D, and 13E bending-vibrates mainly in the radial direction as shown an arrow 5A around the vicinity of the top portion 12b of each supporting portion. In detecting vibration mode of the vibrator, each of the supporting portions 12A, 12B, and 12C bending-vibrates around the fixing portion 12a circumferentially, and in responsive to this, each of the bending-vibration pieces 14C, 14D, and 14E of each detecting vibration system bending-vibrate as shown an arrow F.

In the central portion of the base portion 11C, there is a region 21C where a minimum amplitude region in driving vibration overlaps a minimum amplitude region in detecting domain. Particularly, it is preferable that the region 21C is supported and fixed in the above-mentioned way. For example, a supporting hole 20B is formed in the region 21C, and the vibrator is supported by means of the supporting hole 20B like the previously mentioned way.

Figure 16:
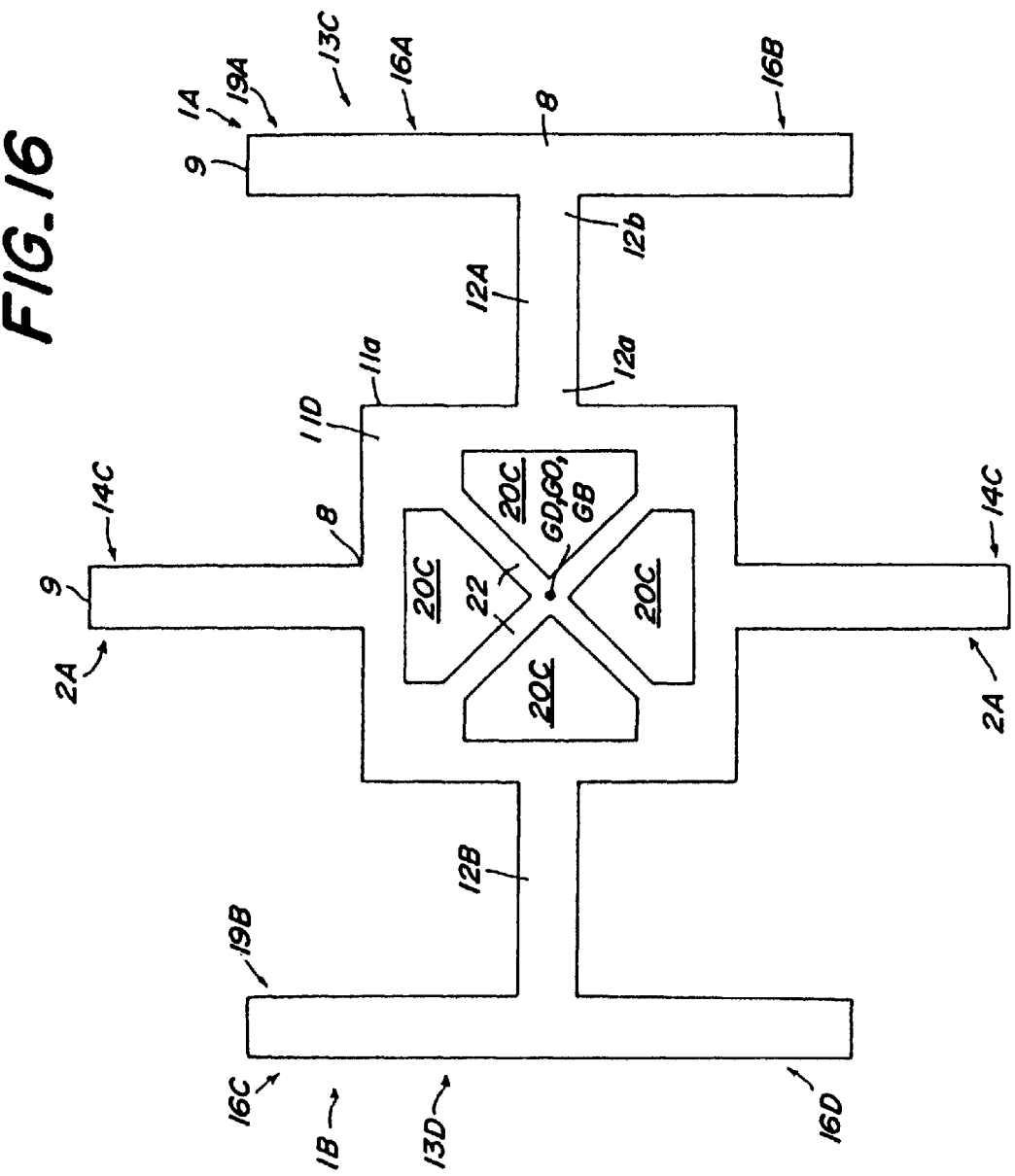
FIG. 16 is a plan view schematically showing a vibrator according to another embodiment of the invention.

A base portion 11D of a vibrator in FIG. 16 is a tetrad-symmetric square, and two driving vibration systems 1A and 1B, and two detecting vibration systems 2A and 2B are projected radially from a peripheral part 11a of the base portion. Each vibration system is separated from each other.

Four supporting holes 20C are formed in the base portion 11D, and connecting portions 22 are formed between four supporting holes. Vibration mode of each of driving and detecting vibration systems is as described above.

Figure 17:
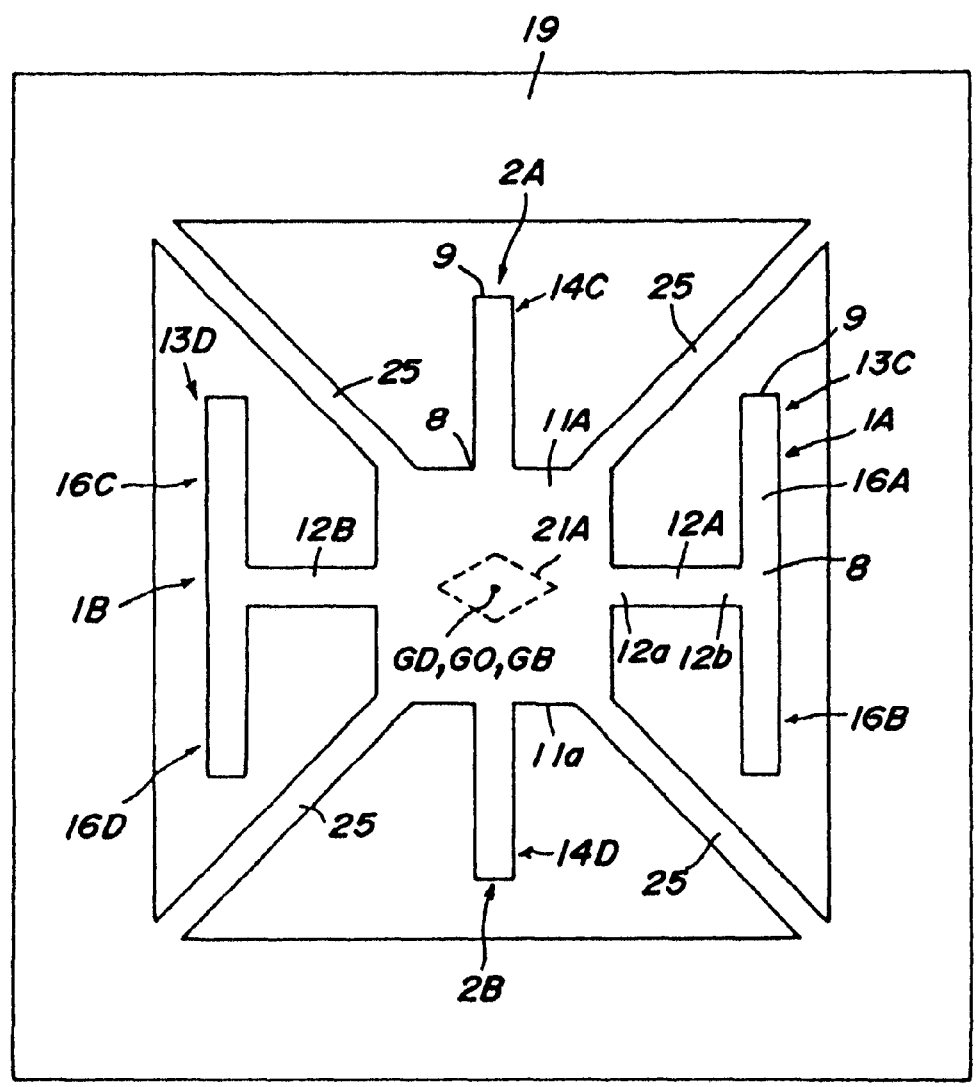
FIG. 17 is a plan view schematically showing a vibrator according to another embodiment of the invention.

A vibrator in FIG. 17 has the same conformation as in the vibrator in FIG. 11 except that a frame 19 is formed to surrounds a base portion of the vibrator, driving vibration systems and detecting vibration systems of the vibrator. The inner peripheral surface of the frame 19 is connected with four corners of a base portion 11A through connecting portions 25. The vibratory gyroscope according to the invention may preferably be supported within a portion 21A or the frame 19.

In a vibrator in FIG. 18, two driving vibration systems 1A and 1B and two detecting vibration systems 2A and 213 are projected from a peripheral part 11a of a base portion 11A towards four directions radially, and vibration systems are separated with each other. The driving vibration systems 1A and 1B are dyad-symmetric around a point O, and the detecting vibration systems 2A and 2B are dyad-symmetric around the center of gravity GO of the vibrator.

The driving vibration systems 1A and 1B are provided with supporting portion 12A and 12B projecting from the peripheral part 11a of the base portion 11A, and bending-vibration pieces 13I and 13J extending from the top side 12b of supporting portions in the direction perpendicular to the supporting portions. These bending-vibration pieces 13I and 13J are bound at the centers as shown in FIG. 2(a). Each bending-vibration piece is composed of bending-vibration pieces 16I, 16J, 16K, and 16L. Each driving vibration system is provided with bending-vibration pieces 27A and 27B, or 27C and 27D each extending in the direction perpendicular to each radial-direction bending-vibration pieces.

The detecting vibration systems 2A and 2B are respectively composed of fine and long circumferential-direction bending-vibration pieces 14E and 14F (see: FIG. 4(a)), and each of the circumferential-direction bending-vibration pieces 14A and 14B is provided with weight portions 26A and 26B.

Mode of the driving vibration of the vibrator is shown in FIG. 19(a). Each of the bending-vibration pieces 16I, 16J, 16K, and 16L bending-vibrates as shown with an arrow 5A or 5B around the vicinity of a top portion 12b, and at the same time, each of the bending-vibration pieces 27A, 27B, 27C, and 27D vending-vibrates as shown with an arrow H.

The driving vibration mode of this vibrator is shown in FIG. 19. The supporting portions 12A and 12B vibrate in bending movement in the circumferential direction around the fixing portion 12a. Responsive to this vibration, bending-vibration pieces 14E and 14F vibrate in bending motion as arrows 6C and 6D. A projection 28 is provided as an adjusting part which may be subjected to laser processing to adjust the frequency of the driving vibration.

The vibrator constituting the vibratory gyroscope of the invention may be produced by a silicon semiconductor process as used in a micro-machine made of silicon, other than the above described piezoelectric materials and invariable elasticity metals. In such gyroscopes, electrostatic force may be used for driving the vibrator.

Figure 20:
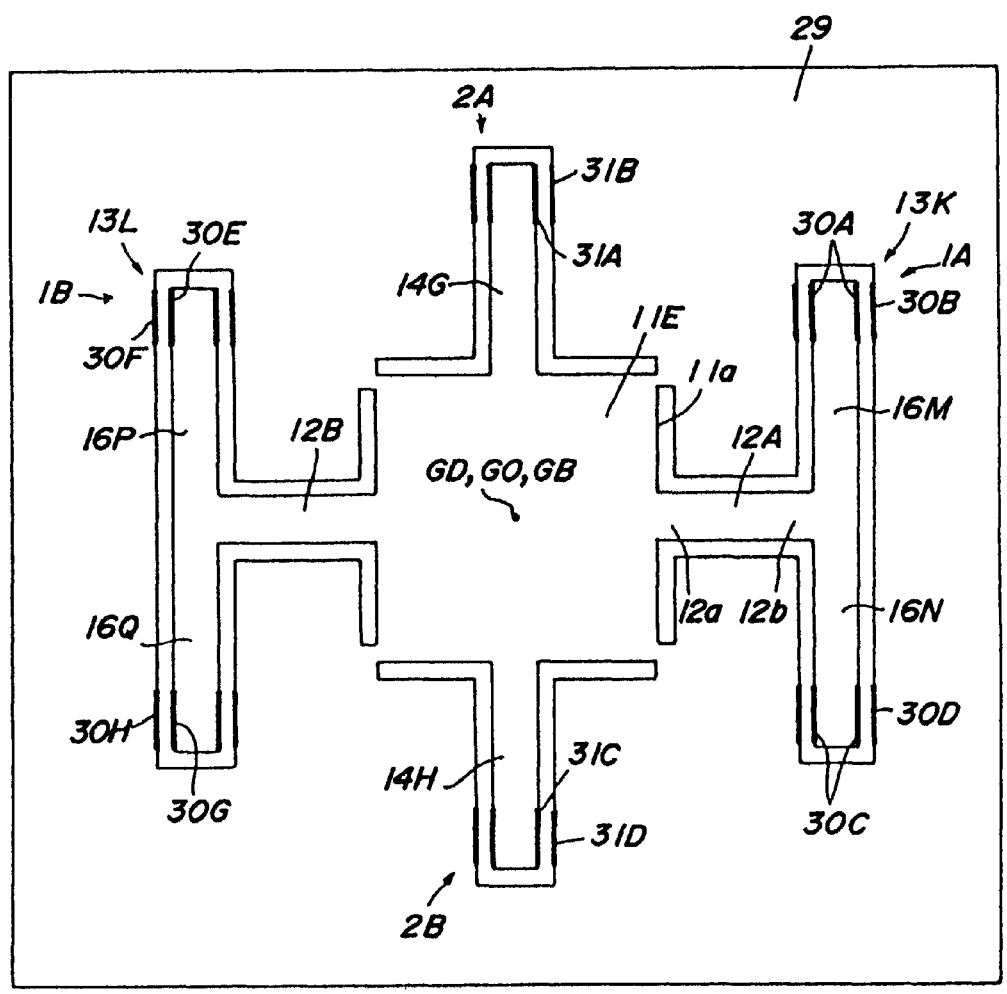
FIG. 20 is a plan view of a vibratory gyroscope using a vibrator formed by means of a silicon semiconductor processing.

The vibrator shown in FIG. 20 is produced by a silicon semi-conductor process and by forming elongated spaces in a silicon plate. The shape of the vibrator itself is substantially same as that shown in FIG. 11. A base portion 11E of the vibrator has a square shape being tetrad-symmetrical around the center of gravity GO. Two driving vibration systems 1A, 1B and detecting vibration systems 2A, 2B project radially in four directions from the peripheral part 11a of the base portion 11E and are separated with each other.

The driving vibration systems 1A and 1B comprise supporting portions 12A and 12B, projected from the peripheral part 11a of the base portion, and bending vibration pieces 13K and 13L each extending from the top edge 12b of the supporting portion in a direction perpendicular to the supporting portion. Each bending vibration piece 13G or 13L comprises a bending-vibration piece 16M, 16N, 16P or 16Q. Each detecting vibration system 2A or 2B comprises each circumferential-bending-vibration piece 14G or 14H.

Each electrostatic driving electrode 30A, 30C, 30E or 30G are provided on the side of each bending-vibration piece 16M, 16N, 16P and 16Q. Each electrostatic driving electrode 30B, 30D, 30F or 30H is provided on the side of a frame 29 opposing to each radial-bending-vibration piece. The above electrodes electrostatically drive each bending-vibration piece.

Each electrostatic detecting electrode 31A or 31C are provided on the side of each circumferential-bending-vibration piece 14G or 14H. Each electrostatic detecting electrode 31B or 31D is provided r the side of the frame 29 opposing each circumferential-bending vibration piece.

A doped-semiconductor domain doped with a specific metal may be provided in the vibrator, instead of the above electrostatic detecting electrode. This doped-semiconductor domain forms a piezoelectric resistance device. A change in resistance caused by a stress applied to each of the piezoelectric resistance devices in each circumferential-bending vibration piece is measured and detected as an index of a turning angular velocity, when the vibrator is turned. 12a is a fixing portion of the supporting portion 12.

Figure 21:
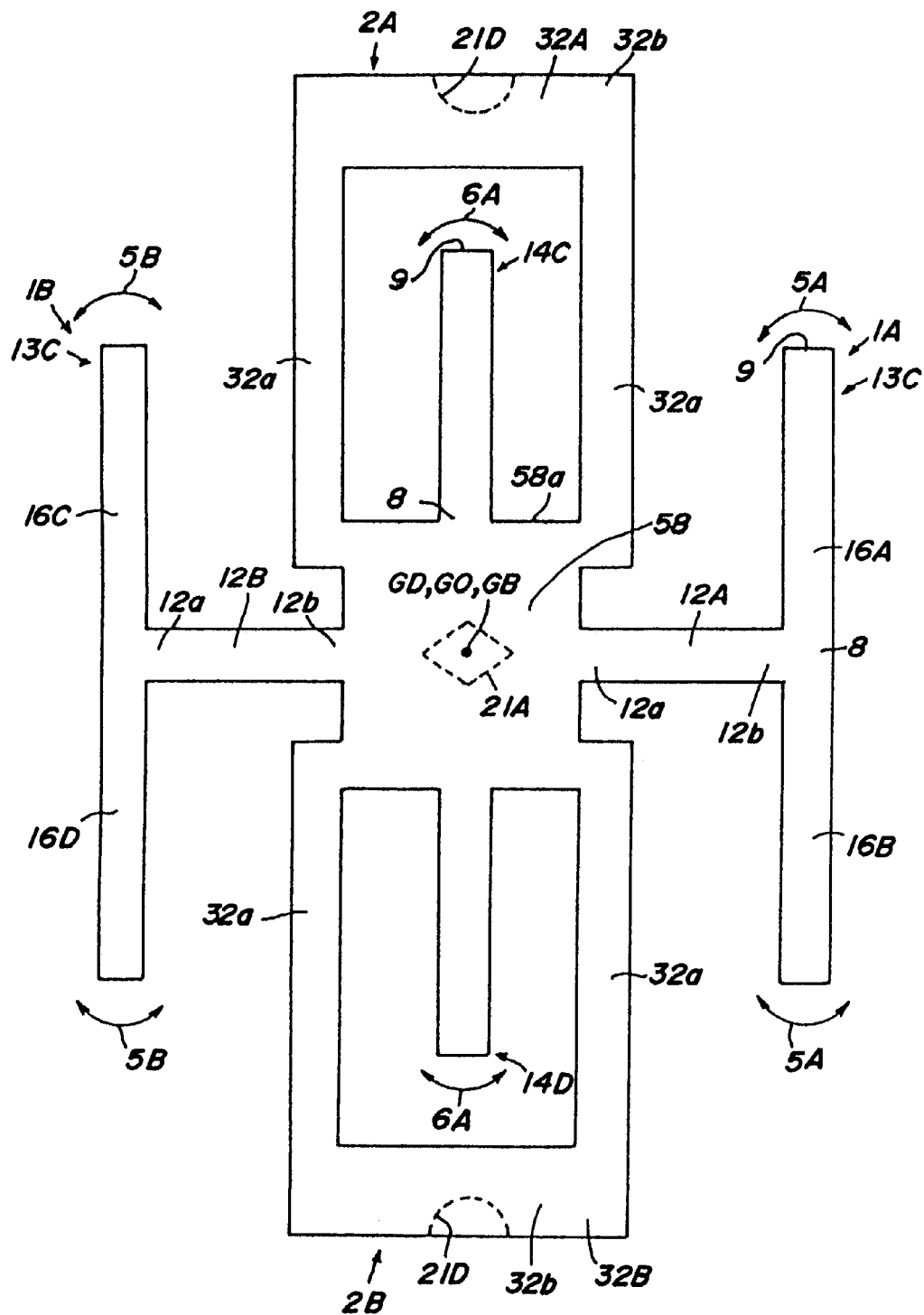
FIG. 21 is a plan view schematically showing a vibrator according to another embodiment of the invention.

FIG. 21 is a plan view roughly showing a vibrator according to another embodiment. Driving vibration systems 1A, 1B and detecting vibration systems 2A, 2B and operation of them are similar to those shown in FIG. 11. Frame portions 32A and 32B extend from two peripheral parts 58a at the detecting vibration system sides of the base portion 58, and each detecting vibration system is surrounded by each frame portion. Each frame portion is provided with connecting portions 32a extending in parallel with each detecting vibration system and a supporting frame 32b for supporting and fixing the vibrator. A domain having the smallest amplitude in a driving vibration and a detecting vibration in each of the frame portions 32A, 32B is supported and fixed.

Figure 22:
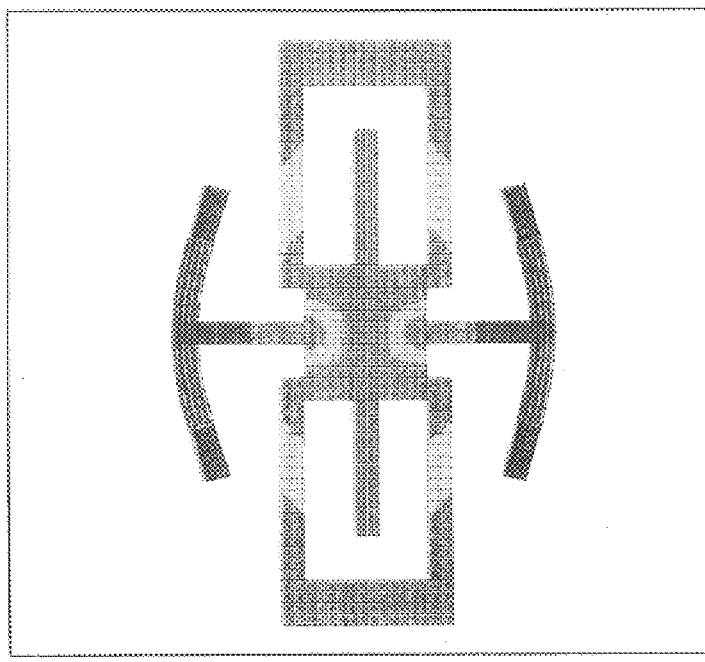
FIG. 22 shows a relative ratio of an amplitude of vibration at each point in the vibrator of FIG. 21 to the maximum vibration amplitude in the driving vibration mode.
Figure 23:
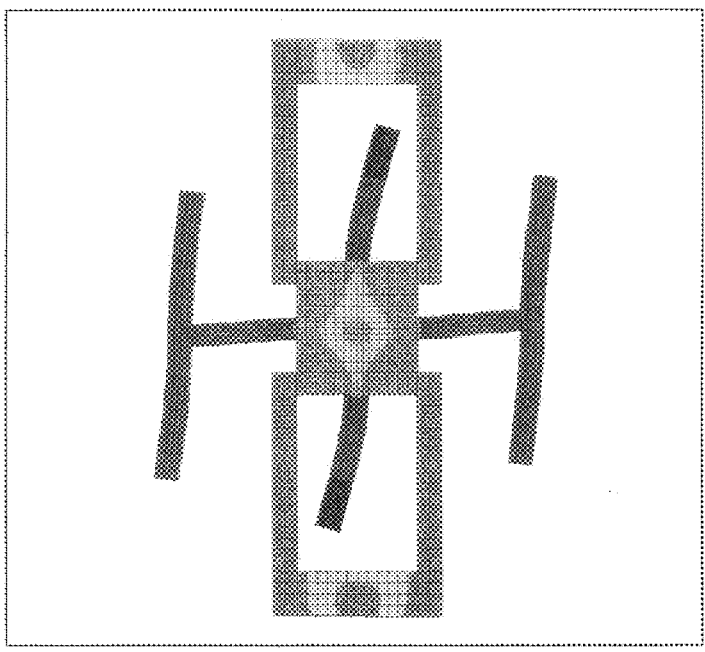
FIG. 23 shows a relative ratio of an amplitude of vibration at each point in the vibrator of FIG. 21 to the maximum vibration amplitude in the detecting vibration mode.

FIG. 22 shows a relative ratio of the amplitude of vibration of each point in the vibrator of FIG. 21 to the maximum vibration amplitude in a driving vibration mode, and FIG. 23 shows a relative ratio of the amplitude of vibration of each point in the vibrator to the maximum vibration amplitude in a detecting vibration mode.

According to FIG. 22, a tensile stress is applied in the vicinity of the fixing portion 12a of each of the supporting portions 12A and 12B to the base portion 58 with vibration of each driving vibration system, and transformation is seen. This influence is slightly seen in the connecting portion 32a of the frame portion. Since these influences cancel each other, however, no influence by the driving vibration is seen near the center of the base portion and in each bending-vibration piece 14C, 14D and in each supporting frame 32b of the frame portion.

According to FIG. 23, influences exerted by the driving vibration systems and the detecting vibration systems on the base portion 58 cancel each other, and as the result, no influence by the detecting vibration is seen in the vicinity 21A of the center of the base portion 58. In addition to this, however, since a domain 21D in the supporting frame 32b is also smallest in amplitude, this domain 21D also can be supported and fixed.

In the vibrator and vibratory gyroscope according to this example, as shown in FIGS. 21 and 22, the center of gravity GO of the vibrator is located within a domain having the smallest amplitude in driving vibration. And as shown in FIGS. 21 and 23, the center of gravity GO of the vibrator is located within a domain having the smallest amplitude in detecting vibration.

Figure 24:
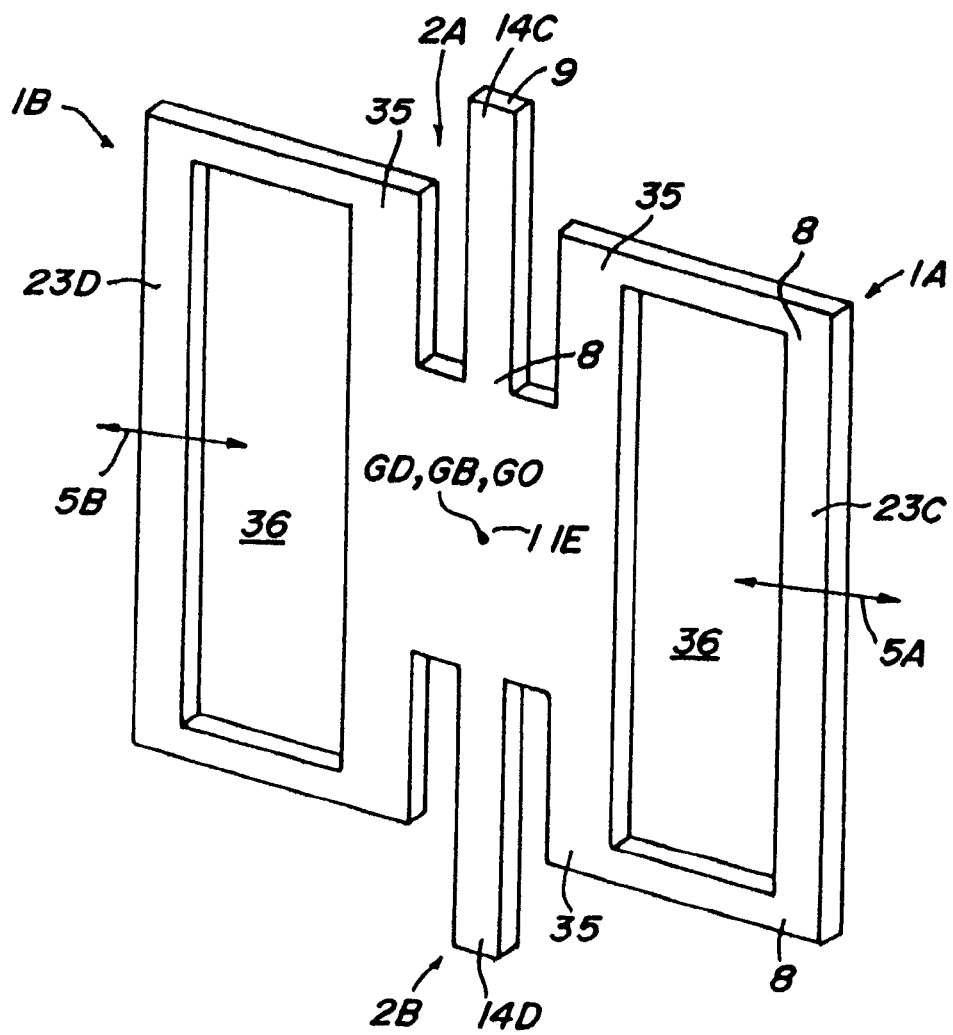
FIG. 24 is a plan view schematically showing a vibrator according to another embodiment of the invention.

FIG. 24 is a perspective view schematically showing a vibratory gyroscope with a vibrator of an embodiment of the invention. A base part 11E has a rectangular shape. Two driving vibration systems 1A, 1B (first vibration system in this embodiment) and detecting vibration systems 2A, 2B (second vibration system) project radially from the peripheral part 11a of the base portion 11E and are separated with each other. The systems 1A and 1B, or the systems 1A and 2B are dyad-symmetric around the center of gravity GO of the vibrator, respectively.

The driving vibration systems 1A and 1B comprise supporting portions 35, projected from the peripheral part of the base portion, and first bending-vibration pieces 23C and 23D each extending in a direction perpendicular to the supporting portion. As shown in FIG. 2(b), each bending-vibration piece 23C or 23D has both ends fixed respectively to a frame and a central portion vibrating in a relatively large amplitude. Preferably, the bending-vibration pieces are vibrated so that the center of gravity of the whole vibration of the vibration pieces 23C and 23D is located on or within the domain near the center of gravity GO of the vibrator.

Figure 25:
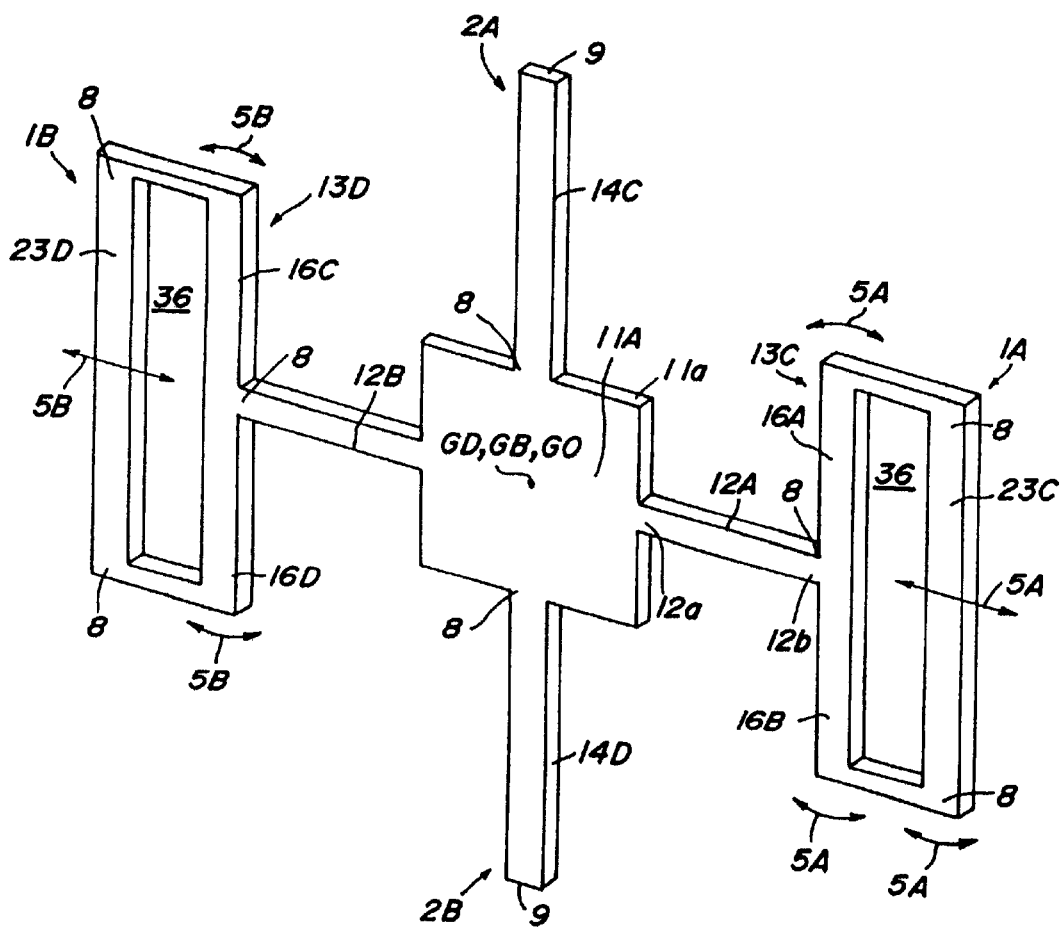
FIG. 25 is a plan view schematically showing a vibrator according to another embodiment of the invention.

In a vibrator shown in FIG. 25, two driving vibration systems 1A, 1B and two detecting vibration systems 2A, 2B project from the peripheral part of the base portion 11A and separated with each other. The systems 1A and 1B, or, the systems 2A and 2B are dyad-symmetric around the center of gravity GO of the vibrator.

The systems 1A and 1B comprise supporting portions 12A and 12B, projected from the peripheral part of the base portion, and first bending-vibration pieces 13C and 13D each extending in a direction perpendicular to the supporting portion from the end thereof (refer to FIG. 2). Each bending vibration piece 13C or 13D comprises bending-vibration pieces 16A and 16B, or 16C and 16D. First bending-vibration pieces 23C and 23D are further provided outside the above bending vibration pieces (refer to FIG. 2). The bending vibration pieces 13C and 13D are connected with 23C and 23D, respectively, to form frames with spaces 36 formed. The central portions of the pieces 23C and 23D vibrate in relatively large amplitudes as arrows 5A, 5B. In this case, the bending-vibration pieces are vibrated so that the center of gravity GD of the whole vibration of the vibration pieces 13C, 13D, 23C and 23D is located on or within a domain near the center of gravity GO of the vibrator.

Figure 26:
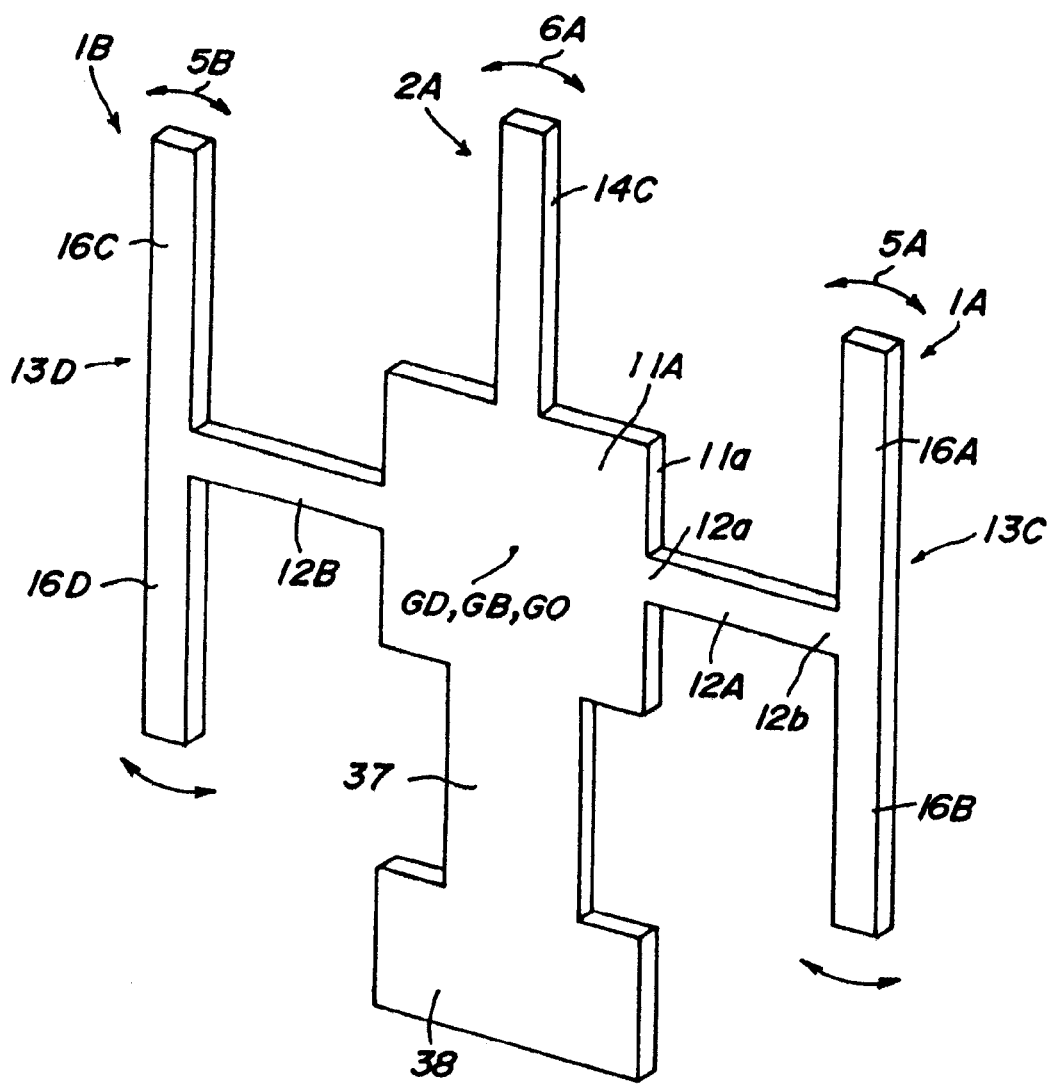
FIG. 26 is a plan view schematically showing a vibrator according to another embodiment of the invention.

In the vibrator shown in FIG. 26, two driving vibration systems 1A, 1B and one detecting vibration system 2A project from the peripheral part of the base portion 11A and separated with each other. The systems 1A and 1B are dyad-symmetric around GO. The systems 1A and 1B comprise 5B supporting portions 12A and 12B, projected from the peripheral part of the base portion, and first bending-vibration pieces 13C and 13D each extending from the edge of each supporting portion in a direction perpendicular to the supporting portion (refer to FIG. 2(a)).

On the other hand, the system 2A is as described above, except that a weight portion 37 and a fixing piece 38 are provided on the opposing side to the system 2A. In this case, when the center of gravity of the whole driving vibration in the driving systems is located within a domain near GO, the influence on the detecting vibration system may be reduced to allow relatively accurate measurement with only one detecting vibration system 2A. The vibrator may preferably be held in a predetermined position in the side of the base portion opposing to the detecting vibration system, or, in a predetermined position being identical with the position of the detecting driving system when turning it around GO, or the vibrator may be held on the elongated line of the above position.

Figure 27:
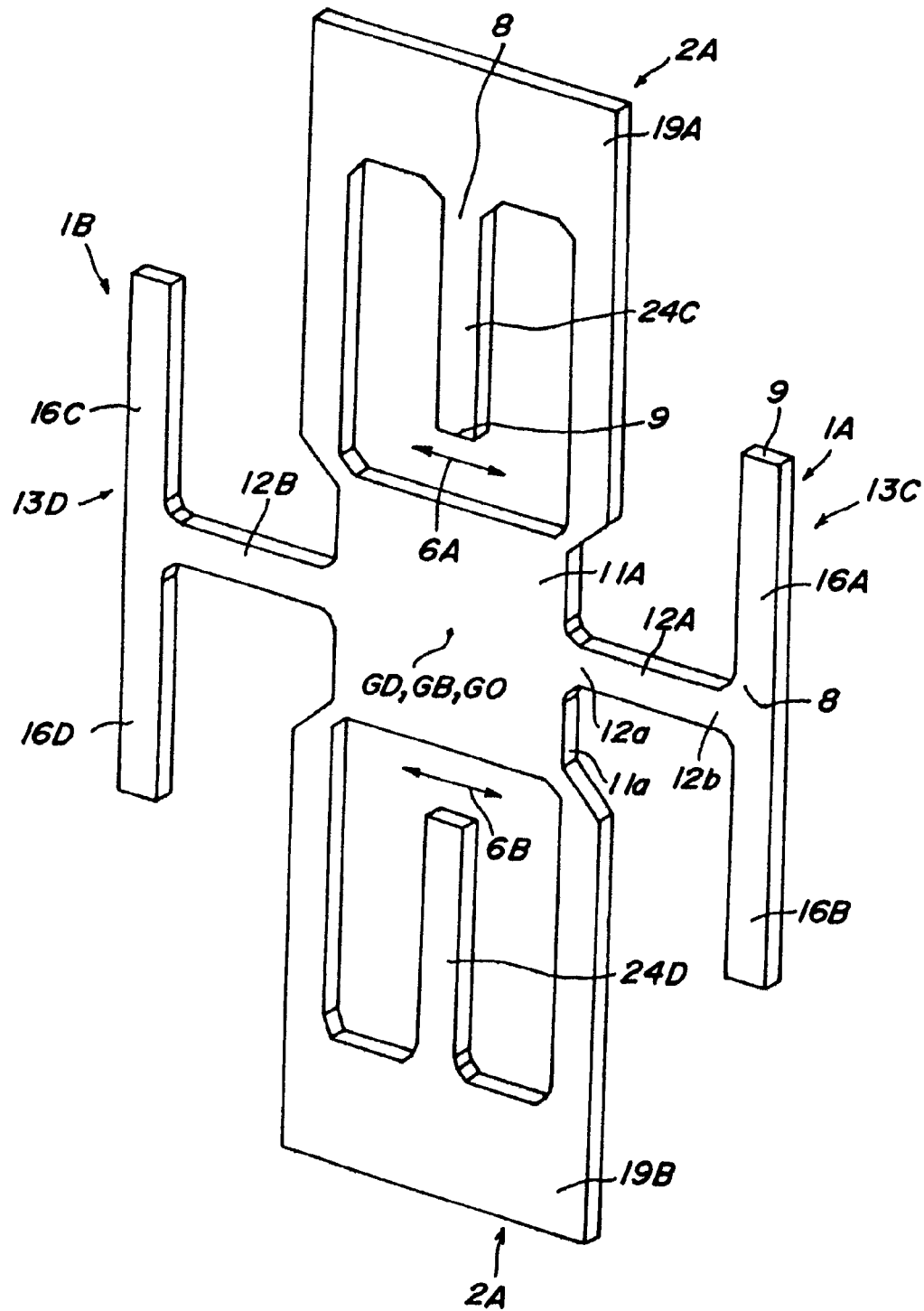
FIG. 27 is a plan view schematically showing a vibrator according to another embodiment of the invention.

In a vibrator of FIG. 27, the driving vibration systems 1A and 1B are same as the above. The vibrator falls within the category of FIG. 8. The detecting vibration systems 2A and 2B comprise frame portions 19A and 19B, respectively, projecting from the base portion 11A, and second bending-vibration pieces 24C and 24D, respectively, projecting towards the center of gravity GO from the frame portions 19A and 19B. As shown in FIG. 4(b), each bending vibration piece 24C or 24D comprises a fixing portion 8 distant from GO and an open end near GO, and vibrates as an arrow 6A or 6B.

Figure 28:
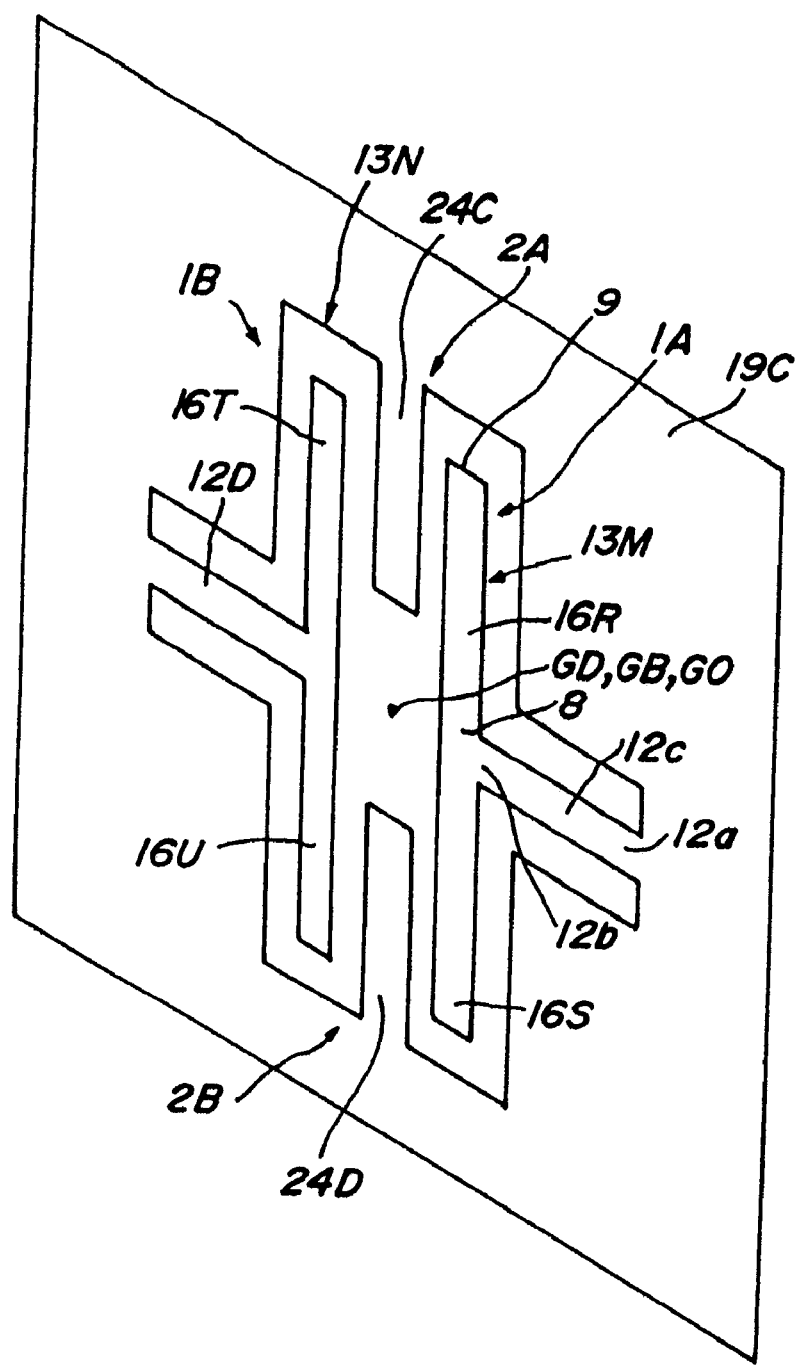
FIG. 28 is a plan view schematically showing a vibrator according to another embodiment of the invention.

In a vibrator shown in FIG. 28, two first vibration systems and two second vibration systems are formed within a frame portion 19C so that the open ends extend towards the center of gravity GO. The vibrator falls within the category shown in FIG. 10.

Each driving vibration system comprises a supporting portion 12C or 12D extending towards the center of gravity GO from a frame portion 19C, and first bending-vibration piece 13M or 13N extending from the open end of each supporting portion in a direction perpendicular to the supporting portion (refer to FIG. 2(a)). Each bending-vibration piece 13M or 13N comprises pieces 16R and 16S, or 16T and 16U.

Each detection vibration system comprises second bending-vibration piece 24C or 24D extending linearly from the frame portion 19C towards the center of gravity GO. Each bending vibration piece 24C or 24D has a shape shown in FIG. 4(b).

In the invention, a plurality of first vibration systems may be connected with connecting portions extending in a circumferential direction around the center of gravity of the vibrator to form a vibrating loop system surrounding the center with the first vibration systems and the connecting portions.

Figure 29:
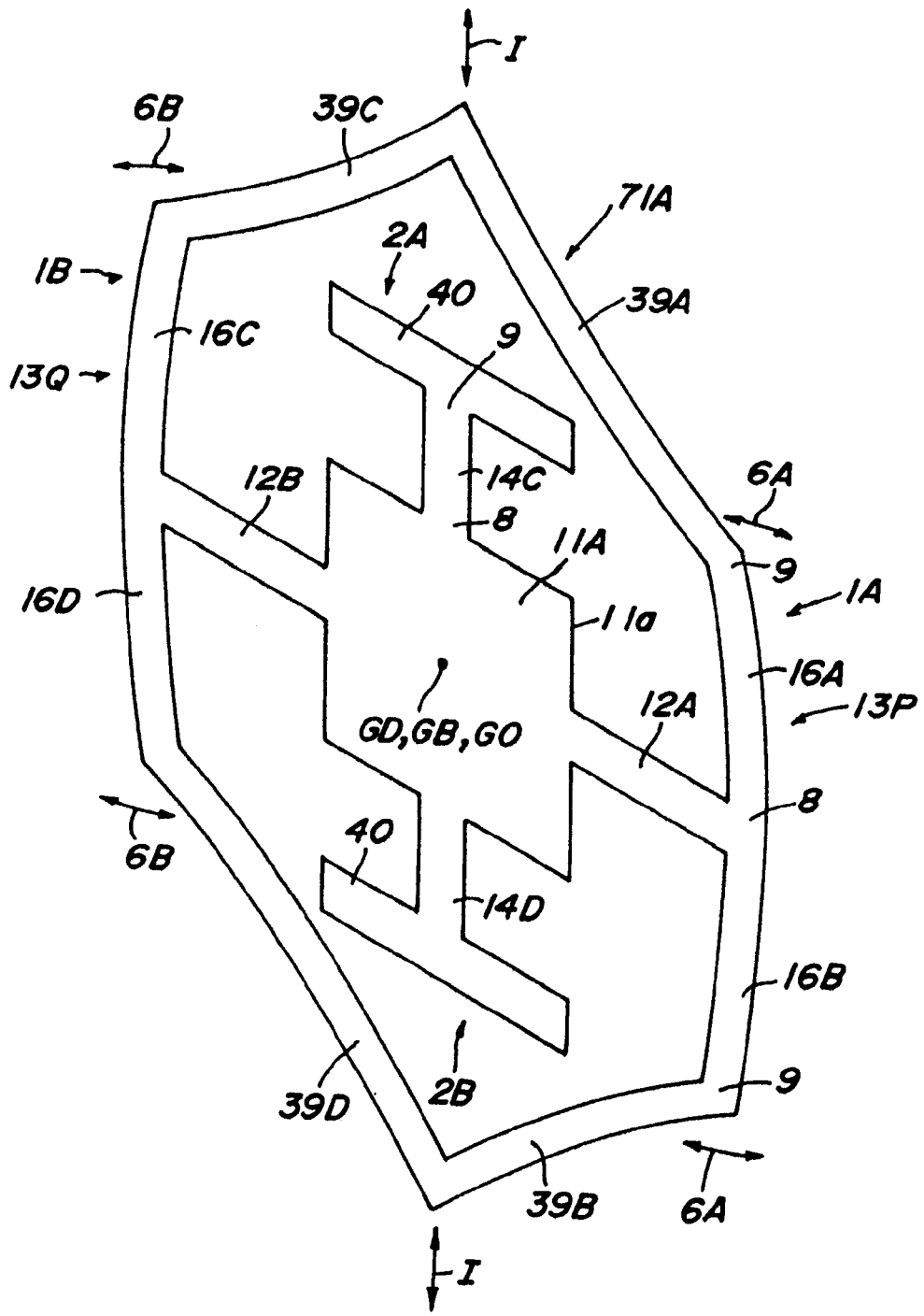
FIG. 29 is a plan view schematically showing a vibrator according to another embodiment of the invention.

For example, in a vibrator of FIG. 29, two driving systems 1A, 1B and detection vibration systems 2A, 2B project radially from the peripheral part of the base portion 11A. The systems 1A and 1B are dyad-symmetrical and the systems 2A and 2B are also dyad-symmetrical with the center of gravity GO as the center.

The systems 1A and 1B comprise supporting portions 12A, 12B, projecting from the peripheral part of the base portion, and first bending vibration pieces 13P and 13Q (refer to FIG. 2(a)) each extending in a direction perpendicular to the supporting portion from the edge thereof. The bending-vibration pieces 13P and 13Q are connected with connecting portions 39A, 39B, 39C and 39D. The connecting portions and the pieces 13P and 13Q together form a vibrating loop system 71A with GO as its center.

Figure 30:
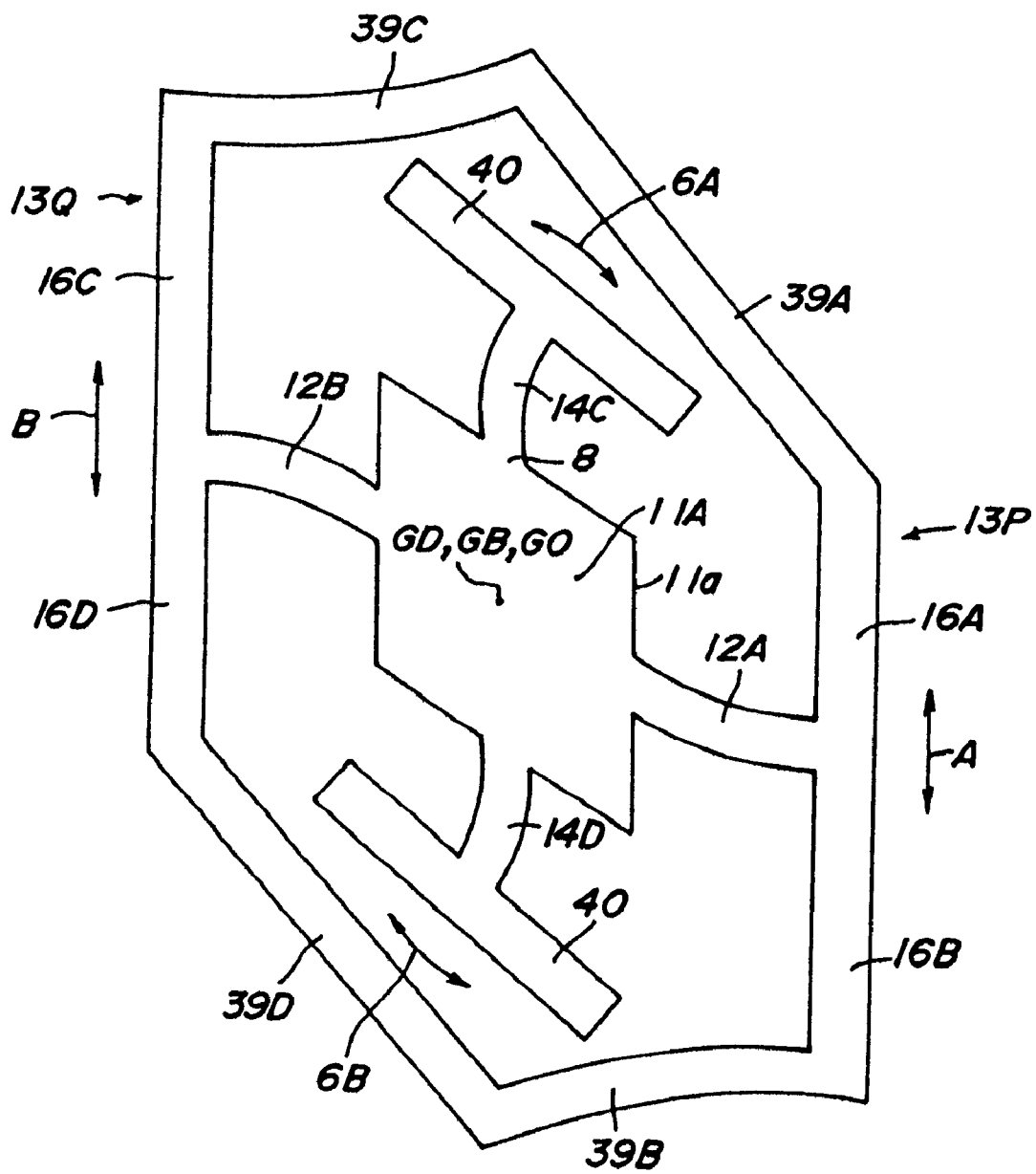
FIG. 30 is a plan view schematically showing a vibrator according to another embodiment of the invention.

In the vibration mode shown in FIG. 29, the bending-vibration pieces 16A, 16B, 16C and 16D vibrate as arrows 6A and 6B, and responsive to these vibrations, the connecting portions vibrate as arrows I. When the vibrator is turned, a detecting vibration mode shown in FIG. 30 is induced, in which the driving vibration systems vibrate as arrows A and B in the circumferential direction, and responsive to this, the whole vibrating loop system deforms. To compensate this deformation, the pieces 14C and 14D in the detecting vibration systems vibrate as arrows 6A and 6B. 40 is a weight portion provided within each pieces 14C or 14D.

Vibrators shown in FIGS. 31 to 35 comprise small base portions whose widths are substantially the same as those of the bending vibration pieces.

Figure 31:
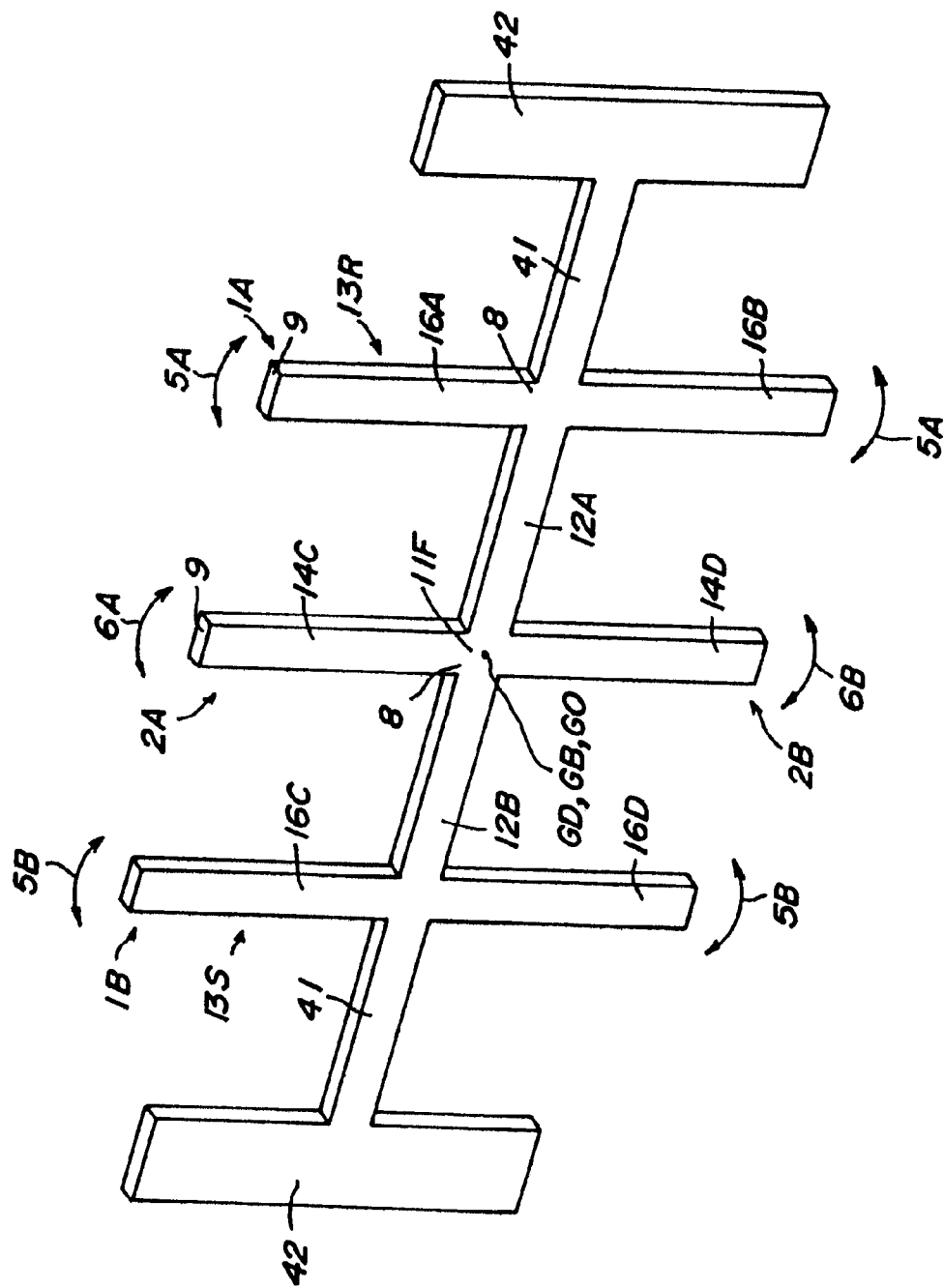
FIG. 31 is a plan view schematically showing a vibrator according to another embodiment of the invention.
Figure 32:
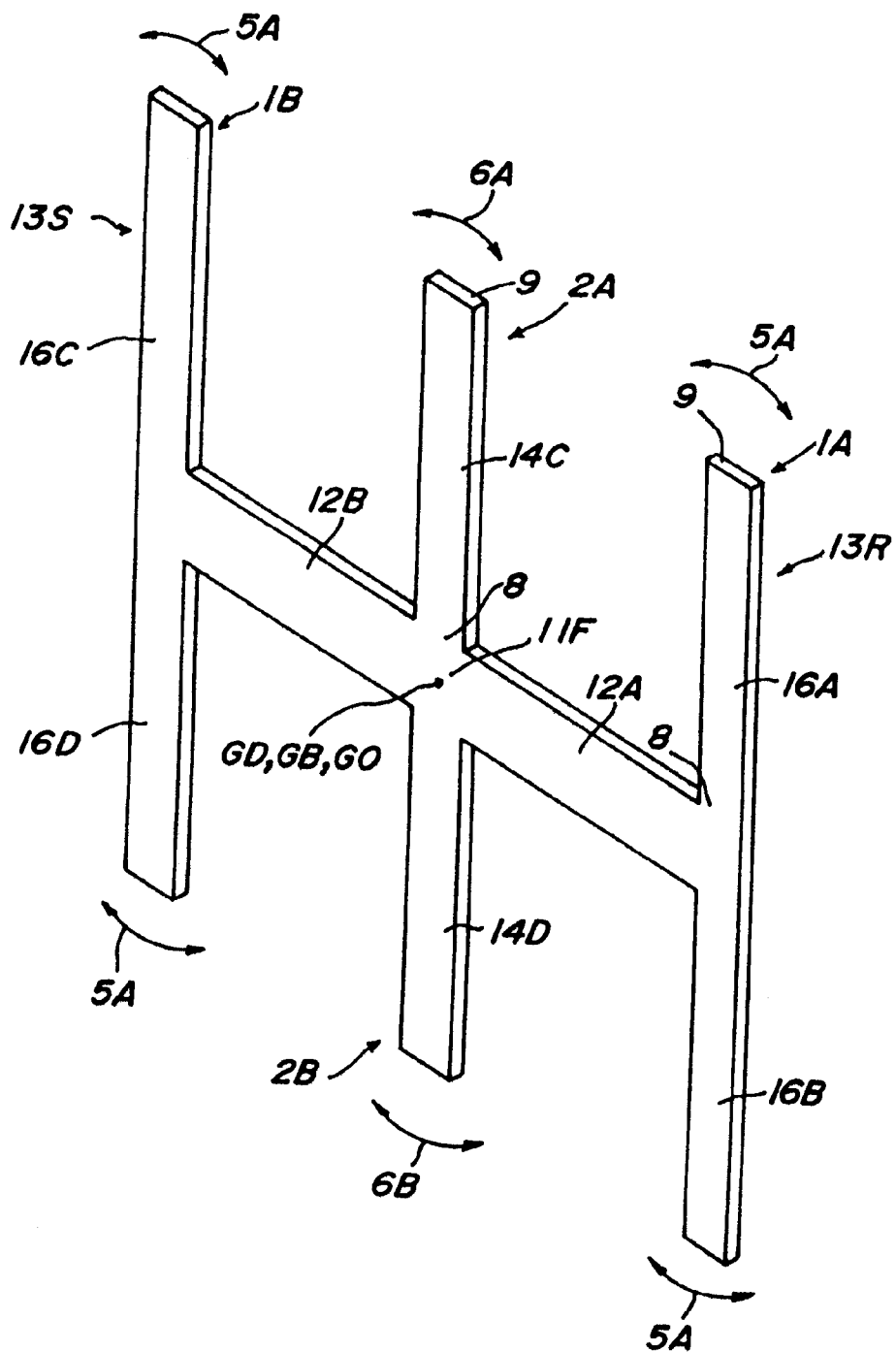
FIG. 32 is a plan view schematically showing a vibrator according to another embodiment of the invention.

In the vibrators of FIGS. 31 and 32, the supporting portions 12A, 12B and bending vibration pieces 13R, 13S, 14C and 14D, within the driving and detecting vibration systems, are substantially the same as described above. However, the vibrators comprise base portions 11F which are located at the cross points of the supporting portions 12A, 12B and the pieces 14C, 14D and whose width are substantially the same as those of the portions 12A, 12B and the pieces 14C, 14D.

In FIG. 31, linear elongated portions 41 are provided from the end portions of the supporting portions. 12A, 12B in the longitudinal direction of the supporting portions. Each elongated portion is connected with a fixing piece portion 42. The driving vibration systems 1A, 1B vibrate between a pair of the fixing piece portions 42 as described above. In FIG. 32, such fixing piece portions and elongated portions are not provided in the vibrator.

Figure 33:
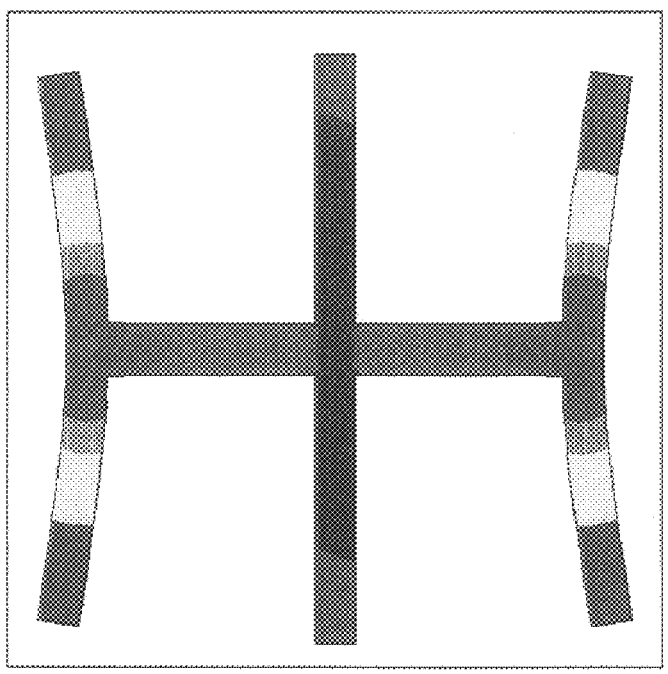
FIG. 33 shows a relative ratio of an amplitude of vibration at each point in the vibrator of FIG. 32 to the maximum vibration amplitude in the driving vibration mode.
Figure 34:
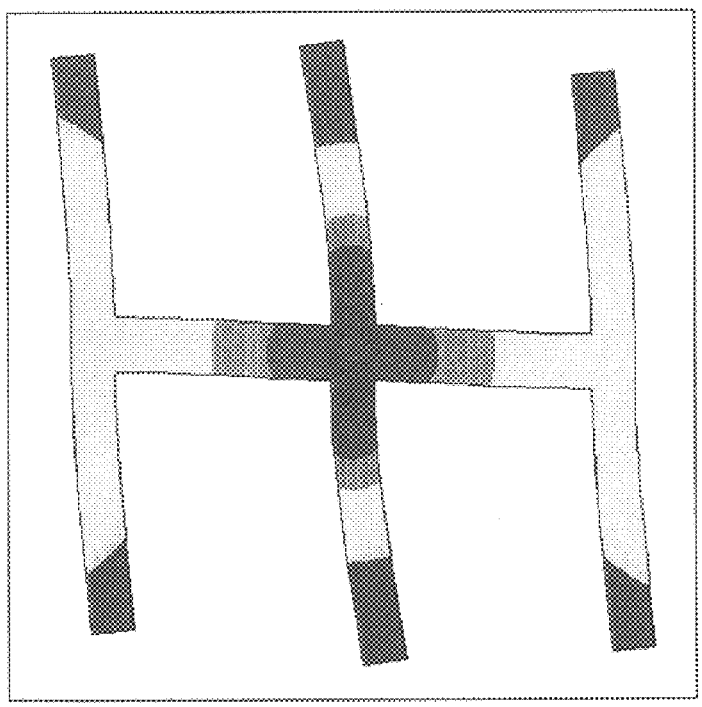
FIG. 34 shows a relative ratio of an amplitude of vibration at each point in the vibrator of FIG. 32 to the maximum vibration amplitude in the detecting vibration mode.

FIG. 33 shows a relative ratio of the amplitude of vibration at each point in the vibrator of FIG. 32 to the maximum vibration amplitude in a driving vibration mode, and FIG. 34 shows a relative ratio of the amplitude of the vibration of each point to the maximum vibration amplitude in a detecting vibration mode. The FIGS. 32 and 33 can be understood substantially the same as FIGS. 12 and 13.

According to FIG. 33, deformations induced by the driving vibration are hardly observed in the detecting vibration systems and the supporting portions. According to FIG. 34, since the detecting portions are located at dyad-symmetric positions around the center of gravity of the vibrator, influence exerted by the detecting vibration on the base portion 11F is hardly observed. Consequently, the vibrator may preferably be held within the base portion 11F.

In the vibrator and gyroscope of this example, as shown in FIGS. 32 and 33, the center of gravity GO of the vibrator is located within a domain where the driving vibration is smallest, and as shown in FIGS. 32 and 34, the center of gravity GO is located within a domain where the detecting vibration is smallest.

Figure 35:
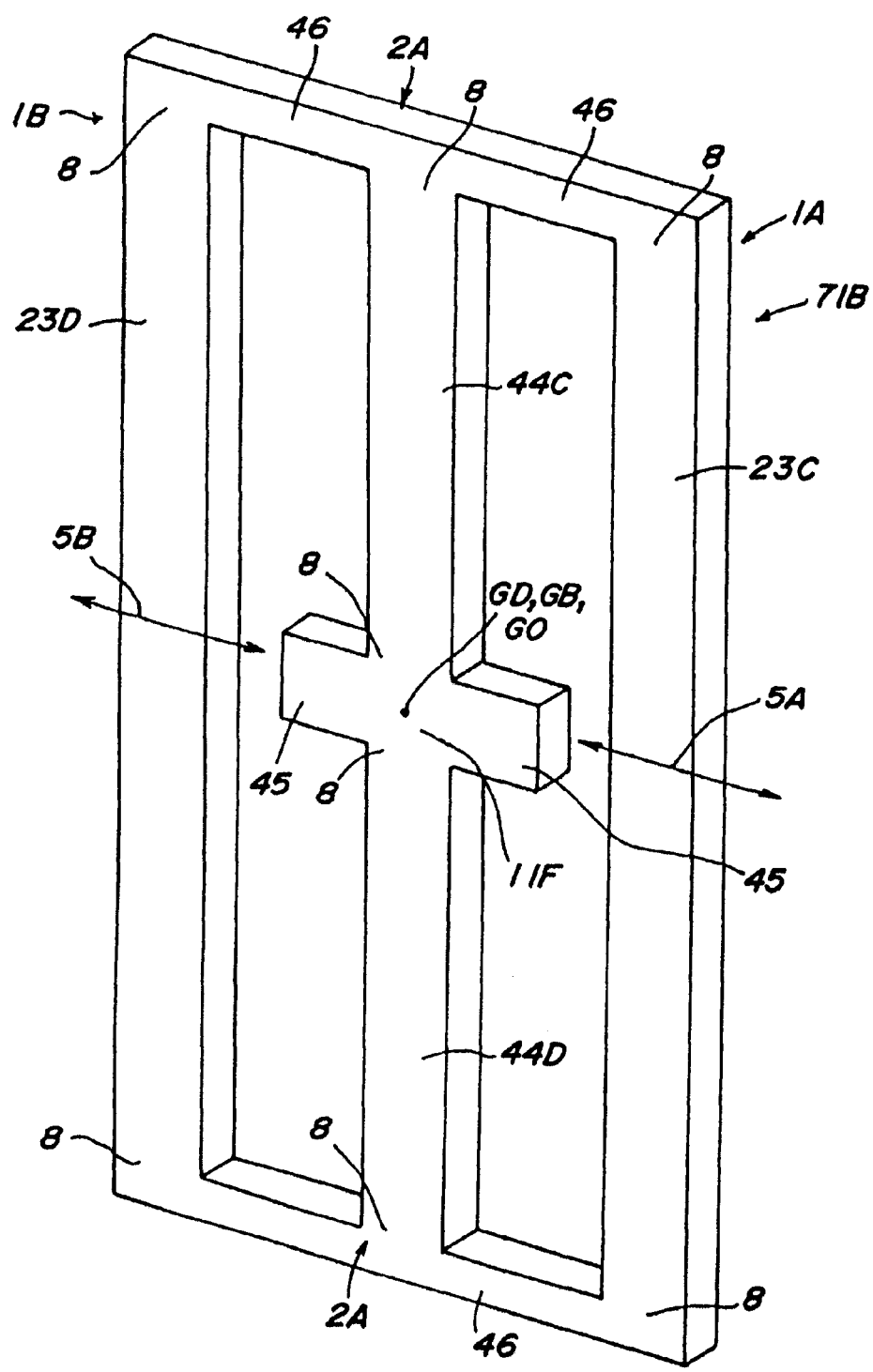
FIG. 35 is a plan view schematically showing a vibrator according to another embodiment of the invention.

A vibrator of FIG. 35 comprises two detecting vibrating systems 2A and 2B extending from the base part 11F. The detecting vibration systems comprise bending-vibration pieces 44C and 44D, respectively. The end portions of the pieces 44C and 44D are connected through connecting portions 46 to bending-vibration pieces 23C and 23D, respectively. The bending-vibration pieces 23C and 23D constitute the driving vibration systems 1A and 11B, respectively, and extend in a direction substantially parallel to the pieces 44C and 44D. The pieces 23C, 23D and the connecting portions 46 together form a vibrating loop system 71B vibrating as a whole around the center GO of gravity.

The both ends of the bending-vibration pieces 23C and 23D are fixed as shown in FIG. 2(b), and these central parts vibrate as arrows 5A and 5B. The vibration pieces 44C and 44D vibrate as shown in FIG. 5(b). Besides, the vibrator of the present example may comprises a projection 45 provided near the base portion, as a fixing piece portion, which may be held.

Then, a process for driving bending-vibration pieces and for detecting vibrations induced in bending vibration pieces is further described below. The operation of a vibrator of FIG. 36 is same as that of the vibrator shown in FIG. 24. However, the vibrator is formed of a piezoelectric single crystal having a "a" axis extending within the specified plane and a "c" axis extending in a direction perpendicular to the vibrator. Such combination of the "a" axis and "c" axis is seen, for example, in quartz.

The vibrator of FIG. 36 comprises bending vibration pieces for driving 23C and 23D having driving electrodes 15A and 15B. FIG. 37(a) shows its cross-sectional view. Further, the vibrator comprises bending vibration pieces for detecting 14C and 14D having detecting electrodes 16A and 16B. FIG. 37(b) shows its cross-sectional view.

The vibrator according to the invention may comprise vibration systems each having a subvibrator, especially bending-vibration piece, provided with a through hole or a hollow or a groove extending in the longitudinal direction of the subvibrator or the piece. As a result, the natural resonance frequency of vibration of the bending-vibration piece may be reduced to further improve "Q" value of the driving vibration or detecting vibration. FIGS. 38 to 41 show gyroscopes according to this embodiment of the invention.

Figure 38:
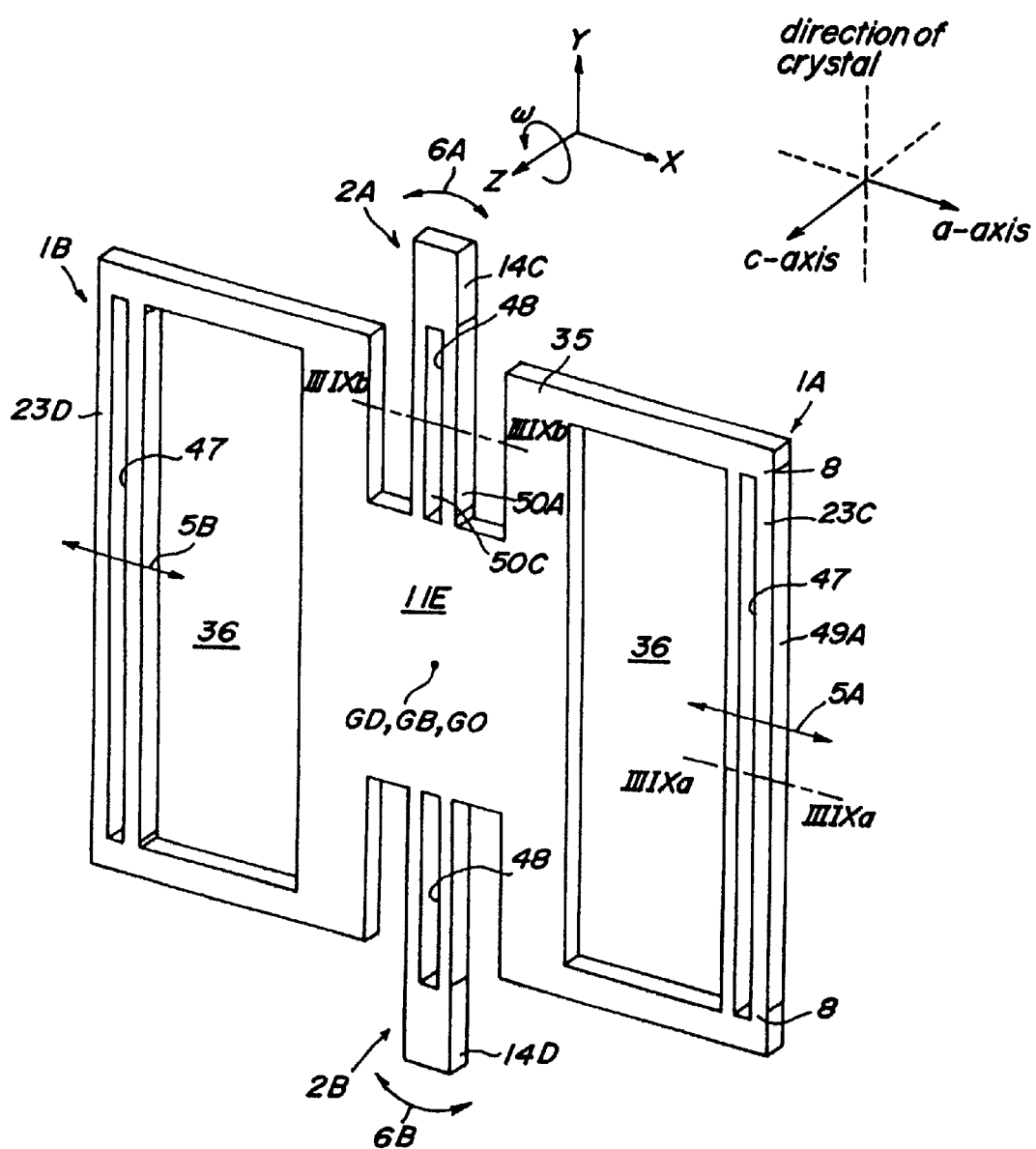
FIG. 38 is a perspective view showing a vibrator embodying the vibrator of FIG. 24.

The vibrator of FIG. 38 comprises bending-vibration pieces 23C, 23D, 14C and 14D, in which through holes 47, 48 are provided, extending in the longitudinal direction of the respective bending-vibration piece. As shown in FIG. 39(a), each piece 23C or 23D comprises driving electrodes 49A and 49D on the outer side surface of the piece, and driving electrodes 49B and 49C on the inner side surface facing the through hole 47. As shown in FIG. 39(b), each piece 14C or 14D comprises detecting electrodes 50A and 50D on the outer side surfaces of the piece, and detecting electrodes 50B and 50C on the inner side surfaces facing the through hole 48.

In this embodiment, a plate made of a piezoelectric single crystal, such as quartz, is used having an "a" axis, which are triad-symmetrical axis. In each bending-vibration piece shown in FIG. 39(a), the driving electrodes 49A and 49D on the outer side surfaces are connected to a alternating current supply, and the driving electrodes 49B and 49C on the inner side surfaces are grounded. Consequently, the directions of the electric fields by the applied voltages between the driving electrodes 49A and 49B and between the electrodes 49C and 49D are reversed to induce bending movement in the bending vibration piece.

Further, the directions of the electric fields, induced by the bending movement of the detecting bending-vibration piece between the detecting electrodes 50A and 50B and between the electrodes 50C and 50D, are reversed.

According to the present embodiment, since a pair of driving electrodes are provided on the outer and inner side surfaces, respectively, of both sides of the through hole in each bending-vibration piece, bending motion may be induced in the bending-vibration piece. The similar principle also applies to each detecting bending-vibration piece. Therefore, the bending vibration piece may be driven or its vibration may be detected by applying a voltage in a direction of the "a" axis, which has the largest electromechanical coupling coefficient.

In the above-mentioned embodiments, the vibration pieces or arms are driven by applying a voltage in the a-axis direction of the piezoelectric single crystal. On the other hand, for example, in case of a single crystal of lithium niobate, lithium tantalate, or a single crystal of a solid solution of lithium niobate-lithium tantalate, as shown in FIG. 40 for example, it is most advantageous from a viewpoint of thermal stability to orient the a-axis in parallel with the paper face and direct the c-axis at an angle of 50° to the paper face. In this case, the bending-vibration pieces are bending-vibrated by applying a voltage in the direction perpendicular to the paper face.

In FIG. 40, a 130° Y-plate made of lithium tantalate whose "c" axis is oriented at an angle of 50° with respect to the specified plane of the vibrator is used, so that the thermal stability of the vibrator is most improved. Bending-vibration pieces 23C and 23D for driving comprise through holes 47, each extending in the longitudinal direction of the piece, respectively. Bending-vibration pieces 14C and 14D for detecting comprise through holes 48, each extending in the longitudinal direction of the piece, respectively.

As shown in FIG. 41(a), elongated driving electrodes 99A, 99B, 99C and 99D are provided on both outer sides of the hole 47. The directions of the electric fields by the applied voltages between the driving electrodes 99A and 99B and between the electrodes 99C and 99D are reversed to induce bending movement in the bending vibration piece. As shown in FIG. 41(b), elongated detecting electrodes 51A, 51B, 51C and 51D are provided on both outer sides of the hole 48 in each piece for detection. The directions of the electric fields, induced by the bending movement between the detecting electrodes 51A and 51B and between the electrodes 51C and 51D, are reversed.

In the above described embodiments, instead of providing the through holes 17 and 48, grooves or hollow portions, having substantially the same shapes as those of the through holes, may be provided. That is, a thin wall may be provided so as not to make each hole 47 and 48 go through or penetrate the bending vibration piece.

In the preferred embodiment of the detecting method of an angular turning rate, an electrical signal for generating a drive vibration is assumed as a reference signal, an output signal is obtained by detecting another electrical signal by a detecting means from a vibration having a vibration mode which is caused by the drive vibration and is different from the drive vibration mode, and a phase difference between the reference signal and the output signal is detected to measure the angular turning rate based on the detected phase difference.

FIG. 42 is a block diagram showing an example of a phase difference detecting means used in this embodiment.

In the phase difference detecting means 62 shown in FIG. 42, an output signal is amplified through an alternating-current amplifier 61 and then supplied to a phase different detecting circuit 63. A reference signal is preprocessed for waveform-shaping or the like by a reference signal preprocessing circuit 64, and then is supplied to a phase different detecting circuit 63, which detects a phase difference between the preprocessed reference signal and the output signal which have been supplied. The detected phase difference is supplied to a low-pass filter 65 and a direct-current amplifier 66 to convert it to a direct-current signal whose amplitude varies according to the phase difference. The direct-current signal obtained by the above-mentioned phase difference detecting means 62 is supplied to a turning angular rate detecting circuit 67, which calculates a turning angular rate on the basis of a predetermined relation between the magnitude of a direct current and a turning angular rate.

Since the above-mentioned circuit 62 cannot directly calculate a phase difference between an output signal and a reference signal as a numerical value, it calculates a turning angular rate from the magnitude of the direct-current signal varying according to the phase difference. However, the phase difference may be obtained as a numerical value and then a turning angular rate may be obtained on the basis of a predetermined relation between a phase difference and a turning angular rate.

The vibratory gyroscope of the invention proves to be particularly effective for the above method for detecting the phase difference to provide high linearity between the phase difference and the turning angular rate. The linearity between the phase difference and the turning angular rate may be especially improved when a ratio of a gyroscopic signal to a leakage signal is 1 to not lower than 7. A too large leakage signal exceeds the detection limit of the vibrator, even if it is made of a piezoelectric single crystal. Therefore, the upper limit of a leakage signal is determined according to the sensitivity of the vibratory gyroscope.

Thus, in a range where a leakage signal is larger than a gyroscopic signal, especially in a range where the ratio of a gyroscope signal to a leakage signal is 1 to not lower than 7, the detection sensitivity is low but the linearity of a phase difference to a turning angular rate is improved.

Further, the vibrator of the invention may be produced by laminating 2 or more piezoelectric layers with each other. In the vibrator of this embodiment, axial directions of polarization of the respective layer may preferably different from one another, and especially, may be in a direction perpendicular to main faces of the vibrator.

According to a linear accelerometer using a vibrator of the invention, since a noise signal, caused by an extending-contracting vibration taking place in the base portion when a driving vibration is given to the vibrator, may be remarkably reduced, it is possible to prevent an error caused by variation of a noise signal with a temperature change.

A sensor for measuring a turning velocity and a linear acceleration at the same time can be made by using the vibrator of the invention. In the vibrator of the present invention, in case that a turning rate and a linear acceleration are applied to the vibrator at the same time, detection signals corresponding to the turning rate and corresponding to the linear acceleration are generated. Among the detection signals at this time, a change in amplitude of a signal component having the same frequency as that of the drive signal is proportional to the turning rate, and a change in a direct-current voltage signal component is proportional to the linear acceleration.

Figure 43:
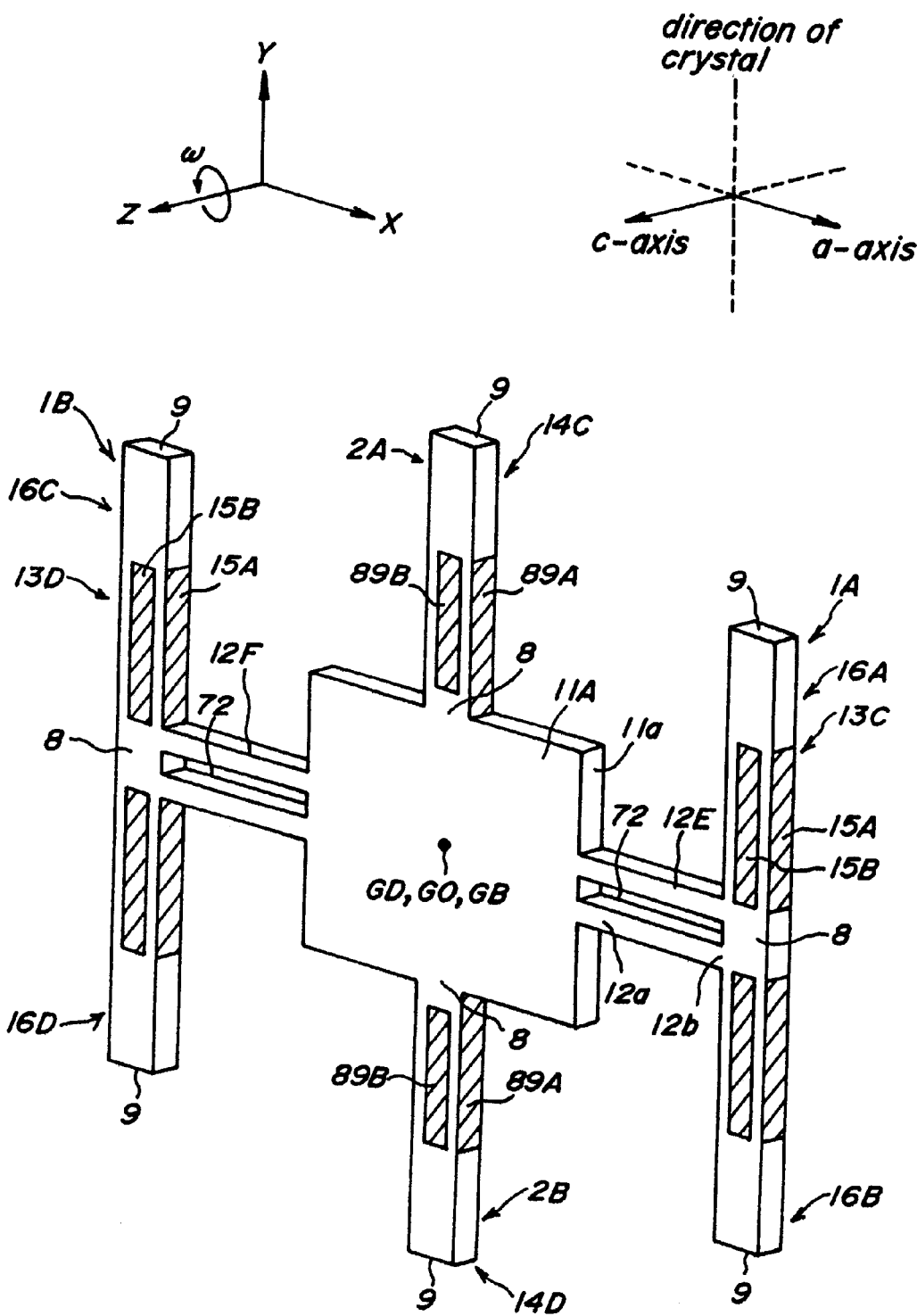
FIG. 43 is a perspective view schematically showing a gyroscope of another example of the invention, in which a through hole is formed in each supporting portion.

FIGS. 43 to 47 are perspective views showing gyroscopes according to another examples of the invention. A vibrator of FIG. 43 is substantially the same as that shown in FIG. 11. However, a through hole 72 is formed in each supporting portion 12E or 12F of each driving vibration system 1A or 1B, and extends in the longitudinal direction thereof, thereby reducing the mechanical strength of each supporting portion. Hollow portions or grooves may be formed instead of the through holes 72.

A vibrator shown in FIG. 44 is also substantially the same as that of FIG. 11. However, the vibrator is made of a piezoelectric single crystal whose "a" axis is oriented in the "x" axis direction and "c" axis is oriented at an angle of 50° with respect to the specified plane. Therefore, the driving vibration electrodes 99A to 99D and detecting electrodes 51A to 51D are substantially the same as those shown in FIG. 40. Further, each bending-vibration piece 16V, 16W, 16X and 16Y of the driving vibration systems 1A and 1B has the shape of an arc.

Figure 45:
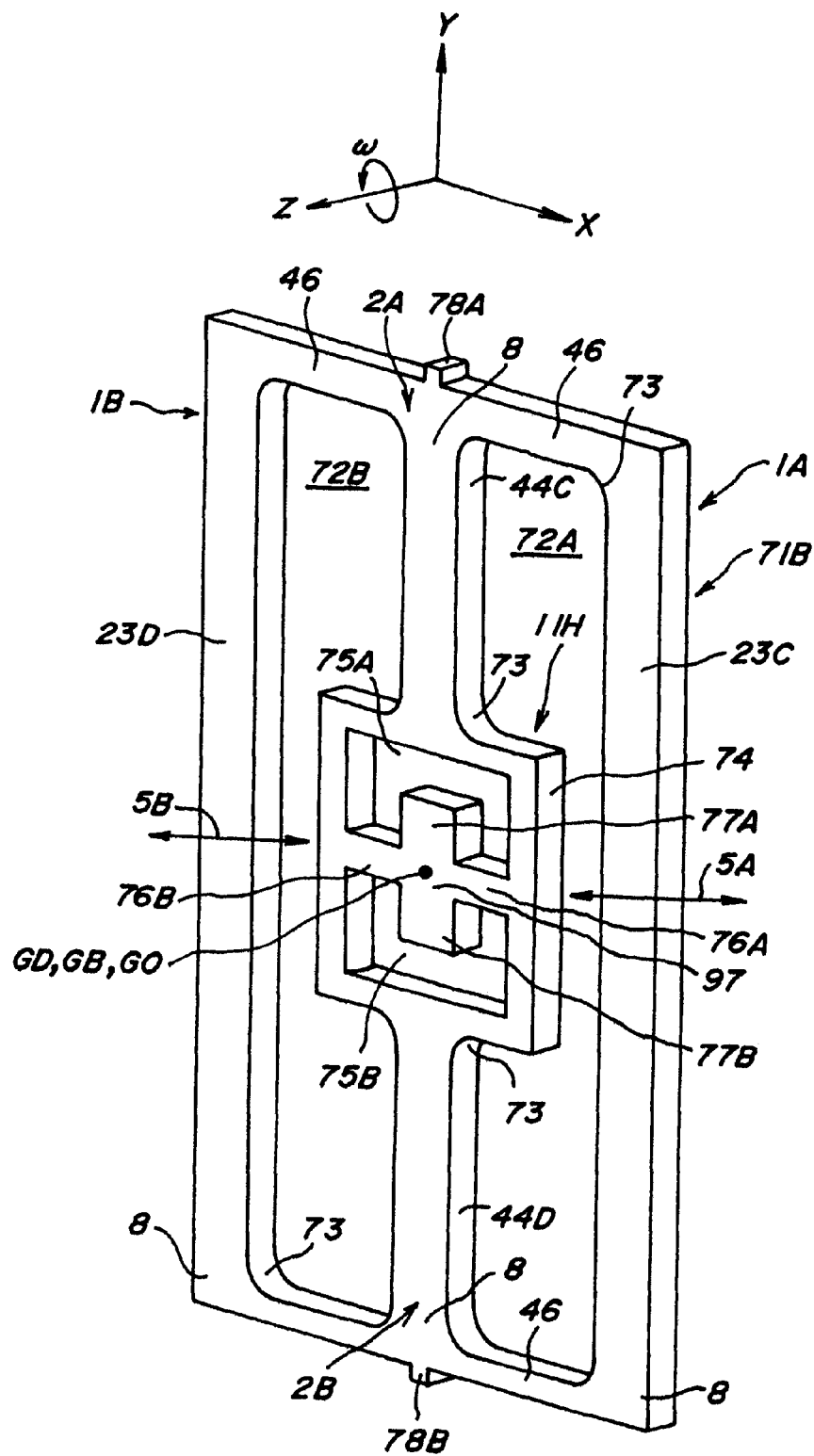
FIG. 45 is a perspective view of a gyroscope of another example of the invention.

A gyroscope shown in FIG. 45 is substantially the same as that shown in FIG. 35, except that projections 78A, 78B extend outwardly from the junctions of connecting portions 46 and bending-vibration pieces 44C and 44D. However, the projections may be omitted. Each bending-vibration piece 44C or 44D is connected with a base portion 11H, which comprises a frame portion 74 with a substantially rectangular shape. A pair of bridges 76A and 76B extend from the inner surface of the frame portion 74 and support a central base portion 97 between the bridges. The centers GD, GB and GO are located within the central base portion 97. Projections 77A and 77B extend from the central base portion 97 towards spaces 75A and 75B. 72A and 72B are spaces and 73 is a radius portion.

The vibrator of this example may be supported within the projections 78A and 78B, or within the central base portion 97, or within the projections 77A and 77B, to reduce the influences on the sensitivity of the detecting vibration induced by the supporting.

Figure 46:
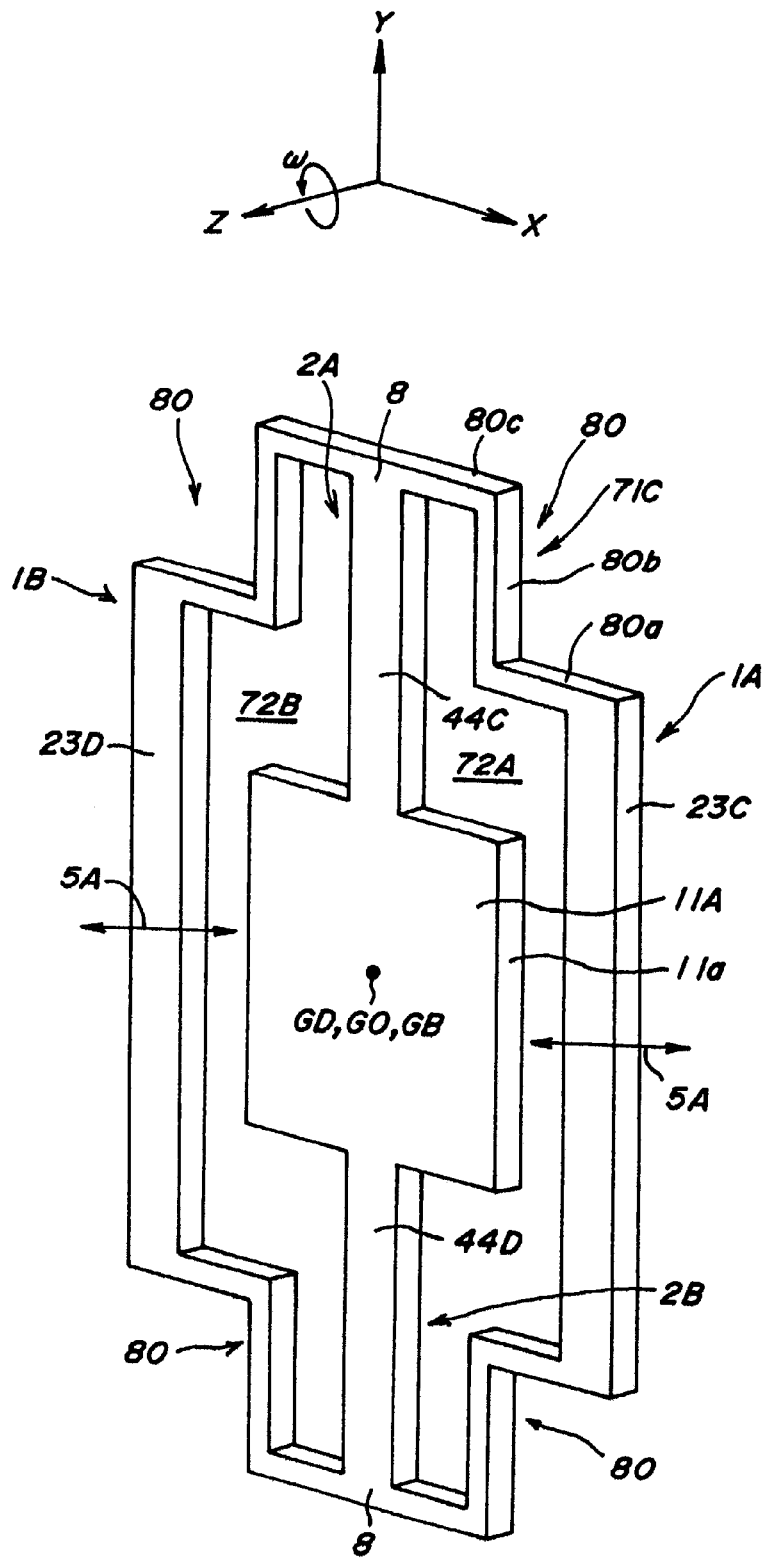
FIG. 46 is a perspective view of a gyroscope of another example of the invention, comprising a vibrating loop system 71C.

The gyroscope of FIG. 46 comprises driving vibration systems each having bending-vibration piece 23C or 23D, which is connected through a pair of connecting portions 80 to bending-vibration pieces 44C and 44D, to form a vibrating loop system 71C. Each connecting portion 80 comprises subconnecting portions 80a and 80c, extending in a direction of the "X" axis, and a subconnecting portion 80b extending in a direction of the "Y" axis and connecting the subconnecting portions 80a and 80c. Bending-vibration pieces 44C and 44D are connected to a base portion 11A, respectively. 72A and 72B are hollow portions.

Figure 47:
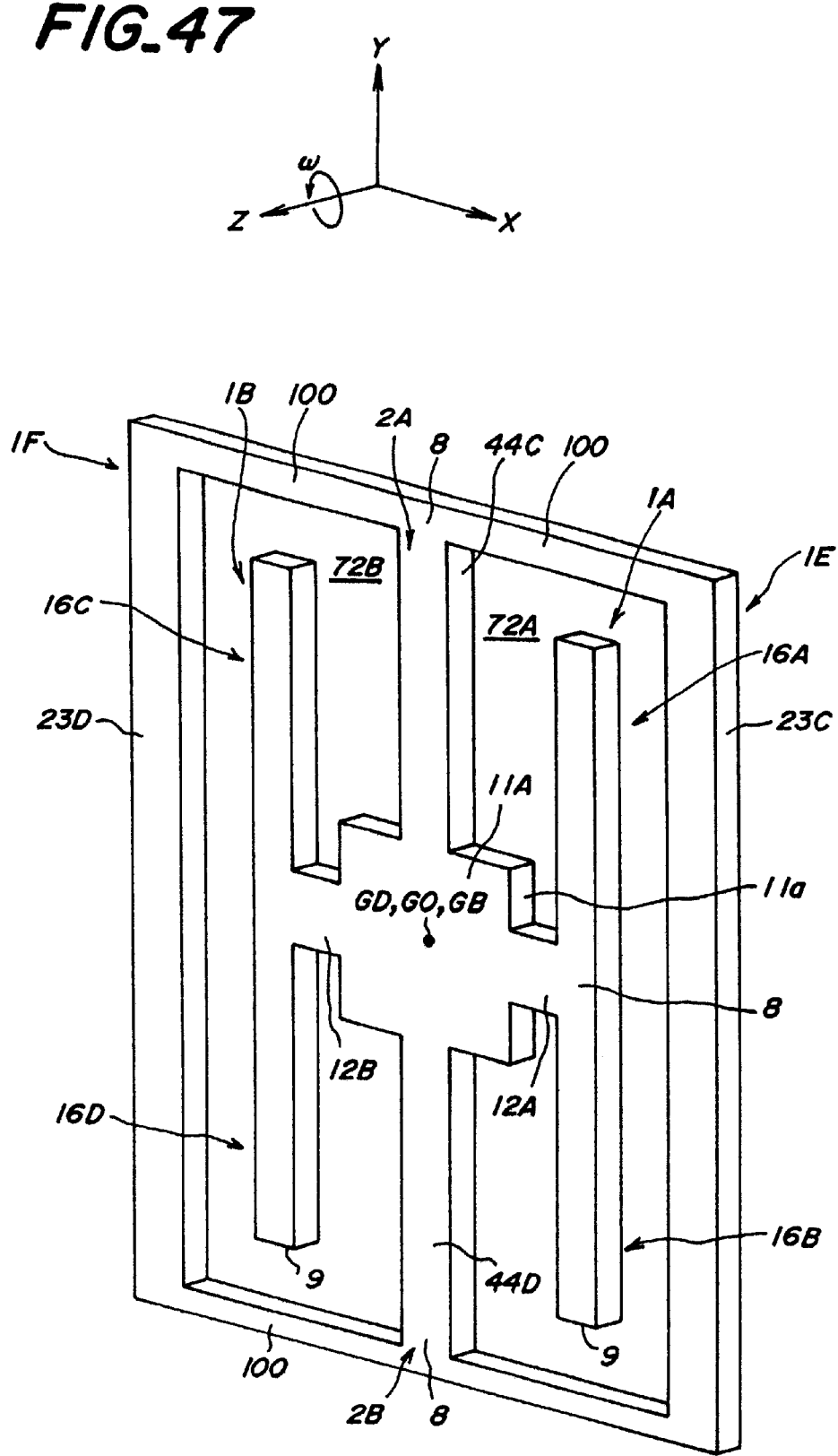
FIG. 47 is a perspective view of a gyroscope of another example of the invention.

A gyroscope of FIG. 47 comprises the driving vibration pieces 1A and 1B, detecting vibration pieces 2A and 2B, and the base portion 11A, which are substantially the same as those described in FIG. 11. Further, driving vibration systems 1E and 1F are provided outside of the systems 1A and 1B. The systems 1E and 1F comprise bending-vibration pieces 23A and 23D, respectively, each having both ends connected through a connecting portion 100 to the end of each bending-vibration piece 44C, 44D.

The sensitivity of a gyroscope varies according to the difference of natural resonance frequencies of its driving vibration and detecting vibration. However, when ambient temperature changes, the natural resonance frequencies and therefore the differences change. In actual experiments conducted by the present inventors, the differences varies about 10 in a temperature range of −30° C.−+80° C. Therefore, it is desired to maintain the differences to a constant with smaller deviations in a temperature range of −30° C.−+80° C.

To solve this problem, when the vibrator comprises a pair of main surfaces, which are parallel to the specified plane, and sides, a projection of projections may preferably be provided on the side or sides, the projection or projections having a height, from the side on which it is provided, of ⅓ to ⅐ (preferably ¼ to ⅕) of a thickness of the vibrator. Moreover, when the projection or projections may be provided in a bending-vibration piece or pieces, whose length may preferably be not more than 7 mm, most preferably not more than 6 mm.

Figure 48:
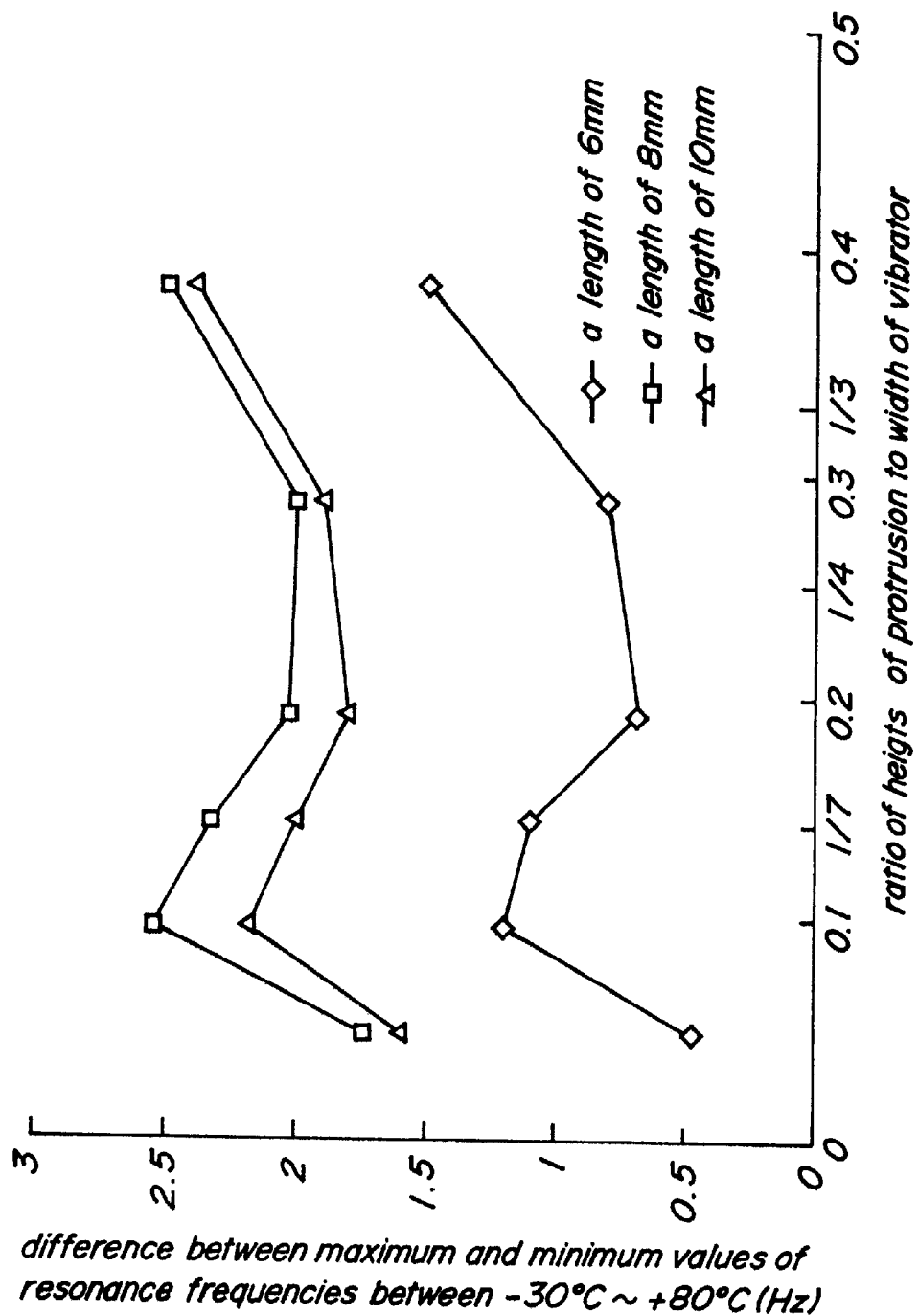
FIG. 48 is a graph showing the difference, between maximum and minimum values during −30° C. to +80° C. of the differences of natural resonance frequencies in driving and detecting vibration, with respect to lengths of bending-vibration pieces, and ratios of heights of protrusions to thicknesses of the pieces.

The inventors actually measured natural resonance frequencies of the driving and detecting vibrations in the bending-vibration piece according to the invention in a temperature range of −30° C.−+80° C. and presented a graph in FIG. 48, showing the difference between maximum and minimum values of the differences in the same temperature range, in which the bending-vibration piece has a length of 6, 8, or 10 mm, a thickness of 0.3 mm, a width of 10 mm and is made of quartz.

As can be seen from the results of FIG. 48, the difference of maximum and minimum values of the differences of the resonance frequencies in a temperature range of −30° C. to +80° C. may be reduced to not more than 2.5 Hz, especially 2.0 Hz to control the fractuation of the sensitivities of the gyroscope in a range of not more than 5, by reducing a length of the bending-vibration piece to not more than 6 mm and controlling the height of the projection as described above.

Further, a projection or projections may preferably be provided on a side or sides of a base portion, the projection or projections extending in the longitudinal direction of the side, to further reduce the influences on the detecting vibration induced by the driving vibration. In this case, projections may preferably be provided, in positions symmetrical with respect to the center of gravity of the base portion, to reduce the noise induced in the detecting vibration.

Further, when each driving or detecting vibration system comprises a bending-vibration piece or pieces and its supporting portion, a projection or projections may preferably be formed on at least one side, more preferably on both sides, of the supporting portion, the projection or projections extending in the longitudinal direction of the side. The influences on the base portion induced by the vibration of the bending-vibration pieces may be thereby reduced. Moreover, a projection or projections may be provided on at least one side of the detecting vibration piece so that the influence on the detecting vibration piece induced by the driving vibration, and therefore the noise may be reduced, when the vibrator is not turned.

Figure 49:
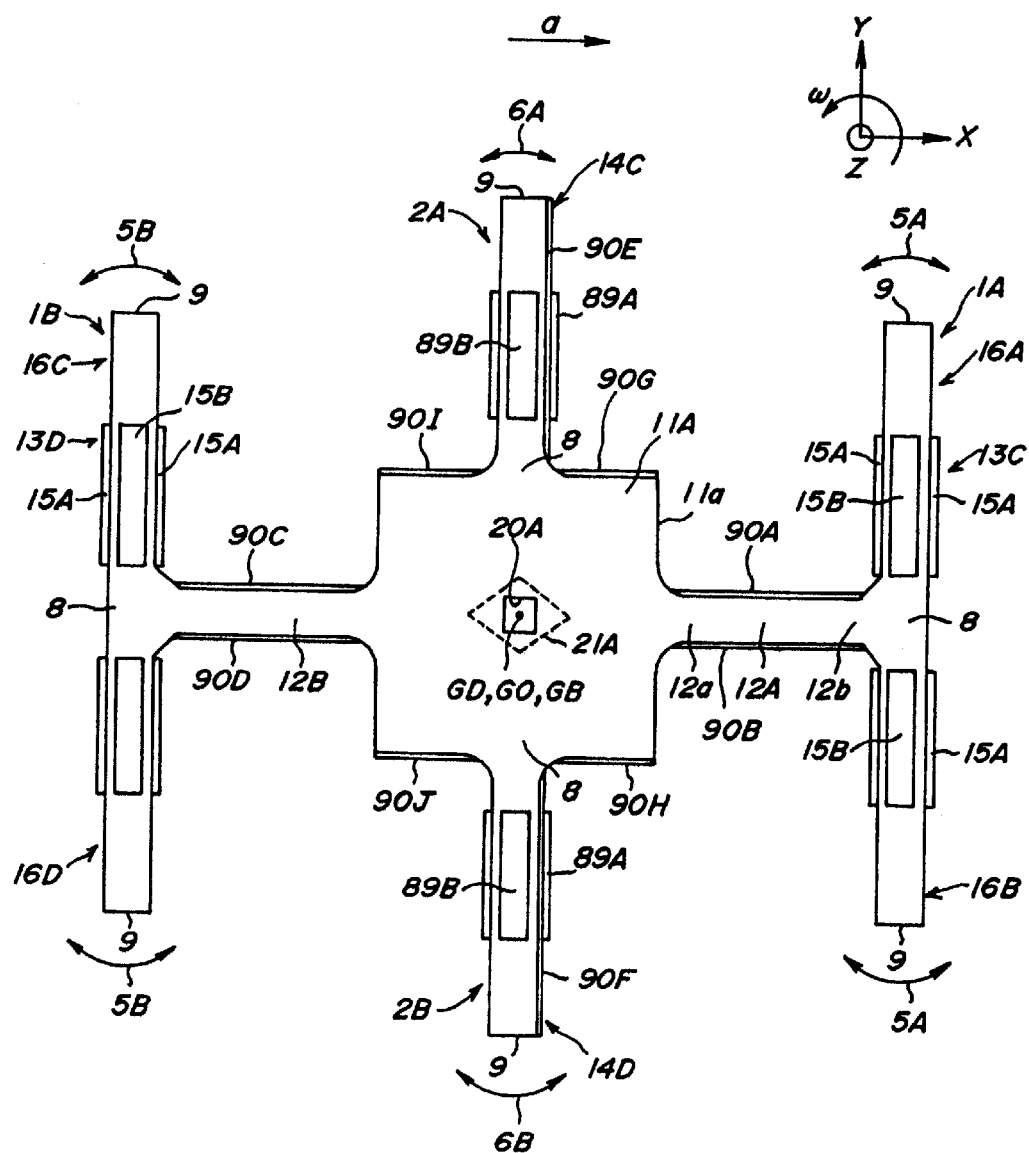
FIG. 49 is a plan view showing a gyroscope of another examples of the invention, in which protrusions are provided on the side of a vibrator.

FIG. 49 shows a gyroscope according to this embodiment, comprising a vibrator having projections 90G, 90I, 90H and 90J provided on sides of a base portion 11A. The projections are in positions symmetrical with respect to the center of gravity of the base portion 11A. Further, a projection 90A, 90B, 90C or 90D is formed on both sides of each supporting portion 12A, 12B in each driving vibration system 1A, 1B. Each projection 90E or 90F is formed on one side of each bending-vibration piece 14C or 14D in each detecting vibration system 2A or 2B.

When producing vibrators by means of an etching process, fluctuations may occur in a time duration for the etching process or concentrations of etching solution depending on a manufacturing rot to which the vibrator belongs. Such fluctuations may induce fluctuations in the differences between the natural resonance frequencies of the driving and detecting vibrations of the vibrator and fluctuations in the sensitivities of the produced vibrators. To prevent such fluctuations, a through hole or holes, or a hollow portion or portions, or a groove or grooves may be formed in a bending-vibrating piece in a position or positions closer to the end of the piece than a driving or detecting vibration means and with such means not provided.

Figure 50:
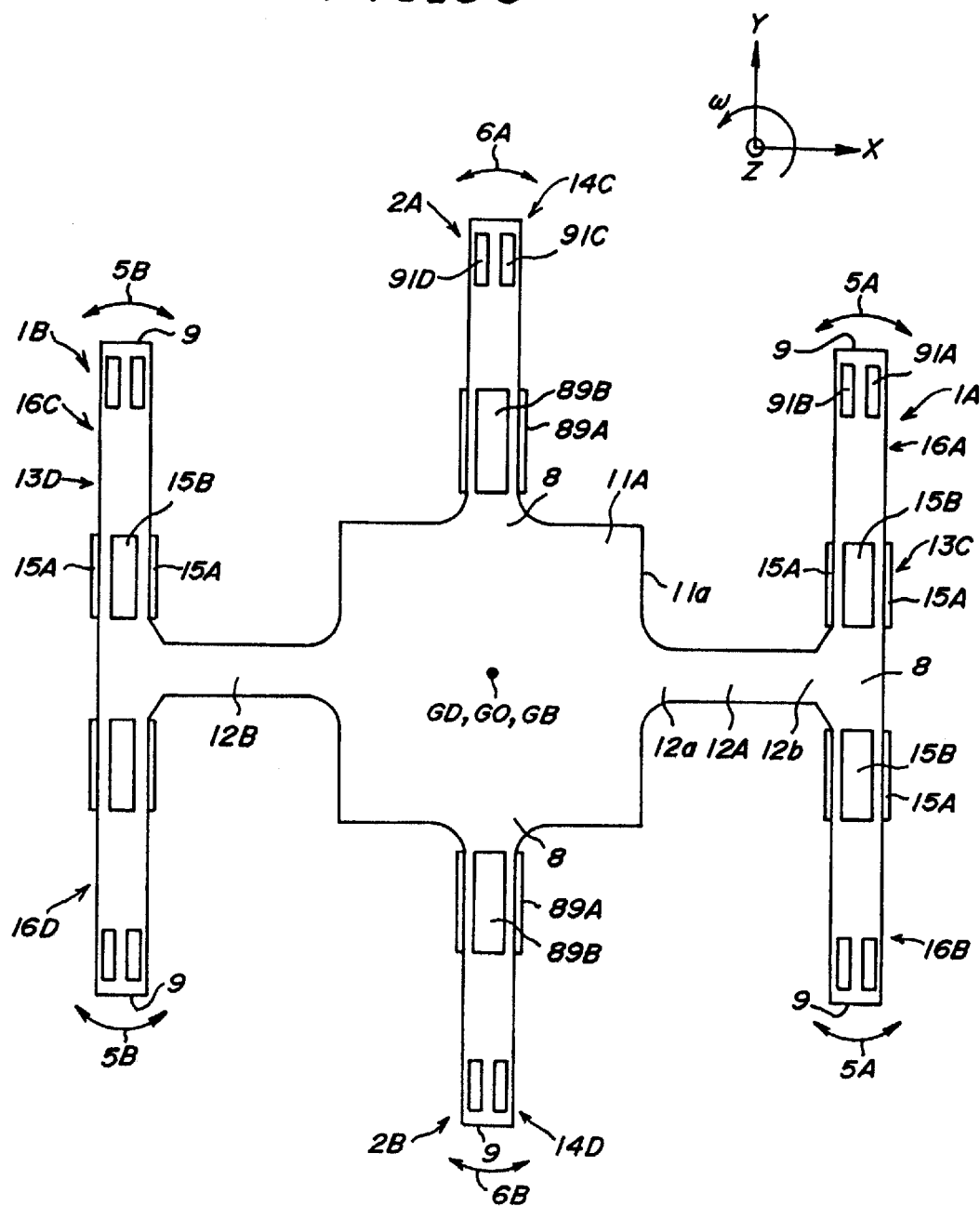
FIG. 50 is a plan view showing a gyroscope of another examples of the invention, in which through holes are formed in end portions of bending-vibration pieces.

FIG. 50 is a plan view schematically showing a gyroscope according to this embodiment. The gyroscope is substantially the same as that of FIG. 11, except that through holes 91A, 91B, 91C and 91D are formed in bending-vibration pieces 16A, 16B, 16C, 16D, 14C and 14D, in positions closer to the ends of the pieces than driving or detecting vibration electrodes and with such electrodes not provided. The through holes or the hollow portions or grooves may preferably be formed in positions 0.3 mm distant from the electrodes.

Figure 51:
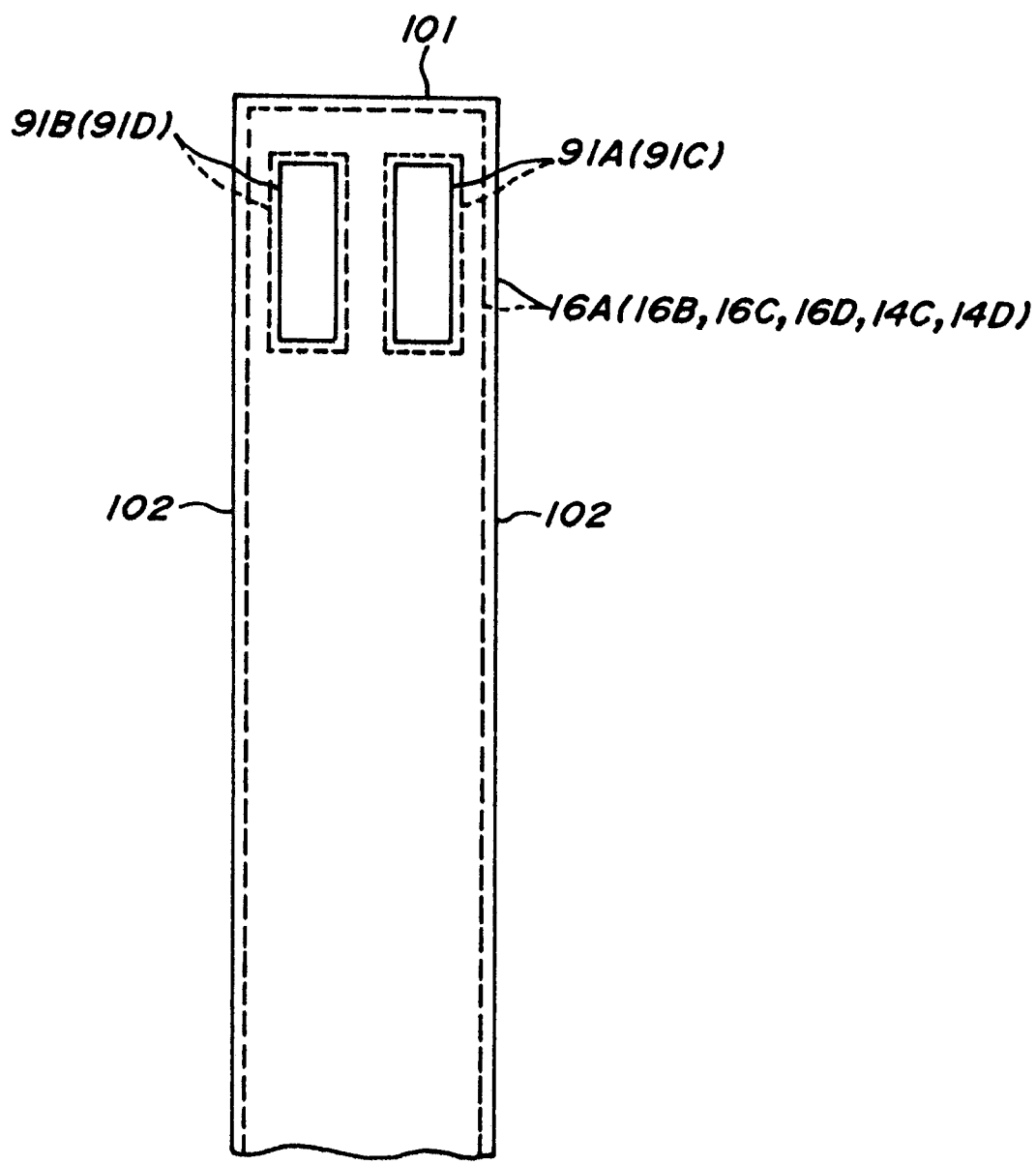
FIG. 51 is a schematic diagram explaining an etching process proceeding in a bending-vibration piece.

The effects of such through hole or hollow portion or groove will be described below. As shown in FIG. 51, when producing a bending-vibration piece by etching a material, such material may be further etched as shown in broken lines with respect to a predetermined design shown by a solid line. In this case, the edge surface 101 of the piece is etched after the material has been already etched to the solid line, a mass of the bending-vibration piece is decreased to increase its resonance frequency. On the other and, when the material is further etched in its sides as shown in broken lines, width of the bending-vibration piece is decreased to reduce its resonance frequency. Consequently, the effects of the overetching on the sides 102 exceeds the effects of that of the end surface 101.

However, by providing through holes 91A to 91D in the piece, when the sides are overetched as shown by broken lines, the through holes 91A to 91D are also etched as shown by the broken lines to reduce a mass of the piece after the etching.

For example, when forming the bending-vibration piece made of quartz and with a length of 6 mm, a width of 1.0 mm and a thickness of 0.3 mm, and if the sides 102 are overetched $1\mu$ deeper than the designed length, the difference between the resonance frequencies of the driving and detecting vibrations is made about 2.85 Hz different from the predetermined value. On the other hand, when through holes 91A to 91D each having a length of 0.4 mm and a width of 0.3 mm in the piece of the above design, the difference is only 0.08 Hz different from the predetermined value.

Moreover, an enlarged portion may be preferably provided at the end of each bending-vibration piece, and such portion having a through hole or holes, or a hollow portion or portions, or a groove or grooves formed within. Such enlarged portion may improve the above effects of the through hole or the hollow portion, or in other words, even smaller through hole or hollow portion or groove may provide the above effects.

Figure 52:
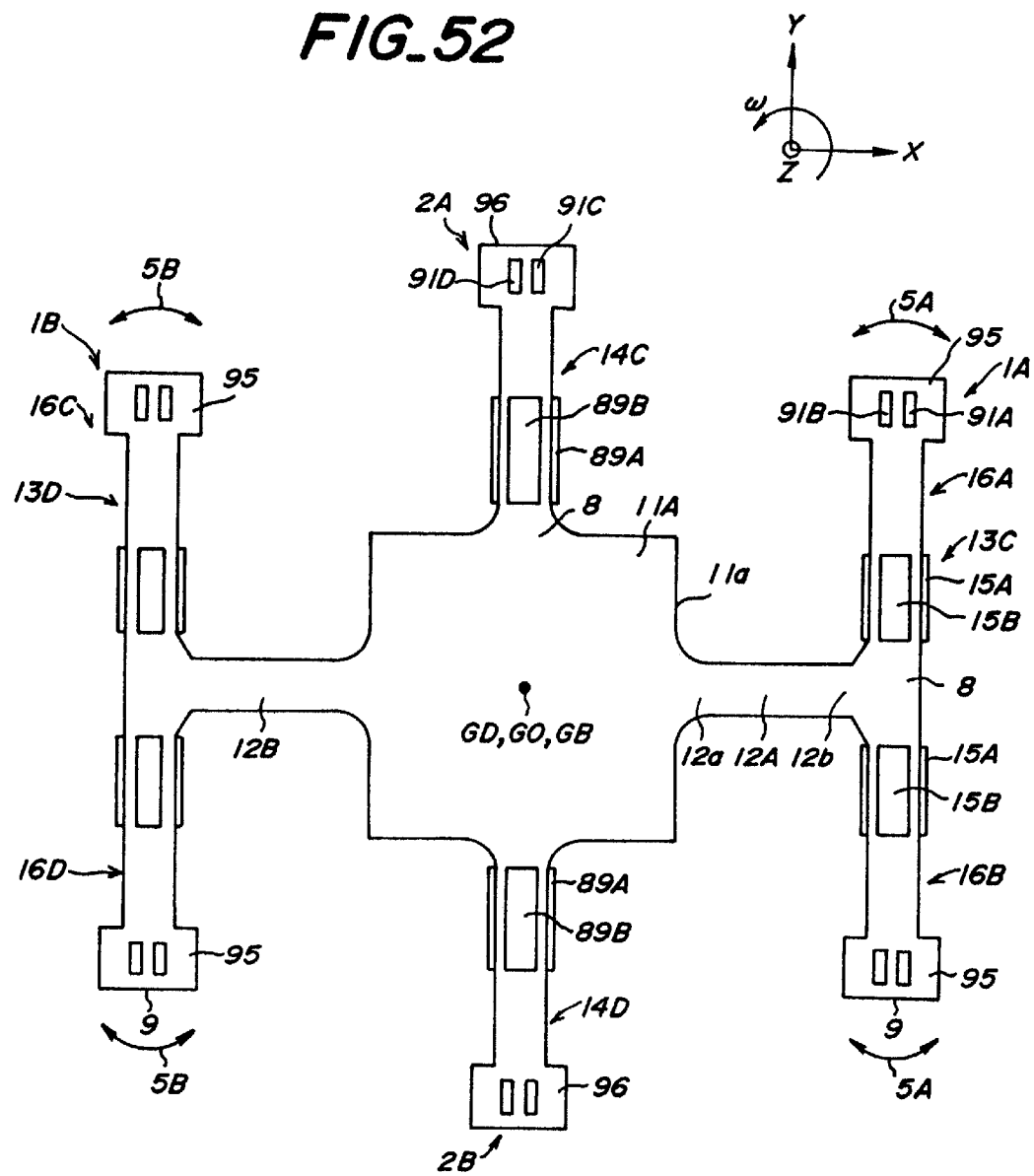
FIG. 52 is a plan view showing a gyroscope of another example of the invention, in which enlarged portions with through hole formed are provided in ends of bending-vibration pieces.

FIG. 52 shows a gyroscope according to this embodiment. Each bending-vibration piece 16A, 16B, 16C, 16D, 14C or 14D comprises each end with an enlarged portion 95 or 96, each enlarged portion having a width lager than that of the corresponding bending-vibration piece. Within each enlarged portion, through holes 91A and 91B, or 91C and 91D are formed.

As described above, the present invention provides a novel vibratory gyroscope comprising a vibrator, especially extending in a specified plane, and the gyroscope being capable of detecting an angular turning rate of a turning when subjecting the vibrator to the turning.

What is claimed is:

1. A vibrator to be turned around a turning axis and having a center of gravity (GO), comprising:
    a first vibration system whose vibration includes two or more radial vibration components with respect to an imaginary circle whose center is coincident with said center of gravity of said vibrator;
    a second vibration system whose vibration includes a circumferential vibration component with respect to an imaginary circle whose center is coincident with said center of gravity of said vibrator; and
    a base portion;
        wherein said first vibration system, said second vibration system and said base portion are formed along a specified plane intersecting said turning axis, and wherein said first vibration system and said second vibration system are connected through said base portion.

2. The vibrator of claim 1, wherein said first and second vibration systems are connected only through said base portion without any other connection.

3. The vibrator of claim 1, wherein a ratio between amplitudes of said radial vibration component and a circumferential vibration component, with respect to an imaginary circle whose center is coincident with said center of gravity of said vibrator, in said first vibration system is 1:0 to 3.

4. The vibrator of claim 3, wherein said ratio is 1:0 to 1.

5. The vibrator of claim 1, wherein a ratio between amplitudes of a radial vibration component, with respect to an imaginary circle whose center is coincident with said center of gravity of said vibrator, and said circumferential vibration component in said second vibration system is 0 to 1:5.

6. The vibrator of claim 5, wherein said ratio is 0 to 1:10.

7. The vibrator of claim 1, wherein said vibrator has a plurality of said first vibration systems, and a ratio between amplitudes of at least one of said radial vibration components and a circumferential vibration component, with respect to an imaginary circle whose center is coincident with said center of gravity of said vibrator, in said first vibration systems is 5:0 to 1, provided that said first vibration systems vibrate in vibration modes containing vibration components having inverse phases with each other and said amplitudes are measured after canceling said vibration components having inverse phases.

8. The vibrator of claim 7, wherein said ratio is 10:0 to 1.

9. The vibrator of claim 1, wherein said first vibration system and said second vibration system vibrate in substantially independent vibration modes.

10. The vibrator of claim 1, wherein said base portion does not substantially vibrate in bending vibration mode.

11. The vibrator of claim 1, wherein said base portion does not constitute a part of a bending vibration piece.

12. The vibrator of claim 1, wherein said center of gravity of said vibrator is located in or near said base portion.

13. The vibrator of claim 1, wherein said base portion has a peripheral part, and wherein said first vibration system and said second vibration system extend from said peripheral part.

14. The vibrator of claim 13, wherein adjacent vibration systems extend from said peripheral part in directions intersecting at an angle not smaller than 30° with respect to said center of gravity of said vibrator.

15. The vibrator of claim 1, wherein a plurality of said first vibration systems are provided in positions which are substantially identical after turning said positions around said center of gravity of said vibrator.

16. The vibrator of claim 15, wherein said first vibration systems are provided in positions which are diad-symmetrical, triad-symmetrical or tetrad-symmetrical with each other with respect to said center of gravity of said vibrator.

17. The vibrator of claim 1, wherein a plurality of said second vibration systems are provided in positions which are substantially identical after turning said positions around said center of gravity of said vibrator.

18. The vibrator of claim 17, wherein said second vibration systems are provided in positions which are diad-symmetrical, triad-symmetrical or tetrad-symmetrical with each other with respect to said center of gravity of said vibrator.

19. The vibrator of claim 1, wherein each of said first vibration system and said second vibration system has a bending vibration piece connected with said base portion, and wherein said bending vibration piece vibrates in bending motion around the root of said piece to said base portion.

20. The vibrator of claim 1, wherein said base portion is a frame having an inner peripheral part and an outer peripheral part.

21. The vibrator of claim 20, wherein at least one of said first vibration system and second vibration system extend from said inner peripheral part.

22. The vibrator of claim 1, wherein said first vibration system comprises first bending-vibration piece or pieces whose vibration includes at least one of said radial vibration components and a supporting portion extending from said base portion, and wherein said first bending-vibration piece extends in a direction intersecting the longitudinal direction of said supporting portion.

23. The vibrator of claim 1, wherein said second vibration system comprises a bending-vibration piece whose vibration includes at least said circumferential vibration component and said bending-vibration piece is connected with said base portion.

24. A vibratory gyroscope for detecting a turning angular rate around a turning axis comprising:
a vibrator to be turned around said turning axis and having a center of gravity (GO), said vibrator comprising: a first vibration system whose vibration includes two or more radial vibration components with respect to an imaginary circle whose center is coincident with said center of gravity of said vibrator, a second vibration system whose vibration includes a circumferential vibration component with respect to an imaginary circle whose center is coincident with said center of gravity of said vibrator, and a base portion, wherein said first vibration system, said second vibration system and said base portion are formed along a specified plane intersecting said turning axis, and wherein said first vibration system and said second vibration system are connected through said base portion;
exciting means provided in one of said first vibration system and said second vibration system for exciting a driving vibration in said vibrator; and
detecting means provided in the other of said first vibration system and second vibration system for detecting a detecting vibration that occurs due to Coriolis force in said vibrator when said vibrator is turned around said turning axis.

25. The vibratory gyroscope of claim 24, wherein said first and second vibration systems are connected only through said base portion without any other connection.

26. The vibratory gyroscope of claim 24, wherein a ratio between amplitudes of at least one of said radial vibration components and a circumferential vibration component, with respect to an imaginary circle whose center is coincident with said center of gravity of said vibrator, in said first vibration system is 1:0 to 3.

27. The vibratory gyroscope of claim 26, wherein said ratio is 1:0 to 1.

28. The vibratory gyroscope of claim 24, wherein a ratio between amplitudes of at least one of said radial vibration components, with respect to an imaginary circle whose center is coincident with said center of gravity of said vibrator, and said circumferential vibration component in said second vibration system is 0 to 1:5.

29. The vibratory gyroscope of claim 28, wherein said ratio is 0 to 1:10.

30. The vibratory gyroscope of claim 24, wherein said vibrator has a plurality of said first vibration systems, and a ratio between amplitudes of at least one of said radial vibration components and a circumferential vibration component, with respect to an imaginary circle whose center is coincident with said center of gravity of said vibrator, in said first vibration systems is 5:0 to 1, provided that said first vibration systems vibrate in vibration modes containing vibration components having inverse phases with each other and said amplitudes are measured after canceling said vibration components having inverse phases.

31. The vibratory gyroscope of claim 30, wherein said ratio is 10:0 to 1.

32. The vibratory gyroscope of claim 24, wherein said first vibration system and said second vibration system vibrate in substantially independent vibration modes.

33. The vibratory gyroscope of claim 24, wherein said base portion does not substantially vibrate in bending vibration mode.

34. The vibratory gyroscope of claim 24, wherein said base portion does not constitute a part of a bending vibration piece.

35. The vibratory gyroscope of claim 24, wherein said center of gravity of said vibrator is located in or near said base portion.

36. The vibratory gyroscope of claim 24, wherein said base portion has a peripheral part, and wherein said first vibration system and said second vibration system extend from said peripheral part.

37. The vibratory gyroscope of claim 36, wherein adjacent vibration systems extend from said peripheral part in directions intersecting at an angle not smaller than 30° with respect to said center of gravity of said vibrator.

38. The vibratory gyroscope of claim 24, wherein a plurality of said first vibration systems are provided in positions which are substantially identical after turning said positions around said center of gravity of said vibrator.

39. The vibratory gyroscope of claim 38, wherein said first vibration systems are provided in positions which are diad-symmetrical, triad-symmetrical or tetrad-symmetrical with each other with respect to said center of gravity of said vibrator.

40. The vibratory gyroscope of claim 24, wherein a plurality of said second vibration systems are provided in positions which are substantially identical after turning said positions around said center of gravity of said vibrator.

41. The vibratory gyroscope of claim 40, wherein said first vibration systems are provided in positions which are diad-symmetrical, triad-symmetrical or tetrad-symmetrical with each other with respect to said center of gravity of said vibrator.

42. The vibratory gyroscope of claim 24, wherein each of said first vibration system and said second vibration system has a bending vibration piece connected with said base portion, and wherein said bending vibration piece vibrates in bending motion around the root of said piece to said base portion.

43. The vibratory gyroscope of claim 24, wherein said base portion is a frame having an inner peripheral part and an outer peripheral part.

44. The vibratory gyroscope of claim 43, wherein at least one of said first vibration system and second vibration system extend from said inner peripheral part.

45. The vibratory gyroscope of claim 24, wherein said first vibration system comprises first bending-vibration piece or pieces whose vibration includes at least one of said radial vibration components and a supporting portion extending from said base portion, and wherein said first bending-vibration piece extends in a direction intersecting the longitudinal direction of said supporting portion.

46. The vibratory gyroscope of claim 24, wherein said second vibration system comprises a bending-vibration piece whose vibration includes at least said circumferential vibration component and said bending-vibration piece is connected with said base portion.

* * * * *